(12) United States Patent
Oh et al.

(10) Patent No.: US 12,464,138 B2
(45) Date of Patent: Nov. 4, 2025

(54) APPARATUS AND METHOD FOR PROCESSING POINT CLOUD DATA

(71) Applicant: LG Electronics Inc., Seoul (KR)

(72) Inventors: Hyunmook Oh, Seoul (KR); Sejin Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 135 days.

(21) Appl. No.: 17/619,907

(22) PCT Filed: Jun. 1, 2020

(86) PCT No.: PCT/KR2020/007064
§ 371 (c)(1),
(2) Date: Dec. 16, 2021

(87) PCT Pub. No.: WO2020/262831
PCT Pub. Date: Dec. 30, 2020

(65) Prior Publication Data
US 2022/0360797 A1    Nov. 10, 2022

Related U.S. Application Data

(60) Provisional application No. 62/868,836, filed on Jun. 28, 2019.

(51) Int. Cl.
*H04N 19/167*    (2014.01)
*H04N 19/136*    (2014.01)
*H04N 19/174*    (2014.01)
*H04N 19/30*    (2014.01)
*H04N 19/42*    (2014.01)

(52) U.S. Cl.
CPC ......... *H04N 19/174* (2014.11); *H04N 19/136* (2014.11); *H04N 19/167* (2014.11); *H04N 19/30* (2014.11); *H04N 19/42* (2014.11)

(58) Field of Classification Search
CPC .. H04N 19/174; H04N 19/136; H04N 19/167; H04N 19/30; H04N 19/42
USPC ...................................... 375/240.08
See application file for complete search history.

(56) References Cited

U.S. PATENT DOCUMENTS 11,017,566 B1 *   5/2021   Tourapis ................. G06T 9/001
2016/0086353 A1   3/2016   Lukac et al.
2017/0347100 A1   11/2017  Chou et al.
2017/0347122 A1   11/2017  Chou et al.
(Continued)

FOREIGN PATENT DOCUMENTS

CN   108322742 A   7/2018
CN   109196559 A   1/2019
(Continued)

OTHER PUBLICATIONS

Extended European Search Report in European Appln. No. 20831198.5, dated Aug. 4, 2022, 10 pages.
(Continued)

*Primary Examiner* — Albert Kir
(74) *Attorney, Agent, or Firm* — Fish & Richardson P.C.

(57) ABSTRACT

A method for processing point cloud data according to embodiments may comprise: encoding point cloud data; and transmitting the encoded point cloud data. The method for processing point cloud data according to embodiments may comprise: receiving point cloud data; and decoding the received point cloud data.

15 Claims, 33 Drawing Sheets

(56) References Cited

U.S. PATENT DOCUMENTS

| | | | |
|---|---|---|---|
| 2019/0080483 A1 | 3/2019 | Mammou et al. | |
| 2019/0081638 A1 | 3/2019 | Mammou et al. | |
| 2019/0087978 A1* | 3/2019 | Tourapis | G06T 3/08 |
| 2019/0087979 A1 | 3/2019 | Mammou et al. | |
| 2019/0311500 A1* | 10/2019 | Mammou | G06T 9/001 |
| 2020/0314435 A1* | 10/2020 | Tourapis | G06T 7/74 |
| 2021/0211724 A1* | 7/2021 | Kim | H04N 19/46 |
| 2021/0217203 A1* | 7/2021 | Kim | G06T 9/001 |
| 2022/0028120 A1* | 1/2022 | Sugio | G06T 9/001 |
| 2022/0094982 A1* | 3/2022 | Iguchi | H04N 19/597 |
| 2022/0109816 A1* | 4/2022 | Ray | H04N 19/186 |
| 2022/0109884 A1* | 4/2022 | Ramasubramonian | H04N 13/161 |
| 2022/0222863 A1* | 7/2022 | Han | G06T 9/001 |
| 2023/0222701 A1* | 7/2023 | Unno | G06T 9/001 382/240 |
| 2025/0200820 A1* | 6/2025 | Lee | G06T 9/40 |

FOREIGN PATENT DOCUMENTS

| | | |
|---|---|---|
| CN | 114402624 A | 4/2022 |
| EP | 3467778 A1 | 4/2019 |
| TW | 201826792 A | 7/2018 |
| WO | WO 2019/013430 A1 | 1/2019 |
| WO | 2019/055963 A1 | 3/2019 |
| WO | 2019/079397 A1 | 4/2019 |
| WO | WO2019078000 | 4/2019 |
| WO | 2019/198521 A1 | 10/2019 |
| WO | WO 2020/071414 | 4/2020 |
| WO | 2020/162495 A1 | 8/2020 |
| WO | 2021/000205 A1 | 1/2021 |

OTHER PUBLICATIONS

Oh et al., "[G-PCC][New Proposal] Layer structure based PCC slice segmentation," International Organisation for Standardisation, ISO/IEC JTC1/SC29/WG11 MPEG2016/M49198, Jul. 2019, Gothenburg, Sweden, 4 pages.

Sugio, "[G-PCC] Unification of CE13.15 and single layer LoD in TMC13," International Organisation for Standardisation, ISO/IEC JTC1/SC29/WG11 MPEG2019/m47406, Mar. 2019, Geneva, CH, 5 pages.

International Search Report and Written Opinion in International Appln. No. PCT/KR2020/007064, dated Sep. 21, 2020, 15 pages (with English translation).

Mammou et al., "G-PCC codec description v2," N18189, ISO/IEC JTC1/SC29/WG11, Marrakech, MA, Jan. 2019, 39 pages.

Schwarz et al., "Emerging MPEG Standards for Point Cloud Compression," IEEE Journal on Emerging and Selected Topics in Circuits and Systems, Mar. 2019, 9(1):133-148.

Office Action in Chinese Appln. No. 202080047710.3, mailed on Oct. 16, 2024, 17 pages (with English translation).

Office Action in Japanese Appln. No. 2024-115905, mailed on Apr. 30, 2025, 7 pages (with English translation).

* cited by examiner

FIG. 6
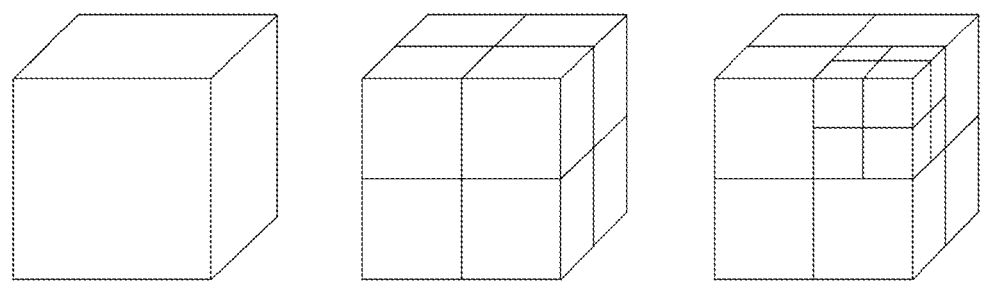
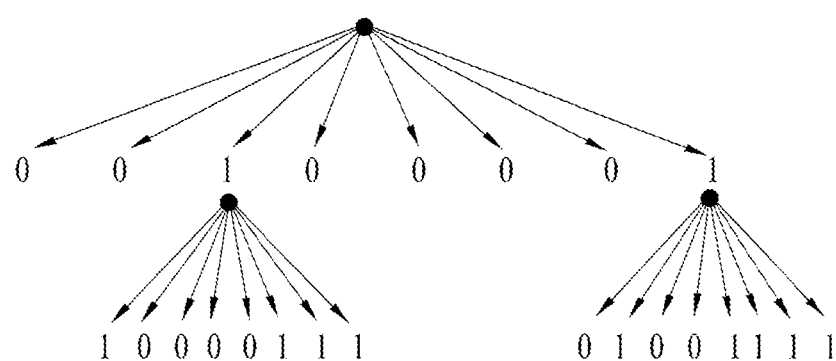

FIG. 7
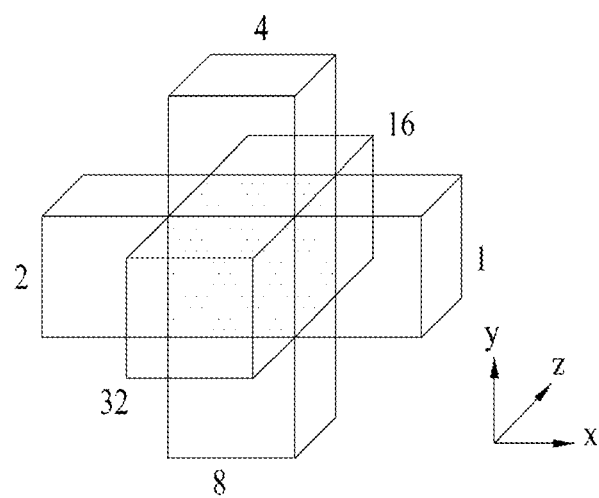
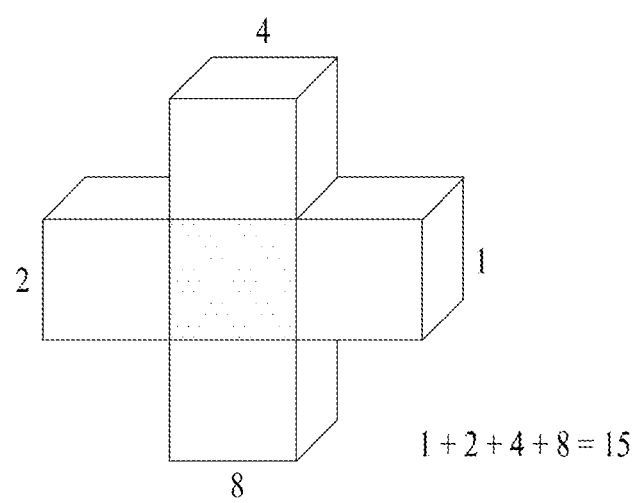
$1 + 2 + 4 + 8 = 15$

FIG. 23

| seq_parameter_set_rbsp( ) { | Descriptor |
|---|---|
|     profile_idc | u(8) |
|     profile_compatibility_flags | u(24) |
|     level_idc | u(8) |
|     sps_bounding_box_present_flag | u(1) |
|     if( sps_bounding_box_present_flag ) { | |
|         sps_bounding_box_offset_x | se(v) |
|         sps_bounding_box_offset_y | se(v) |
|         sps_bounding_box_offset_z | se(v) |
|         sps_bounding_box_scale_factor | ue(v) |
|         sps_bounding_box_size_width | ue(v) |
|         sps_bounding_box_size_height | ue(v) |
|         sps_bounding_box_size_depth | ue(v) |
|     } | |
|     sps_source_scale_factor [Ed. TMC13 v6 uses float, but integer is preferred.] | u(32) |
|     sps_seq_parameter_set_id | ue(v) |
|     sps_num_attribute_sets | ue(v) |
|     for( i = 0; i< sps_num_attribute_sets; i++ ) { | |
|         attribute_dimension[ i ] | ue(v) |
|         attribute_instance_id[ i ] | ue(v) |
|         attribute_bitdepth[ i ] | ue(v) |
|         attribute_cicp_colour_primaries[ i ] | ue(v) |
|         attribute_cicp_transfer_characteristics[ i ] | ue(v) |
|         attribute_cicp_matrix_coeffs[ i ] | ue(v) |
|         attribute_cicp_video_full_range_flag[ i ] | u(1) |
|         known_attribute_label_flag[ i ] | u(1) |
|         if( known_attribute_label_flag[ i ] ) | |
|             known_attribute_label[ i ] | ue(v) |
|         else | |
|             attribute_label_four_bytes[ i ] | u(32) |
|     } | |
|     split_slice_flag | u(1) |
|     if( split_slice_flag ) { | |
|         split_type | u(8) |
|         if (split_type == 0) { | |
|     // LoD | |
|             num_LoD | u(8) |
|             full_res_flag | u(1) |
|             if( full_res_flag ) | |
|                 full_geo_present_flag | u(1) |
|         } | |
|         split_info_present_in_slice_header_flag | u(1) |
|     } | |
|     sps_extension_present_flag | u(1) |
|     if( sps_extension_present_flag ) | |
|         while( more_data_in_byte_stream( ) ) | |
|             sps_extension_data_flag | u(1) |
|     byte_alignment( ) | |
| } | |

APPARATUS AND METHOD FOR PROCESSING POINT CLOUD DATA

CROSS-REFERENCE TO RELATED APPLICATIONS

This application is a National Stage application under 35 U.S.C. § 371 of International Application No. PCT/KR2020/007064, filed on Jun. 1, 2020, which claims the benefit of U.S. Provisional Application No. 62/868,836, filed on Jun. 28, 2019. The disclosures of the prior applications are incorporated by reference in their entirety.

TECHNICAL FIELD

The present disclosure provides a method for providing point cloud contents to provide a user with various services such as virtual reality (VR), augmented reality (AR), mixed reality (MR), and self-driving services.

BACKGROUND ART

Point cloud content is content represented by a point cloud, which is a set of points belonging to a coordinate system representing a three-dimensional space. The point cloud content may express media configured in three dimensions, and is used to provide various services such as virtual reality (VR), augmented reality (AR), mixed reality (MR), and self-driving services. However, tens of thousands to hundreds of thousands of point data are required to represent point cloud content. Therefore, there is a need for a method for efficiently processing a large amount of point data.

DISCLOSURE

Technical Problem

Embodiments provide a device and method for efficiently processing point cloud data. Embodiments provide a point cloud data processing method and device for addressing latency and encoding/decoding complexity.

The technical scope of the embodiments is not limited to the aforementioned technical objects, and may be extended to other technical objects that may be inferred by those skilled in the art based on the entire contents disclosed herein.

Technical Solution

To achieve these objects and other advantages and in accordance with the purpose of the disclosure, in some embodiments, a method for transmitting point cloud data may include: encoding the point cloud data including geometry information and attribute information and transmitting a bitstream including the encoded point cloud data. In some embodiments, the geometry information represents positions of points of the point cloud data and the attribute information represents attributes of the points of the point cloud data.

In some embodiments, a method for processing point cloud data may include receiving a bitstream including the point cloud data. In some embodiments, the point cloud data includes geometry information and attribute information, wherein the geometry information represents positions of points of the point cloud data, and the attribute information represents one or more attributes of the points of the point cloud data. The point cloud data processing method may include decoding the point cloud data.

In some embodiments, a method for processing point cloud data may include receiving a bitstream including the point cloud data and decoding the point cloud data. In some embodiments, the point cloud data includes geometry information and attribute information, wherein the geometry information represents positions of points of the point cloud data, and the attribute information indicating one or more attributes of the points of the point cloud data.

In some embodiments, a device for processing point cloud data may include a receiver configured to receive a bitstream including the point cloud data and a decoder configured to decode the point cloud data. In some embodiments, the point cloud data includes geometry information and attribute information, wherein the geometry information represents positions of points of the point cloud data, and the attribute information indicating one or more attributes of the points of the point cloud data.

Advantageous Effects

Devices and methods according to embodiments may process point cloud data with high efficiency.

The devices and methods according to the embodiments may provide a high-quality point cloud service.

The devices and methods according to the embodiments may provide point cloud content for providing general-purpose services such as a VR service and a self-driving service.

DESCRIPTION OF DRAWINGS

The accompanying drawings, which are included to provide a further understanding of the disclosure and are incorporated in and constitute a part of this application, illustrate embodiment(s) of the disclosure and together with the description serve to explain the principle of the disclosure.

For a better understanding of various embodiments described below, reference should be made to the description of the following embodiments in connection with the accompanying drawings. In the drawings:

FIG. 6 shows an example of an octree and occupancy code according to embodiments;

FIG. 7 shows an example of a neighbor node pattern according to embodiments;

FIG. 23 shows an example of an SPS according to embodiments;

BEST MODE

Reference will now be made in detail to the preferred embodiments of the present disclosure, examples of which are illustrated in the accompanying drawings. The detailed description, which will be given below with reference to the accompanying drawings, is intended to explain exemplary embodiments of the present disclosure, rather than to show the only embodiments that may be implemented according to the present disclosure. The following detailed description includes specific details in order to provide a thorough understanding of the present disclosure. However, it will be apparent to those skilled in the art that the present disclosure may be practiced without such specific details.

Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings.

Figure 1:
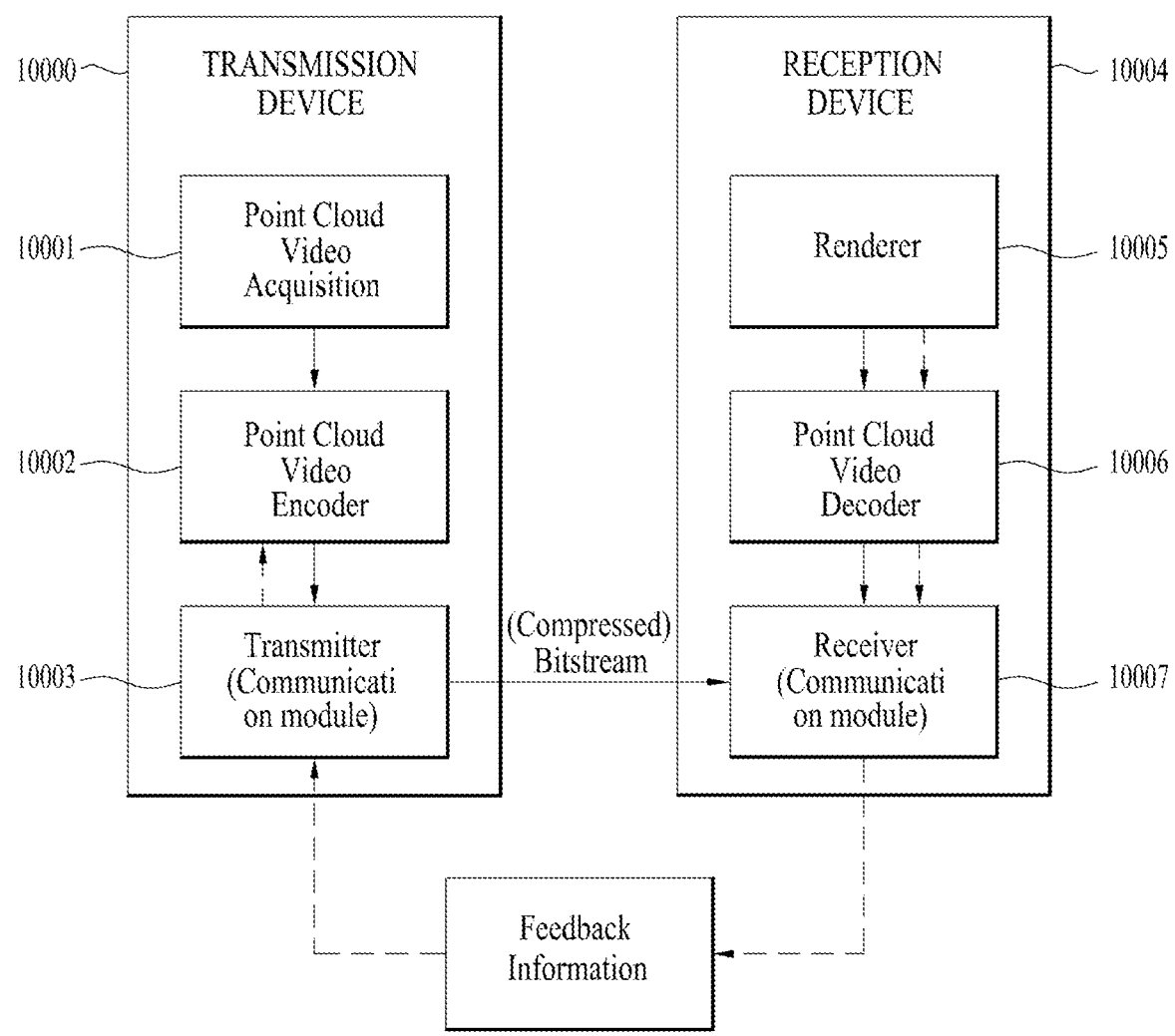
FIG. 1 shows an exemplary point cloud content providing system according to embodiments.

FIG. 1 shows an exemplary point cloud content providing system according to embodiments.

The point cloud content providing system illustrated in FIG. 1 may include a transmission device 10000 and a reception device 10004. The transmission device 10000 and the reception device 10004 are capable of wired or wireless communication to transmit and receive point cloud data.

The point cloud data transmission device 10000 according to the embodiments may secure and process point cloud video (or point cloud content) and transmit the same. According to embodiments, the transmission device 10000 may include a fixed station, a base transceiver system (BTS), a network, an artificial intelligence (AI) device and/or system, a robot, an AR/VR/XR device and/or server. According to embodiments, the transmission device 10000 may include a device, a robot, a vehicle, an AR/VR/XR device, a portable device, a home appliance, an Internet of Thing (IoT) device, and an AI device/server which are configured to perform communication with a base station and/or other wireless devices using a radio access technology (e.g., 5G New RAT (NR), Long Term Evolution (LTE)).

The transmission device 10000 according to the embodiments includes a point cloud video acquirer 10001, a point cloud video encoder 10002, and/or a transmitter (or communication module) 10003.

The point cloud video acquirer 10001 according to the embodiments acquires a point cloud video through a processing process such as capture, synthesis, or generation. The point cloud video is point cloud content represented by a point cloud, which is a set of points positioned in a 3D space, and may be referred to as point cloud video data. The point cloud video according to the embodiments may include one or more frames. One frame represents a still image/picture. Therefore, the point cloud video may include a point cloud image/frame/picture, and may be referred to as a point cloud image, frame, or picture.

The point cloud video encoder 10002 according to the embodiments encodes the acquired point cloud video data. The point cloud video encoder 10002 may encode the point cloud video data based on point cloud compression coding. The point cloud compression coding according to the embodiments may include geometry-based point cloud compression (G-PCC) coding and/or video-based point cloud compression (V-PCC) coding or next-generation coding. The point cloud compression coding according to the embodiments is not limited to the above-described embodiment. The point cloud video encoder 10002 may output a bitstream containing the encoded point cloud video data. The bitstream may contain not only the encoded point cloud video data, but also signaling information related to encoding of the point cloud video data.

The transmitter 10003 according to the embodiments transmits the bitstream containing the encoded point cloud video data. The bitstream according to the embodiments is encapsulated in a file or segment (for example, a streaming segment), and is transmitted over various networks such as a broadcasting network and/or a broadband network. Although not shown in the figure, the transmission device 10000 may include an encapsulator (or an encapsulation module) configured to perform an encapsulation operation. According to embodiments, the encapsulator may be included in the transmitter 10003. According to embodiments, the file or segment may be transmitted to the reception device 10004 over a network, or stored in a digital storage medium (e.g., USB, SD, CD, DVD, Blu-ray, HDD, SSD, etc.). The transmitter 10003 according to the embodiments is capable of wired/wireless communication with the reception device 10004 (or the receiver 10005) over a network of 4G, 5G, 6G, etc. In addition, the transmitter may perform a necessary data processing operation according to the network system (e.g., a 4G, 5G or 6G communication network system). The transmission device 10000 may transmit the encapsulated data in an on-demand manner.

The reception device 10004 according to the embodiments includes a receiver 10005, a point cloud video decoder 10006, and/or a renderer 10007. According to embodiments, the reception device 10004 may include a device, a robot, a vehicle, an AR/VR/XR device, a portable device, a home appliance, an Internet of Things (IoT) device, and an AI device/server which are configured to perform communication with a base station and/or other wireless devices using a radio access technology (e.g., 5G New RAT (NR), Long Term Evolution (LTE)).

The receiver 10005 according to the embodiments receives the bitstream containing the point cloud video data or the file/segment in which the bitstream is encapsulated from the network or storage medium. The receiver 10005 may perform necessary data processing according to the network system (for example, a communication network system of 4G, 5G, 6G, etc.). The receiver 10005 according to the embodiments may decapsulate the received file/segment and output a bitstream. According to embodiments, the receiver 10005 may include a decapsulator (or a decapsulation module) configured to perform a decapsulation operation. The decapsulator may be implemented as an element (or component) separate from the receiver 10005.

The point cloud video decoder 10006 decodes the bitstream containing the point cloud video data. The point cloud video decoder 10006 may decode the point cloud video data according to the method by which the point cloud video data is encoded (for example, in the opposite process of the operation of the point cloud video encoder 10002). Accordingly, the point cloud video decoder 10006 may decode the point cloud video data by performing point cloud decompression coding, which is the inverse process of the point cloud compression. The point cloud decompression coding includes G-PCC coding.

The renderer 10007 renders the decoded point cloud video data. The renderer 10007 may output point cloud content by rendering not only the point cloud video data but also audio data. According to embodiments, the renderer 10007 may include a display configured to display the point cloud content. According to embodiments, the display may be implemented as a separate device or component rather than being included in the renderer 10007.

The arrows indicated by dotted lines in the drawing represent a transmission path of feedback information acquired by the reception device 10004. The feedback information is information for reflecting interactivity with a user who consumes the point cloud content, and includes information about the user (e.g., head orientation information, viewport information, and the like). In particular, when the point cloud content is content for a service (e.g., self-driving service, etc.) that requires interaction with the user, the feedback information may be provided to the content transmitting side (e.g., the transmission device 10000) and/or the service provider. According to embodiments, the feedback information may be used in the reception device 10004 as well as the transmission device 10000, or may not be provided.

The head orientation information according to embodiments is information about the user's head position, orientation, angle, motion, and the like. The reception device 10004 according to the embodiments may calculate the viewport information based on the head orientation information. The viewport information may be information about a region of a point cloud video that the user is viewing. A viewpoint is a point through which the user is viewing the point cloud video, and may refer to a center point of the viewport region. That is, the viewport is a region centered on the viewpoint, and the size and shape of the region may be determined by a field of view (FOV). Accordingly, the reception device 10004 may extract the viewport information based on a vertical or horizontal FOV supported by the device in addition to the head orientation information. Also, the reception device 10004 performs gaze analysis or the like to check the way the user consumes a point cloud, a region that the user gazes at in the point cloud video, a gaze time, and the like. According to embodiments, the reception device 10004 may transmit feedback information including the result of the gaze analysis to the transmission device 10000. The feedback information according to the embodiments may be acquired in the rendering and/or display process. The feedback information according to the embodiments may be secured by one or more sensors included in the reception device 10004. According to embodiments, the feedback information may be secured by the renderer 10007 or a separate external element (or device, component, or the like). The dotted lines in FIG. 1 represent a process of transmitting the feedback information secured by the renderer 10007. The point cloud content providing system may process (encode/decode) point cloud data based on the feedback information. Accordingly, the point cloud video data decoder 10006 may perform a decoding operation based on the feedback information. The reception device 10004 may transmit the feedback information to the transmission device 10000. The transmission device 10000 (or the point cloud video data encoder 10002) may perform an encoding operation based on the feedback information. Accordingly, the point cloud content providing system may efficiently process necessary data (e.g., point cloud data corresponding to the user's head position) based on the feedback information rather than processing (encoding/decoding) the entire point cloud data, and provide point cloud content to the user.

According to embodiments, the transmission device 10000 may be called an encoder, a transmission device, a transmitter, or the like, and the reception device 10004 may be called a decoder, a receiving device, a receiver, or the like.

The point cloud data processed in the point cloud content providing system of FIG. 1 according to embodiments (through a series of processes of acquisition/encoding/transmission/decoding/rendering) may be referred to as point cloud content data or point cloud video data. According to embodiments, the point cloud content data may be used as a concept covering metadata or signaling information related to the point cloud data.

The elements of the point cloud content providing system illustrated in FIG. 1 may be implemented by hardware, software, a processor, and/or a combination thereof.

Figure 2:
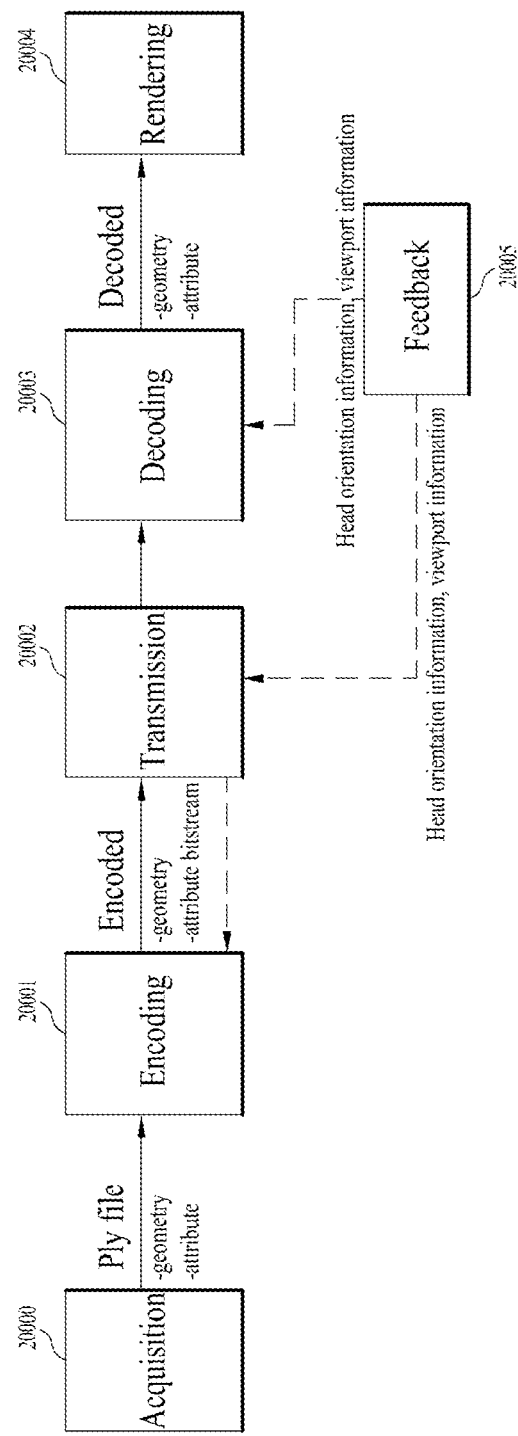
FIG. 2 is a block diagram illustrating a point cloud content providing operation according to embodiments.

FIG. 2 is a block diagram illustrating a point cloud content providing operation according to embodiments.

The block diagram of FIG. 2 shows the operation of the point cloud content providing system described in FIG. 1. As described above, the point cloud content providing system may process point cloud data based on point cloud compression coding (e.g., G-PCC).

The point cloud content providing system according to the embodiments (for example, the point cloud transmission device 10000 or the point cloud video acquirer 10001) may acquire a point cloud video (20000). The point cloud video is represented by a point cloud belonging to a coordinate system for expressing a 3D space. The point cloud video according to the embodiments may include a Ply (Polygon File format or the Stanford Triangle format) file. When the point cloud video has one or more frames, the acquired point cloud video may include one or more Ply files. The Ply files contain point cloud data, such as point geometry and/or attributes. The geometry includes positions of points. The position of each point may be represented by parameters (for example, values of the X, Y, and Z axes) representing a three-dimensional coordinate system (e.g., a coordinate system composed of X, Y and Z axes). The attributes include attributes of points (e.g., information about texture, color (in YCbCr or RGB), reflectance r, transparency, etc. of each point). A point has one or more attributes. For example, a point may have an attribute that is a color, or two attributes that are color and reflectance. According to embodiments, the geometry may be called positions, geometry information, geometry data, or the like, and the attribute may be called attributes, attribute information, attribute data, or the like. The point cloud content providing system (for example, the point cloud transmission device 10000 or the point cloud video acquirer 10001) may secure point cloud data from information (e.g., depth information, color information, etc.) related to the acquisition process of the point cloud video.

The point cloud content providing system (for example, the transmission device 10000 or the point cloud video encoder 10002) according to the embodiments may encode the point cloud data (20001). The point cloud content providing system may encode the point cloud data based on point cloud compression coding. As described above, the point cloud data may include the geometry and attributes of a point. Accordingly, the point cloud content providing system may perform geometry encoding of encoding the geometry and output a geometry bitstream. The point cloud content providing system may perform attribute encoding of encoding attributes and output an attribute bitstream. According to embodiments, the point cloud content providing system may perform the attribute encoding based on the geometry encoding. The geometry bitstream and the attribute bitstream according to the embodiments may be multiplexed and output as one bitstream. The bitstream according to the embodiments may further contain signaling information related to the geometry encoding and attribute encoding.

The point cloud content providing system (for example, the transmission device 10000 or the transmitter 10003) according to the embodiments may transmit the encoded point cloud data (20002). As illustrated in FIG. 1, the encoded point cloud data may be represented by a geometry bitstream and an attribute bitstream. In addition, the encoded point cloud data may be transmitted in the form of a bitstream together with signaling information related to encoding of the point cloud data (for example, signaling information related to the geometry encoding and the attribute encoding). The point cloud content providing system may encapsulate a bitstream that carries the encoded point cloud data and transmit the same in the form of a file or segment.

The point cloud content providing system (for example, the reception device 10004 or the receiver 10005) according to the embodiments may receive the bitstream containing the encoded point cloud data. In addition, the point cloud content providing system (for example, the reception device 10004 or the receiver 10005) may demultiplex the bitstream.

The point cloud content providing system (e.g., the reception device 10004 or the point cloud video decoder 10005) may decode the encoded point cloud data (e.g., the geometry bitstream, the attribute bitstream) transmitted in the bitstream. The point cloud content providing system (for example, the reception device 10004 or the point cloud video decoder 10005) may decode the point cloud video data based on the signaling information related to encoding of the point cloud video data contained in the bitstream. The point cloud content providing system (for example, the reception device 10004 or the point cloud video decoder 10005) may decode the geometry bitstream to reconstruct the positions (geometry) of points. The point cloud content providing system may reconstruct the attributes of the points by decoding the attribute bitstream based on the reconstructed geometry. The point cloud content providing system (for example, the reception device 10004 or the point cloud video decoder 10005) may reconstruct the point cloud video based on the positions according to the reconstructed geometry and the decoded attributes.

The point cloud content providing system according to the embodiments (for example, the reception device 10004 or the renderer 10007) may render the decoded point cloud data (20004). The point cloud content providing system (for example, the reception device 10004 or the renderer 10007) may render the geometry and attributes decoded through the decoding process, using various rendering methods. Points in the point cloud content may be rendered to a vertex having a certain thickness, a cube having a specific minimum size centered on the corresponding vertex position, or a circle centered on the corresponding vertex position. All or part of the rendered point cloud content is provided to the user through a display (e.g., a VR/AR display, a general display, etc.).

The point cloud content providing system (for example, the reception device 10004) according to the embodiments may secure feedback information (20005). The point cloud content providing system may encode and/or decode point cloud data based on the feedback information. The feedback information and the operation of the point cloud content providing system according to the embodiments are the same as the feedback information and the operation described with reference to FIG. 1, and thus detailed description thereof is omitted.

Figure 3:
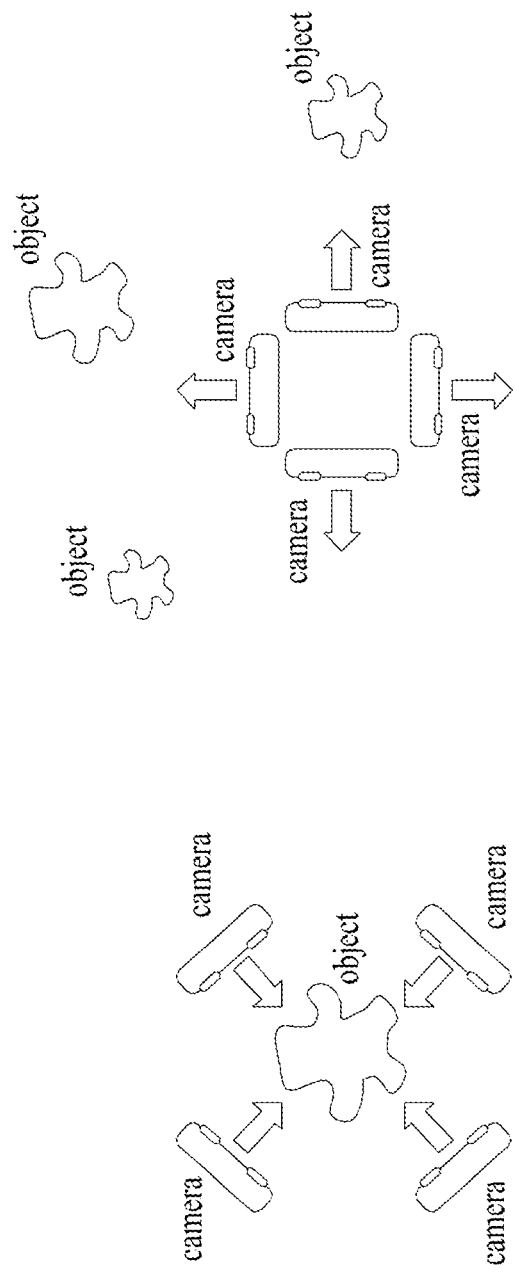
FIG. 3 illustrates an exemplary process of capturing a point cloud video according to embodiments.

FIG. 3 illustrates an exemplary process of capturing a point cloud video according to embodiments.

FIG. 3 illustrates an exemplary point cloud video capture process of the point cloud content providing system described with reference to FIGS. 1 to 2.

Point cloud content includes a point cloud video (images and/or videos) representing an object and/or environment located in various 3D spaces (e.g., a 3D space representing a real environment, a 3D space representing a virtual environment, etc.). Accordingly, the point cloud content providing system according to the embodiments may capture a point cloud video using one or more cameras (e.g., an infrared camera capable of securing depth information, an RGB camera capable of extracting color information corresponding to the depth information, etc.), a projector (e.g., an infrared pattern projector to secure depth information), a LiDAR, or the like. The point cloud content providing system according to the embodiments may extract the shape of geometry composed of points in a 3D space from the depth information and extract the attributes of each point from the color information to secure point cloud data. An image and/or video according to the embodiments may be captured based on at least one of the inward-facing technique and the outward-facing technique.

The left part of FIG. 3 illustrates the inward-facing technique. The inward-facing technique refers to a technique of capturing images a central object with one or more cameras (or camera sensors) positioned around the central object. The inward-facing technique may be used to generate point cloud content providing a 360-degree image of a key object to the user (e.g., VR/AR content providing a 360-degree image of an object (e.g., a key object such as a character, player, object, or actor) to the user).

The right part of FIG. 3 illustrates the outward-facing technique. The outward-facing technique refers to a technique of capturing images an environment of a central object rather than the central object with one or more cameras (or camera sensors) positioned around the central object. The outward-facing technique may be used to generate point cloud content for providing a surrounding environment that appears from the user's point of view (e.g., content representing an external environment that may be provided to a user of a self-driving vehicle).

As shown in the figure, the point cloud content may be generated based on the capturing operation of one or more cameras. In this case, the coordinate system may differ among the cameras, and accordingly the point cloud content providing system may calibrate one or more cameras to set a global coordinate system before the capturing operation. In addition, the point cloud content providing system may generate point cloud content by synthesizing an arbitrary image and/or video with an image and/or video captured by the above-described capture technique. The point cloud content providing system may not perform the capturing operation described in FIG. 3 when it generates point cloud content representing a virtual space. The point cloud content providing system according to the embodiments may perform post-processing on the captured image and/or video. In other words, the point cloud content providing system may remove an unwanted area (for example, a background), recognize a space to which the captured images and/or videos are connected, and, when there is a spatial hole, perform an operation of filling the spatial hole.

The point cloud content providing system may generate one piece of point cloud content by performing coordinate transformation on points of the point cloud video secured from each camera. The point cloud content providing system may perform coordinate transformation on the points based on the coordinates of the position of each camera. Accordingly, the point cloud content providing system may generate content representing one wide range, or may generate point cloud content having a high density of points.

Figure 4:
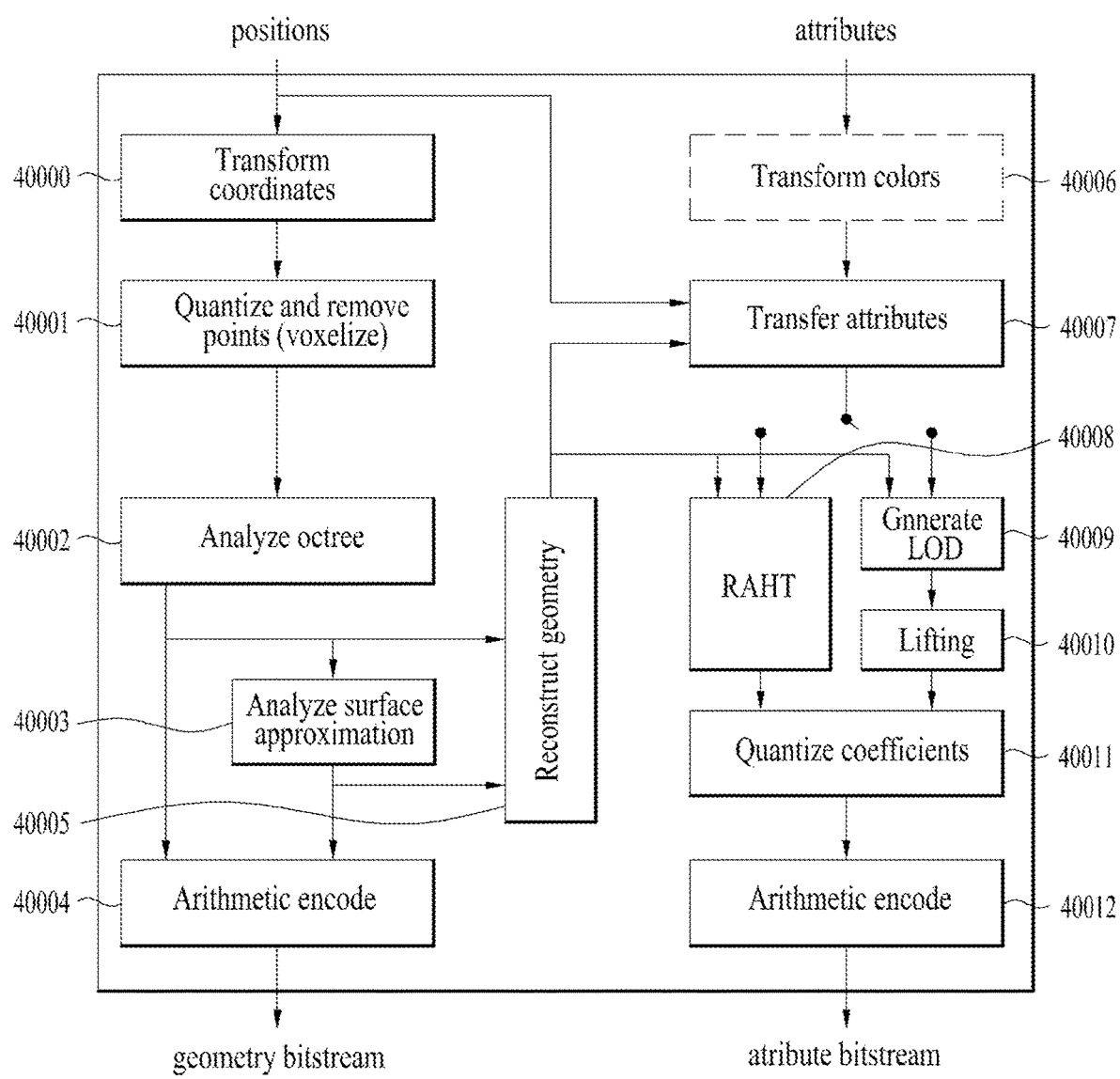
FIG. 4 illustrates an exemplary point cloud encoder according to embodiments.

FIG. 4 illustrates an exemplary point cloud encoder according to embodiments.

FIG. 4 shows an example of the point cloud video encoder 10002 of FIG. 1. The point cloud encoder reconstructs and encodes point cloud data (e.g., positions and/or attributes of the points) to adjust the quality of the point cloud content (to, for example, lossless, lossy, or near-lossless) according to the network condition or applications. When the overall size of the point cloud content is large (e.g., point cloud content of 60 Gbps is given for 30 fps), the point cloud content providing system may fail to stream the content in real time. Accordingly, the point cloud content providing system may reconstruct the point cloud content based on the maximum target bitrate to provide the same in accordance with the network environment or the like.

As described with reference to FIGS. 1 and 2, the point cloud encoder may perform geometry encoding and attribute encoding. The geometry encoding is performed before the attribute encoding.

The point cloud encoder according to the embodiments includes a coordinate transformer (Transform coordinates) 40000, a quantizer (Quantize and remove points (voxelize)) 40001, an octree analyzer (Analyze octree) 40002, and a surface approximation analyzer (Analyze surface approximation) 40003, an arithmetic encoder (Arithmetic encode) 40004, a geometry reconstructor (Reconstruct geometry) 40005, a color transformer (Transform colors) 40006, an attribute transformer (Transform attributes) 40007, a RAHT transformer (RAHT) 40008, an LOD generator (Generate LOD) 40009, a lifting transformer (Lifting) 40010, a coefficient quantizer (Quantize coefficients) 40011, and/or an arithmetic encoder (Arithmetic encode) 40012.

The coordinate transformer 40000, the quantizer 40001, the octree analyzer 40002, the surface approximation analyzer 40003, the arithmetic encoder 40004, and the geometry reconstructor 40005 may perform geometry encoding. The geometry encoding according to the embodiments may include octree geometry coding, direct coding, trisoup geometry encoding, and entropy encoding. The direct coding and trisoup geometry encoding are applied selectively or in combination. The geometry encoding is not limited to the above-described example.

As shown in the figure, the coordinate transformer 40000 according to the embodiments receives positions and transforms the same into coordinates. For example, the positions may be transformed into position information in a three-dimensional space (for example, a three-dimensional space represented by an XYZ coordinate system). The position information in the three-dimensional space according to the embodiments may be referred to as geometry information.

The quantizer 40001 according to the embodiments quantizes the geometry. For example, the quantizer 40001 may quantize the points based on a minimum position value of all points (for example, a minimum value on each of the X, Y, and Z axes). The quantizer 40001 performs a quantization operation of multiplying the difference between the minimum position value and the position value of each point by a preset quantization scale value and then finding the nearest integer value by rounding the value obtained through the multiplication. Thus, one or more points may have the same quantized position (or position value). The quantizer 40001 according to the embodiments performs voxelization based on the quantized positions to reconstruct quantized points. As in the case of a pixel, which is the minimum unit containing 2D image/video information, points of point cloud content (or 3D point cloud video) according to the embodiments may be included in one or more voxels. The term voxel, which is a compound of volume and pixel, refers to a 3D cubic space generated when a 3D space is divided into units (unit=1.0) based on the axes representing the 3D space (e.g., X-axis, Y-axis, and Z-axis). The quantizer 40001 may match groups of points in the 3D space with voxels. According to embodiments, one voxel may include only one point. According to embodiments, one voxel may include one or more points. In order to express one voxel as one point, the position of the center of a voxel may be set based on the positions of one or more points included in the voxel. In this case, attributes of all positions included in one voxel may be combined and assigned to the voxel.

The octree analyzer 40002 according to the embodiments performs octree geometry coding (or octree coding) to present voxels in an octree structure. The octree structure represents points matched with voxels, based on the octal tree structure.

The surface approximation analyzer 40003 according to the embodiments may analyze and approximate the octree. The octree analysis and approximation according to the embodiments is a process of analyzing a region containing a plurality of points to efficiently provide octree and voxelization.

The arithmetic encoder 40004 according to the embodiments performs entropy encoding on the octree and/or the approximated octree. For example, the encoding scheme includes arithmetic encoding. As a result of the encoding, a geometry bitstream is generated.

The color transformer 40006, the attribute transformer 40007, the RAHT transformer 40008, the LOD generator 40009, the lifting transformer 40010, the coefficient quantizer 40011, and/or the arithmetic encoder 40012 perform attribute encoding. As described above, one point may have one or more attributes. The attribute encoding according to the embodiments is equally applied to the attributes that one point has. However, when an attribute (e.g., color) includes one or more elements, attribute encoding is independently applied to each element. The attribute encoding according to the embodiments includes color transform coding, attribute transform coding, region adaptive hierarchical transform (RAHT) coding, interpolation-based hierarchical nearest-neighbor prediction (prediction transform) coding, and interpolation-based hierarchical nearest-neighbor prediction with an update/lifting step (lifting transform) coding. Depending on the point cloud content, the RAHT coding, the prediction transform coding and the lifting transform coding described above may be selectively used, or a combination of one or more of the coding schemes may be used. The attribute encoding according to the embodiments is not limited to the above-described example.

The color transformer 40006 according to the embodiments performs color transform coding of transforming color values (or textures) included in the attributes. For example, the color transformer 40006 may transform the format of color information (for example, from RGB to YCbCr). The operation of the color transformer 40006 according to embodiments may be optionally applied according to the color values included in the attributes.

The geometry reconstructor 40005 according to the embodiments reconstructs (decompresses) the octree and/or the approximated octree. The geometry reconstructor 40005 reconstructs the octree/voxels based on the result of analyzing the distribution of points. The reconstructed octree/voxels may be referred to as reconstructed geometry (restored geometry).

The attribute transformer 40007 according to the embodiments performs attribute transformation to transform the attributes based on the reconstructed geometry and/or the positions on which geometry encoding is not performed. As described above, since the attributes are dependent on the geometry, the attribute transformer 40007 may transform the attributes based on the reconstructed geometry information. For example, based on the position value of a point included in a voxel, the attribute transformer 40007 may transform the attribute of the point at the position. As described above, when the position of the center of a voxel is set based on the positions of one or more points included in the voxel, the attribute transformer 40007 transforms the attributes of the one or more points. When the trisoup geometry encoding is performed, the attribute transformer 40007 may transform the attributes based on the trisoup geometry encoding.

The attribute transformer 40007 may perform the attribute transformation by calculating the average of attributes or attribute values of neighbor points (e.g., color or reflectance of each point) within a specific position/radius from the position (or position value) of the center of each voxel. The attribute transformer 40007 may apply a weight according to the distance from the center to each point in calculating the average. Accordingly, each voxel has a position and a calculated attribute (or attribute value).

The attribute transformer 40007 may search for neighbor points existing within a specific position/radius from the position of the center of each voxel based on the K-D tree or the Morton code. The K-D tree is a binary search tree and supports a data structure capable of managing points based on the positions such that nearest neighbor search (NNS) can be performed quickly. The Morton code is generated by presenting coordinates (e.g., (x, y, z)) representing 3D positions of all points as bit values and mixing the bits. For example, when the coordinates representing the position of a point are (5, 9, 1), the bit values for the coordinates are (0101, 1001, 0001). Mixing the bit values according to the bit index in order of z, y, and x yields 010001000111. This value is expressed as a decimal number of 1095. That is, the Morton code value of the point having coordinates (5, 9, 1) is 1095. The attribute transformer 40007 may order the points based on the Morton code values and perform NNS through a depth-first traversal process. After the attribute transformation operation, the K-D tree or the Morton code is used when the NNS is needed in another transformation process for attribute coding.

As shown in the figure, the transformed attributes are input to the RAHT transformer 40008 and/or the LOD generator 40009.

The RAHT transformer 40008 according to the embodiments performs RAHT coding for predicting attribute information based on the reconstructed geometry information. For example, the RAHT transformer 40008 may predict attribute information of a node at a higher level in the octree based on the attribute information associated with a node at a lower level in the octree.

The LOD generator 40009 according to the embodiments generates a level of detail (LOD) to perform prediction transform coding. The LOD according to the embodiments is a degree of detail of point cloud content. As the LOD value decrease, it indicates that the detail of the point cloud content is degraded. As the LOD value increases, it indicates that the detail of the point cloud content is enhanced. Points may be classified by the LOD.

The lifting transformer 40010 according to the embodiments performs lifting transform coding of transforming the attributes a point cloud based on weights. As described above, lifting transform coding may be optionally applied.

The coefficient quantizer 40011 according to the embodiments quantizes the attribute-coded attributes based on coefficients.

The arithmetic encoder 40012 according to the embodiments encodes the quantized attributes based on arithmetic coding.

Although not shown in the figure, the elements of the point cloud encoder of FIG. 4 may be implemented by hardware including one or more processors or integrated circuits configured to communicate with one or more memories included in the point cloud providing device, software, firmware, or a combination thereof. The one or more processors may perform at least one of the operations and/or functions of the elements of the point cloud encoder of FIG. 4 described above. Additionally, the one or more processors may operate or execute a set of software programs and/or instructions for performing the operations and/or functions of the elements of the point cloud encoder of FIG. 4. The one or more memories according to the embodiments may include a high speed random access memory, or include a non-volatile memory (e.g., one or more magnetic disk storage devices, flash memory devices, or other non-volatile solid-state memory devices).

Figure 5:
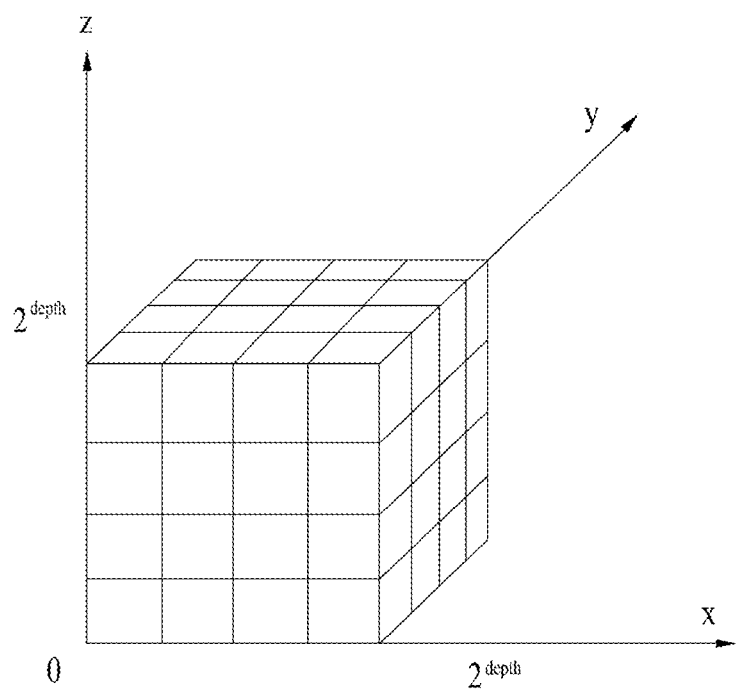
FIG. 5 shows an example of voxels according to embodiments.

FIG. 5 shows an example of voxels according to embodiments.

FIG. 5 shows voxels positioned in a 3D space represented by a coordinate system composed of three axes, which are the X-axis, the Y-axis, and the Z-axis. As described with reference to FIG. 4, the point cloud encoder (e.g., the quantizer 40001) may perform voxelization. Voxel refers to a 3D cubic space generated when a 3D space is divided into units (unit=1.0) based on the axes representing the 3D space (e.g., X-axis, Y-axis, and Z-axis). FIG. 5 shows an example of voxels generated through an octree structure in which a cubical axis-aligned bounding box defined by two poles (0, 0, 0) and (2d, 2d, 2d) is recursively subdivided. One voxel includes at least one point. The spatial coordinates of a voxel may be estimated from the positional relationship with a voxel group. As described above, a voxel has an attribute (such as color or reflectance) like pixels of a 2D image/video. The details of the voxel are the same as those described with reference to FIG. 4, and therefore a description thereof is omitted.

FIG. 6 shows an example of an octree and occupancy code according to embodiments.

As described with reference to FIGS. 1 to 4, the point cloud content providing system (point cloud video encoder 10002) or the point cloud encoder (for example, the octree analyzer 40002) performs octree geometry coding (or octree coding) based on an octree structure to efficiently manage the region and/or position of the voxel.

The upper part of FIG. 6 shows an octree structure. The 3D space of the point cloud content according to the embodiments is represented by axes (e.g., X-axis, Y-axis, and Z-axis) of the coordinate system. The octree structure is created by recursive subdividing of a cubical axis-aligned bounding box defined by two poles (0, 0, 0) and $(2^d, 2^d, 2^d)$. Here, $2^d$ may be set to a value constituting the smallest bounding box surrounding all points of the point cloud content (or point cloud video). Here, d denotes the depth of the octree. The value of d is determined in the following equation. In the following equation, $(x^{int}_n, y^{int}_n, z^{int}_n)$ denotes the positions (or position values) of quantized points.

$$d = \text{Ceil}(\text{Log}_2(\text{Max}(x_n^{int}, y_n^{int}, z_n^{int}, n=1, \ldots, N)+1))$$

As shown in the middle of the upper part of FIG. 6, the entire 3D space may be divided into eight spaces according to partition. Each divided space is represented by a cube with six faces. As shown in the upper right of FIG. 6, each of the eight spaces is divided again based on the axes of the coordinate system (e.g., X-axis, Y-axis, and Z-axis). Accordingly, each space is divided into eight smaller spaces. The divided smaller space is also represented by a cube with six faces. This partitioning scheme is applied until the leaf node of the octree becomes a voxel.

The lower part of FIG. 6 shows an octree occupancy code. The occupancy code of the octree is generated to indicate whether each of the eight divided spaces generated by dividing one space contains at least one point. Accordingly, a single occupancy code is represented by eight child nodes. Each child node represents the occupancy of a divided space, and the child node has a value in 1 bit. Accordingly, the occupancy code is represented as an 8-bit code. That is, when at least one point is contained in the space corresponding to a child node, the node is assigned a value of 1. When no point is contained in the space corresponding to the child node (the space is empty), the node is assigned a value of 0. Since the occupancy code shown in FIG. 6 is 00100001, it indicates that the spaces corresponding to the third child node and the eighth child node among the eight child nodes each contain at least one point. As shown in the figure, each of the third child node and the eighth child node has eight child nodes, and the child nodes are represented by an 8-bit occupancy code. The figure shows that the occupancy code of the third child node is 10000111, and the occupancy code of the eighth child node is 01001111. The point cloud encoder (for example, the arithmetic encoder 40004) according to the embodiments may perform entropy encoding on the occupancy codes. In order to increase the compression efficiency, the point cloud encoder may perform intra/inter-coding on the occupancy codes. The reception device (for example, the reception device 10004 or the point cloud video decoder 10006) according to the embodiments reconstructs the octree based on the occupancy codes.

The point cloud encoder (for example, the point cloud encoder of FIG. 4 or the octree analyzer 40002) according to the embodiments may perform voxelization and octree coding to store the positions of points. However, points are not always evenly distributed in the 3D space, and accordingly there may be a specific region in which fewer points are present. Accordingly, it is inefficient to perform voxelization for the entire 3D space. For example, when a specific region contains few points, voxelization does not need to be performed in the specific region.

Accordingly, for the above-described specific region (or a node other than the leaf node of the octree), the point cloud encoder according to the embodiments may skip voxelization and perform direct coding to directly code the positions of points included in the specific region. The coordinates of a direct coding point according to the embodiments are referred to as direct coding mode (DCM). The point cloud encoder according to the embodiments may also perform trisoup geometry encoding, which is to reconstruct the positions of the points in the specific region (or node) based on voxels, based on a surface model. The trisoup geometry encoding is geometry encoding that represents an object as a series of triangular meshes. Accordingly, the point cloud decoder may generate a point cloud from the mesh surface. The direct coding and trisoup geometry encoding according to the embodiments may be selectively performed. In addition, the direct coding and trisoup geometry encoding according to the embodiments may be performed in combination with octree geometry coding (or octree coding).

To perform direct coding, the option to use the direct mode for applying direct coding should be activated. A node to which direct coding is to be applied is not a leaf node, and points less than a threshold should be present within a specific node. In addition, the total number of points to which direct coding is to be applied should not exceed a preset threshold. When the conditions above are satisfied, the point cloud encoder (or the arithmetic encoder 40004) according to the embodiments may perform entropy coding on the positions (or position values) of the points.

The point cloud encoder (for example, the surface approximation analyzer 40003) according to the embodiments may determine a specific level of the octree (a level less than the depth d of the octree), and the surface model may be used staring with that level to perform trisoup geometry encoding to reconstruct the positions of points in the region of the node based on voxels (Trisoup mode). The point cloud encoder according to the embodiments may specify a level at which trisoup geometry encoding is to be applied. For example, when the specific level is equal to the depth of the octree, the point cloud encoder does not operate in the trisoup mode. In other words, the point cloud encoder according to the embodiments may operate in the trisoup mode only when the specified level is less than the value of depth of the octree. The 3D cube region of the nodes at the specified level according to the embodiments is called a block. One block may include one or more voxels. The block or voxel may correspond to a brick. Geometry is represented as a surface within each block. The surface according to embodiments may intersect with each edge of a block at most once.

One block has 12 edges, and accordingly there are at least 12 intersections in one block. Each intersection is called a vertex (or apex). A vertex present along an edge is detected when there is at least one occupied voxel adjacent to the edge among all blocks sharing the edge. The occupied voxel according to the embodiments refers to a voxel containing a point. The position of the vertex detected along the edge is the average position along the edge of all voxels adjacent to the edge among all blocks sharing the edge.

$$\begin{bmatrix} \sigma_x^2 \\ \sigma_y^2 \\ \sigma_y^2 \end{bmatrix} = \sum_{k=1}^n \begin{bmatrix} \bar{x}_i^2 \\ \bar{y}_i^2 \\ \bar{z}_i^2 \end{bmatrix} \quad 3)$$

The minimum value of the sum is estimated, and the projection process is performed according to the axis with the minimum value. For example, when the element x is the minimum, each vertex is projected on the x-axis with respect to the center of the block, and projected on the (y, z) plane. When the values obtained through projection on the (y, z) plane are (ai, bi), the value of θ is estimated through a tan 2(bi, ai), and the vertices are ordered based on the value of θ. The table below shows a combination of vertices for creating a triangle according to the number of the vertices. The vertices are ordered from 1 to n. The table below shows that for four vertices, two triangles may be constructed according to combinations of vertices. The first triangle may consist of vertices 1, 2, and 3 among the ordered vertices, and the second triangle may consist of vertices 3, 4, and 1 among the ordered vertices.

Table Triangles Formed from Vertices Ordered 1

TABLE 1

| n | Triangles |
|---|---|
| 3 | (1, 2, 3) |
| 4 | (1, 2, 3), (3, 4, 1) |
| 5 | (1, 2, 3), (3, 4, 5), (5, 1, 3) |
| 6 | (1, 2, 3), (3, 4, 5), (5, 6, 1), (1, 3, 5) |
| 7 | (1, 2, 3), (3, 4, 5), (5, 6, 7), (7, 1, 3), (3, 5, 7) |
| 8 | (1, 2, 3), (3, 4, 5), (5, 6, 7), (7, 8, 1), (1, 3, 5), (5, 7, 1) |
| 9 | (1, 2, 3), (3, 4, 5), (5, 6, 7), (7, 8, 9), (9, 1, 3), (3, 5, 7), (7, 9, 3) |
| 10 | (1, 2, 3), (3, 4, 5), (5, 6, 7), (7, 8, 9), (9, 10, 1), (1, 3, 5), (5, 7, 9), (9, 1, 5) |
| 11 | (1, 2, 3), (3, 4, 5), (5, 6, 7), (7, 8, 9), (9, 10, 11), (11, 1, 3), (3, 5, 7), (7, 9, 11), (11, 3, 7) |
| 12 | (1, 2, 3), (3, 4, 5), (5, 6, 7), (7, 8, 9), (9, 10, 11), (11, 12, 1), (1, 3, 5), (5, 7, 9), (9, 11, 1), (1, 5, 9) |

Once the vertex is detected, the point cloud encoder according to the embodiments may perform entropy encoding on the starting point (x, y, z) of the edge, the direction vector (Δx, Δy, Δz) of the edge, and the vertex position value (relative position value within the edge). When the trisoup geometry encoding is applied, the point cloud encoder according to the embodiments (for example, the geometry reconstructor 40005) may generate restored geometry (reconstructed geometry) by performing the triangle reconstruction, up-sampling, and voxelization processes.

The vertices positioned at the edge of the block determine a surface that passes through the block. The surface according to the embodiments is a non-planar polygon. In the triangle reconstruction process, a surface represented by a triangle is reconstructed based on the starting point of the edge, the direction vector of the edge, and the position values of the vertices. The triangle reconstruction process is performed by: 1) calculating the centroid value of each vertex, 2) subtracting the center value from each vertex value, and 3) estimating the sum of the squares of the values obtained by the subtraction.

$$\begin{bmatrix} \mu_x \\ \mu_y \\ \mu_z \end{bmatrix} = \frac{1}{n} \sum_{i=1}^n \begin{bmatrix} x_i \\ y_i \\ z_i \end{bmatrix} \quad 1)$$

$$\begin{bmatrix} \bar{x}_i \\ \bar{y}_i \\ \bar{z}_i \end{bmatrix} = \begin{bmatrix} x_i \\ y_i \\ z_i \end{bmatrix} - \begin{bmatrix} \mu_x \\ \mu_y \\ \mu_z \end{bmatrix} \quad 2)$$

The upsampling process is performed to add points in the middle along the edge of the triangle and perform voxelization. The added points are generated based on the upsampling factor and the width of the block. The added points are called refined vertices. The point cloud encoder according to the embodiments may voxelize the refined vertices. In addition, the point cloud encoder may perform attribute encoding based on the voxelized positions (or position values).

FIG. 7 shows an example of a neighbor node pattern according to embodiments.

In order to increase the compression efficiency of the point cloud video, the point cloud encoder according to the embodiments may perform entropy coding based on context adaptive arithmetic coding.

As described with reference to FIGS. 1 to 6, the point cloud content providing system or the point cloud encoder (for example, the point cloud video encoder 10002, the point cloud encoder or arithmetic encoder 40004 of FIG. 4) may perform entropy coding on the occupancy code immediately. In addition, the point cloud content providing system or the point cloud encoder may perform entropy encoding (intra encoding) based on the occupancy code of the current node and the occupancy of neighboring nodes, or perform entropy encoding (inter encoding) based on the occupancy code of the previous frame. A frame according to embodiments represents a set of point cloud videos generated at the same time. The compression efficiency of intra encoding/inter encoding according to the embodiments may depend on the number of neighboring nodes that are referenced. When the bits increase, the operation becomes complicated, but the encoding may be biased to one side, which may increase the compression efficiency. For example, when a 3-bit context is given, coding needs to be performed using 23=8 methods. The part divided for coding affects the complexity of implementation. Accordingly, it is necessary to meet an appropriate level of compression efficiency and complexity.

FIG. 7 illustrates a process of obtaining an occupancy pattern based on the occupancy of neighbor nodes. The point cloud encoder according to the embodiments determines occupancy of neighbor nodes of each node of the octree and obtains a value of a neighbor pattern. The neighbor node pattern is used to infer the occupancy pattern of the node. The left part of FIG. 7 shows a cube corresponding to a node (a cube positioned in the middle) and six cubes (neighbor nodes) sharing at least one face with the cube. The nodes shown in the figure are nodes of the same depth. The numbers shown in the figure represent weights (1, 2, 4, 8, 16, and 32) associated with the six nodes, respectively. The weights are assigned sequentially according to the positions of neighboring nodes.

The right part of FIG. 7 shows neighbor node pattern values. A neighbor node pattern value is the sum of values multiplied by the weight of an occupied neighbor node (a neighbor node having a point). Accordingly, the neighbor node pattern values are 0 to 63. When the neighbor node pattern value is 0, it indicates that there is no node having a point (no occupied node) among the neighbor nodes of the node. When the neighbor node pattern value is 63, it indicates that all neighbor nodes are occupied nodes. As shown in the figure, since neighbor nodes to which weights 1, 2, 4, and 8 are assigned are occupied nodes, the neighbor node pattern value is 15, the sum of 1, 2, 4, and 8. The point cloud encoder may perform coding according to the neighbor node pattern value (for example, when the neighbor node pattern value is 63, 64 kinds of coding may be performed). According to embodiments, the point cloud encoder may reduce coding complexity by changing a neighbor node pattern value (for example, based on a table by which 64 is changed to 10 or 6).

Figure 8:
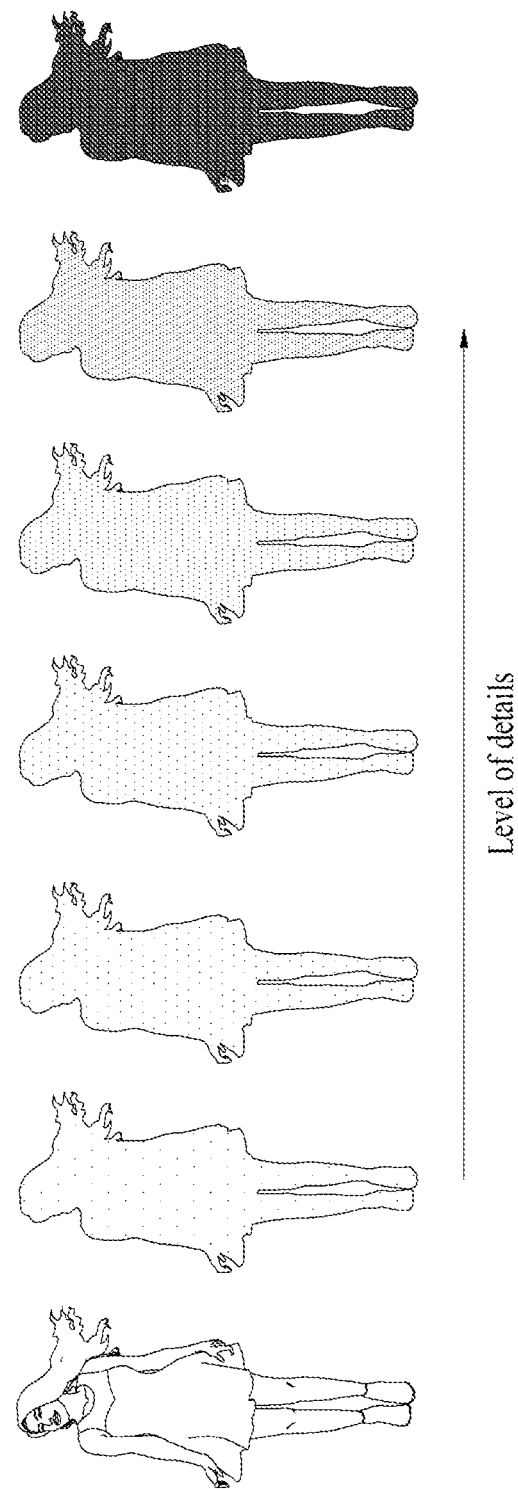
FIG. 8 illustrates an example of point configuration in each LOD according to embodiments.

FIG. 8 illustrates an example of point configuration in each LOD according to embodiments.

As described with reference to FIGS. 1 to 7, encoded geometry is reconstructed (decompressed) before attribute encoding is performed. When direct coding is applied, the geometry reconstruction operation may include changing the placement of direct coded points (e.g., placing the direct coded points in front of the point cloud data). When trisoup geometry encoding is applied, the geometry reconstruction process is performed through triangle reconstruction, up-sampling, and voxelization. Since the attribute depends on the geometry, attribute encoding is performed based on the reconstructed geometry.

The point cloud encoder (for example, the LOD generator 40009) may classify (reorganize) points by LOD. The figure shows the point cloud content corresponding to LODs. The leftmost picture in the figure represents original point cloud content. The second picture from the left of the figure represents distribution of the points in the lowest LOD, and the rightmost picture in the figure represents distribution of the points in the highest LOD. That is, the points in the lowest LOD are sparsely distributed, and the points in the highest LOD are densely distributed. That is, as the LOD rises in the direction pointed by the arrow indicated at the bottom of the figure, the space (or distance) between points is narrowed.

Figure 9:
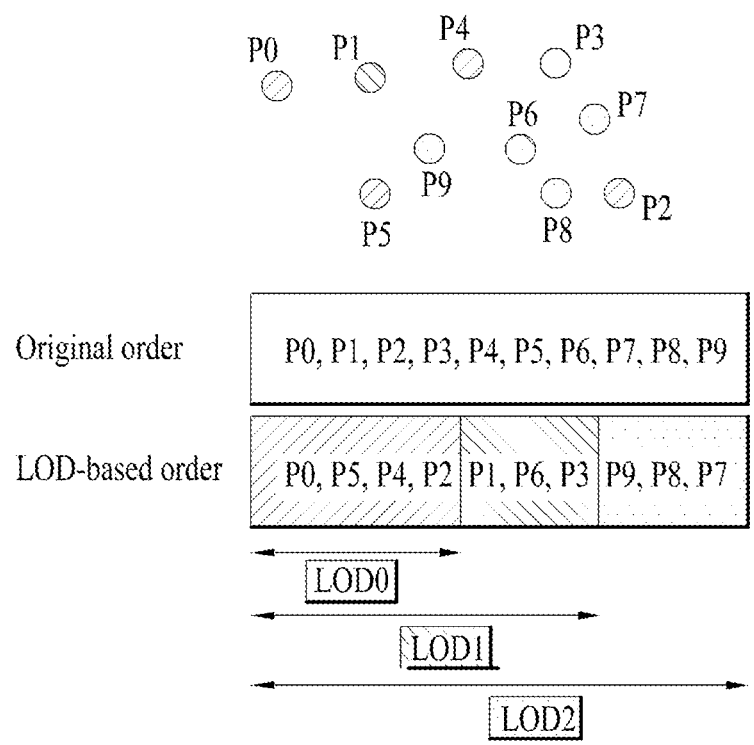
FIG. 9 illustrates an example of point configuration in each LOD according to embodiments.

FIG. 9 illustrates an example of point configuration for each LOD according to embodiments.

As described with reference to FIGS. 1 to 8, the point cloud content providing system, or the point cloud encoder (for example, the point cloud video encoder 10002, the point cloud encoder of FIG. 4, or the LOD generator 40009) may generates an LOD. The LOD is generated by reorganizing the points into a set of refinement levels according to a set LOD distance value (or a set of Euclidean distances). The LOD generation process is performed not only by the point cloud encoder, but also by the point cloud decoder.

The upper part of FIG. 9 shows examples (P0 to P9) of points of the point cloud content distributed in a 3D space. In FIG. 9, the original order represents the order of points P0 to P9 before LOD generation. In FIG. 9, the LOD based order represents the order of points according to the LOD generation. Points are reorganized by LOD. Also, a high LOD contains the points belonging to lower LODs. As shown in FIG. 9, LOD0 contains P0, P5, P4 and P2. LOD1 contains the points of LOD0, P1, P6 and P3. LOD2 contains the points of LOD0, the points of LOD1, P9, P8 and P7.

As described with reference to FIG. 4, the point cloud encoder according to the embodiments may perform prediction transform coding, lifting transform coding, and RAHT transform coding selectively or in combination.

The point cloud encoder according to the embodiments may generate a predictor for points to perform prediction transform coding for setting a predicted attribute (or predicted attribute value) of each point. That is, N predictors may be generated for N points. The predictor according to the embodiments may calculate a weight (=1/distance) based on the LOD value of each point, indexing information about neighbor points present within a set distance for each LOD, and a distance to the neighbor points.

The predicted attribute (or attribute value) according to the embodiments is set to the average of values obtained by multiplying the attributes (or attribute values) (e.g., color, reflectance, etc.) of neighbor points set in the predictor of each point by a weight (or weight value) calculated based on the distance to each neighbor point. The point cloud encoder according to the embodiments (for example, the coefficient quantizer 40011) may quantize and inversely quantize the residuals (which may be called residual attributes, residual attribute values, or attribute prediction residuals) obtained by subtracting a predicted attribute (attribute value) from the attribute (attribute value) of each point. The quantization process is configured as shown in the following table.

Table Attribute Prediction Residuals Quantization Pseudo Code

TABLE 2

```
int PCCQuantization(int value, int quantStep) {
    if( value >=0) {
        return floor(value / quantStep + 1.0 / 3.0);
    } else {
        return -floor(-value / quantStep + 1.0 / 3.0);
    }
}
```

Table Attribute Prediction Residuals Inverse Quantization Pseudo Code

TABLE 3

```
int PCCInverseQuantization(int value, int quantStep) {
    if( quantStep ==0) {
        return value;
    } else {
        return value * quantStep;
    }
}
```

When the predictor of each point has neighbor points, the point cloud encoder (e.g., the arithmetic encoder 40012) according to the embodiments may perform entropy coding on the quantized and inversely quantized residual values as described above. When the predictor of each point has no neighbor point, the point cloud encoder according to the embodiments (for example, the arithmetic encoder 40012) may perform entropy coding on the attributes of the corresponding point without performing the above-described operation.

The point cloud encoder according to the embodiments (for example, the lifting transformer 40010) may generate a predictor of each point, set the calculated LOD and register neighbor points in the predictor, and set weights according to the distances to neighbor points to perform lifting transform coding. The lifting transform coding according to the embodiments is similar to the above-described prediction transform coding, but differs therefrom in that weights are cumulatively applied to attribute values. The process of cumulatively applying weights to the attribute values according to embodiments is configured as follows.

1) Create an array Quantization Weight (QW) for storing the weight value of each point. The initial value of all elements of QW is 1.0. Multiply the QW values of the predictor indexes of the neighbor nodes registered in the predictor by the weight of the predictor of the current point, and add the values obtained by the multiplication.

2) Lift prediction process: Subtract the value obtained by multiplying the attribute value of the point by the weight from the existing attribute value to calculate a predicted attribute value.

3) Create temporary arrays called updateweight and update and initialize the temporary arrays to zero.

4) Cumulatively add the weights calculated by multiplying the weights calculated for all predictors by a weight stored in the QW corresponding to a predictor index to the updateweight array as indexes of neighbor nodes. Cumulatively add, to the update array, a value obtained by multiplying the attribute value of the index of a neighbor node by the calculated weight.

5) Lift update process: Divide the attribute values of the update array for all predictors by the weight value of the updateweight array of the predictor index, and add the existing attribute value to the values obtained by the division.

6) Calculate predicted attributes by multiplying the attribute values updated through the lift update process by the weight updated through the lift prediction process (stored in the QW) for all predictors. The point cloud encoder (e.g., coefficient quantizer 40011) according to the embodiments quantizes the predicted attribute values. In addition, the point cloud encoder (e.g., the arithmetic encoder 40012) performs entropy coding on the quantized attribute values.

The point cloud encoder (for example, the RAHT transformer 40008) according to the embodiments may perform RAHT transform coding in which attributes of nodes of a higher level are predicted using the attributes associated with nodes of a lower level in the octree. RAHT transform coding is an example of attribute intra coding through an octree backward scan. The point cloud encoder according to the embodiments scans the entire region from the voxel and repeats the merging process of merging the voxels into a larger block at each step until the root node is reached. The merging process according to the embodiments is performed only on the occupied nodes. The merging process is not performed on the empty node. The merging process is performed on an upper node immediately above the empty node.

The equation below represents a RAHT transformation matrix. In the equation, $g_{l_{x,y,z}}$ denotes the average attribute value of voxels at level l. $g_{l_{x,y,z}}$ may be calculated based on $g_{l+1_{2x,y,z}}$ and $g_{l+1_{2x+1,y,z}}$. The weights for $g_{l_{x,y,z}}$ and $g_{l_{2x+1,y,z}}$ are $w1 = w_{l_{2x,y,z}}$ and $w2 = w_{l_{2x+1,y,z}}$.

$$\begin{bmatrix} g_{l-1_{x,y,z}} \\ h_{l-1_{x,y,z}} \end{bmatrix} = T_{w1w2} \begin{bmatrix} g_{l_{2x,y,z}} \\ g_{l_{2x+1,y,z}} \end{bmatrix} \quad T_{w1w2} = \frac{1}{\sqrt{w1+w2}} \begin{bmatrix} \sqrt{w1} & \sqrt{w2} \\ -\sqrt{w2} & \sqrt{w1} \end{bmatrix}$$

Here, $g_{l-1_{x,y,z}}$ is a low-pass value and is used in the merging process at the next higher level. $h_{l-1_{x,y,z}}$ denotes high-pass coefficients. The high-pass coefficients at each step are quantized and subjected to entropy coding (for example, encoding by the arithmetic encoder 400012). The weights are calculated as $w_{l-1_{x,y,z}} = w_{l_{2x,y,z}} + w_{l_{2x+1,y,z}}$. The root node is created through the $g_{1_{0,0,0}}$ and $g_{1_{0,0,1}}$ as follows.

$$\begin{bmatrix} gDC \\ h_{0_{0,0,0}} \end{bmatrix} = T_{w1000 \ w1001} \begin{bmatrix} g_{1_{0,0,0z}} \\ g_{1_{0,0,1}} \end{bmatrix}$$

The value of gDC is also quantized and subjected to entropy coding like the high-pass coefficients.

Figure 10:
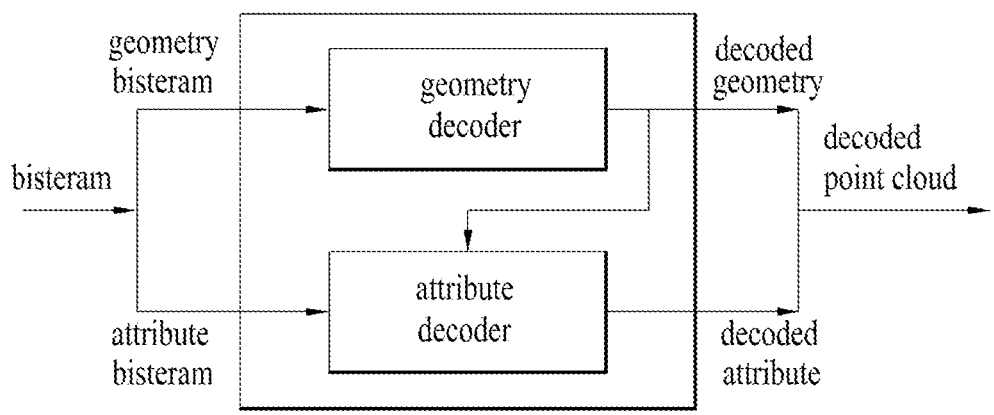
FIG. 10 illustrates an exemplary point cloud decoder according to embodiments.

FIG. 10 illustrates a point cloud decoder according to embodiments.

The point cloud decoder illustrated in FIG. 10 is an example of the point cloud video decoder 10006 described in FIG. 1, and may perform the same or similar operations as the operations of the point cloud video decoder 10006 illustrated in FIG. 1. As shown in the figure, the point cloud decoder may receive a geometry bitstream and an attribute bitstream contained in one or more bitstreams. The point cloud decoder includes a geometry decoder and an attribute decoder. The geometry decoder performs geometry decoding on the geometry bitstream and outputs decoded geometry. The attribute decoder performs attribute decoding based on the decoded geometry and the attribute bitstream, and outputs decoded attributes. The decoded geometry and decoded attributes are used to reconstruct point cloud content (a decoded point cloud).

Figure 11:
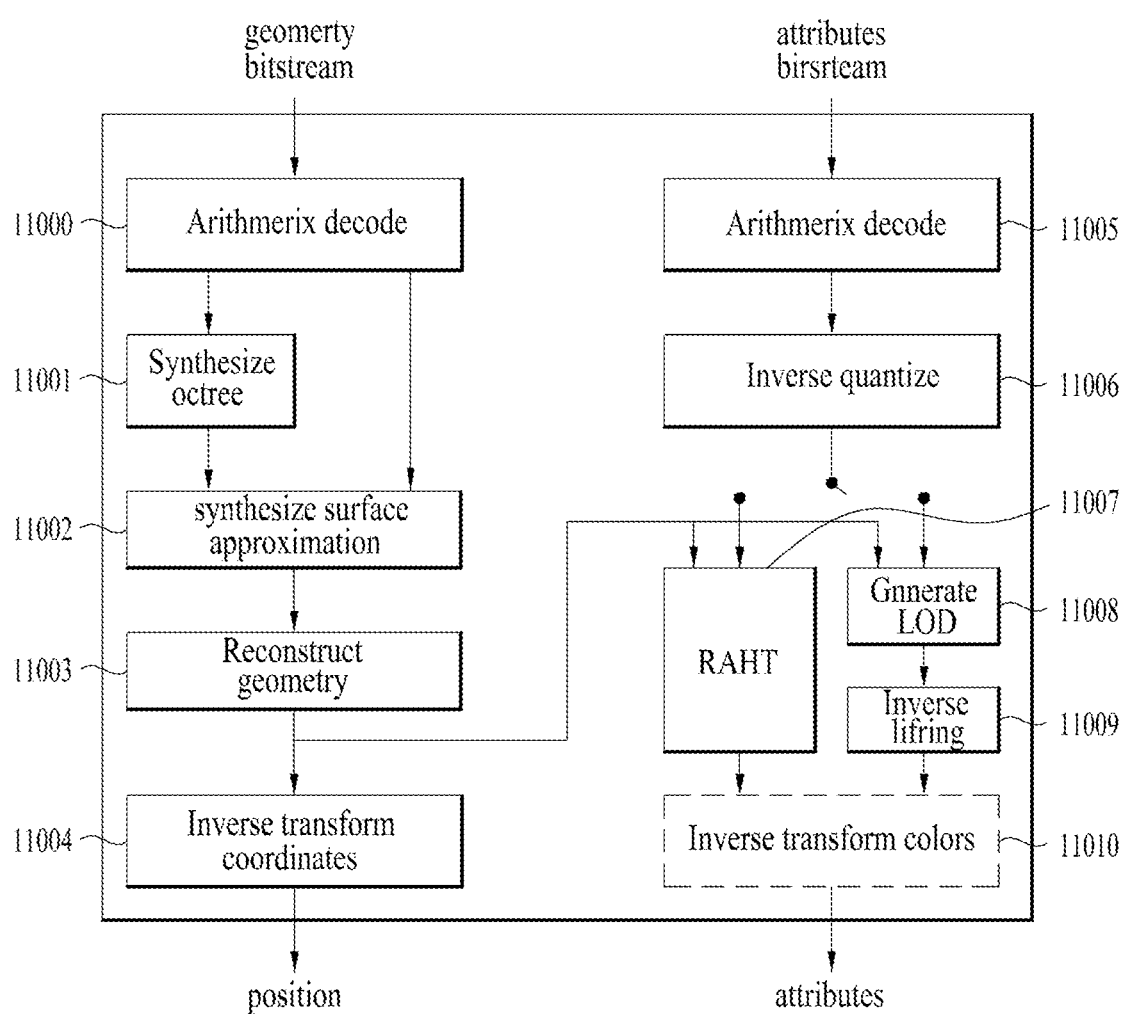
FIG. 11 illustrates an exemplary point cloud decoder according to embodiments.

FIG. 11 illustrates a point cloud decoder according to embodiments.

The point cloud decoder illustrated in FIG. 11 is an example of the point cloud decoder illustrated in FIG. 10, and may perform a decoding operation, which is an inverse process of the encoding operation of the point cloud encoder illustrated in FIGS. 1 to 9.

As described with reference to FIGS. 1 and 10, the point cloud decoder may perform geometry decoding and attribute decoding. The geometry decoding is performed before the attribute decoding.

The point cloud decoder according to the embodiments includes an arithmetic decoder (Arithmetic decode) 11000, an octree synthesizer (Synthesize octree) 11001, a surface approximation synthesizer (Synthesize surface approximation) 11002, and a geometry reconstructor (Reconstruct geometry) 11003, a coordinate inverse transformer (Inverse transform coordinates) 11004, an arithmetic decoder (Arithmetic decode) 11005, an inverse quantizer (Inverse quantize) 11006, a RAHT transformer 11007, an LOD generator (Generate LOD) 11008, an inverse lifter (inverse lifting) 11009, and/or a color inverse transformer (Inverse transform colors) 11010.

The arithmetic decoder 11000, the octree synthesizer 11001, the surface approximation synthesizer 11002, and the geometry reconstructor 11003, and the coordinate inverse transformer 11004 may perform geometry decoding. The geometry decoding according to the embodiments may include direct coding and trisoup geometry decoding. The direct coding and trisoup geometry decoding are selectively applied. The geometry decoding is not limited to the above-described example, and is performed as an inverse process of the geometry encoding described with reference to FIGS. 1 to 9.

The arithmetic decoder 11000 according to the embodiments decodes the received geometry bitstream based on the arithmetic coding. The operation of the arithmetic decoder 11000 corresponds to the inverse process of the arithmetic encoder 40004.

The octree synthesizer 11001 according to the embodiments may generate an octree by acquiring an occupancy code from the decoded geometry bitstream (or information on the geometry secured as a result of decoding). The occupancy code is configured as described in detail with reference to FIGS. 1 to 9.

When the trisoup geometry encoding is applied, the surface approximation synthesizer 11002 according to the embodiments may synthesize a surface based on the decoded geometry and/or the generated octree.

The geometry reconstructor 11003 according to the embodiments may regenerate geometry based on the surface and/or the decoded geometry. As described with reference to FIGS. 1 to 9, direct coding and trisoup geometry encoding are selectively applied. Accordingly, the geometry reconstructor 11003 directly imports and adds position information about the points to which direct coding is applied. When the trisoup geometry encoding is applied, the geometry reconstructor 11003 may reconstruct the geometry by performing the reconstruction operations of the geometry reconstructor 40005, for example, triangle reconstruction, up-sampling, and voxelization. Details are the same as those described with reference to FIG. 6, and thus description thereof is omitted. The reconstructed geometry may include a point cloud picture or frame that does not contain attributes.

The coordinate inverse transformer 11004 according to the embodiments may acquire positions of the points by transforming the coordinates based on the reconstructed geometry.

The arithmetic decoder 11005, the inverse quantizer 11006, the RAHT transformer 11007, the LOD generator 11008, the inverse lifter 11009, and/or the color inverse transformer 11010 may perform the attribute decoding described with reference to FIG. 10. The attribute decoding according to the embodiments includes region adaptive hierarchical transform (RAHT) decoding, interpolation-based hierarchical nearest-neighbor prediction (prediction transform) decoding, and interpolation-based hierarchical nearest-neighbor prediction with an update/lifting step (lifting transform) decoding. The three decoding schemes described above may be used selectively, or a combination of one or more decoding schemes may be used. The attribute decoding according to the embodiments is not limited to the above-described example.

The arithmetic decoder 11005 according to the embodiments decodes the attribute bitstream by arithmetic coding.

The inverse quantizer 11006 according to the embodiments inversely quantizes the information about the decoded attribute bitstream or attributes secured as a result of the decoding, and outputs the inversely quantized attributes (or attribute values). The inverse quantization may be selectively applied based on the attribute encoding of the point cloud encoder.

According to embodiments, the RAHT transformer 11007, the LOD generator 11008, and/or the inverse lifter 11009 may process the reconstructed geometry and the inversely quantized attributes. As described above, the RAHT transformer 11007, the LOD generator 11008, and/or the inverse lifter 11009 may selectively perform a decoding operation corresponding to the encoding of the point cloud encoder.

The color inverse transformer 11010 according to the embodiments performs inverse transform coding to inversely transform a color value (or texture) included in the decoded attributes. The operation of the color inverse transformer 11010 may be selectively performed based on the operation of the color transformer 40006 of the point cloud encoder.

Although not shown in the figure, the elements of the point cloud decoder of FIG. 11 may be implemented by hardware including one or more processors or integrated circuits configured to communicate with one or more memories included in the point cloud providing device, software, firmware, or a combination thereof. The one or more processors may perform at least one or more of the operations and/or functions of the elements of the point cloud decoder of FIG. 11 described above. Additionally, the one or more processors may operate or execute a set of software programs and/or instructions for performing the operations and/or functions of the elements of the point cloud decoder of FIG. 11.

Figure 12:
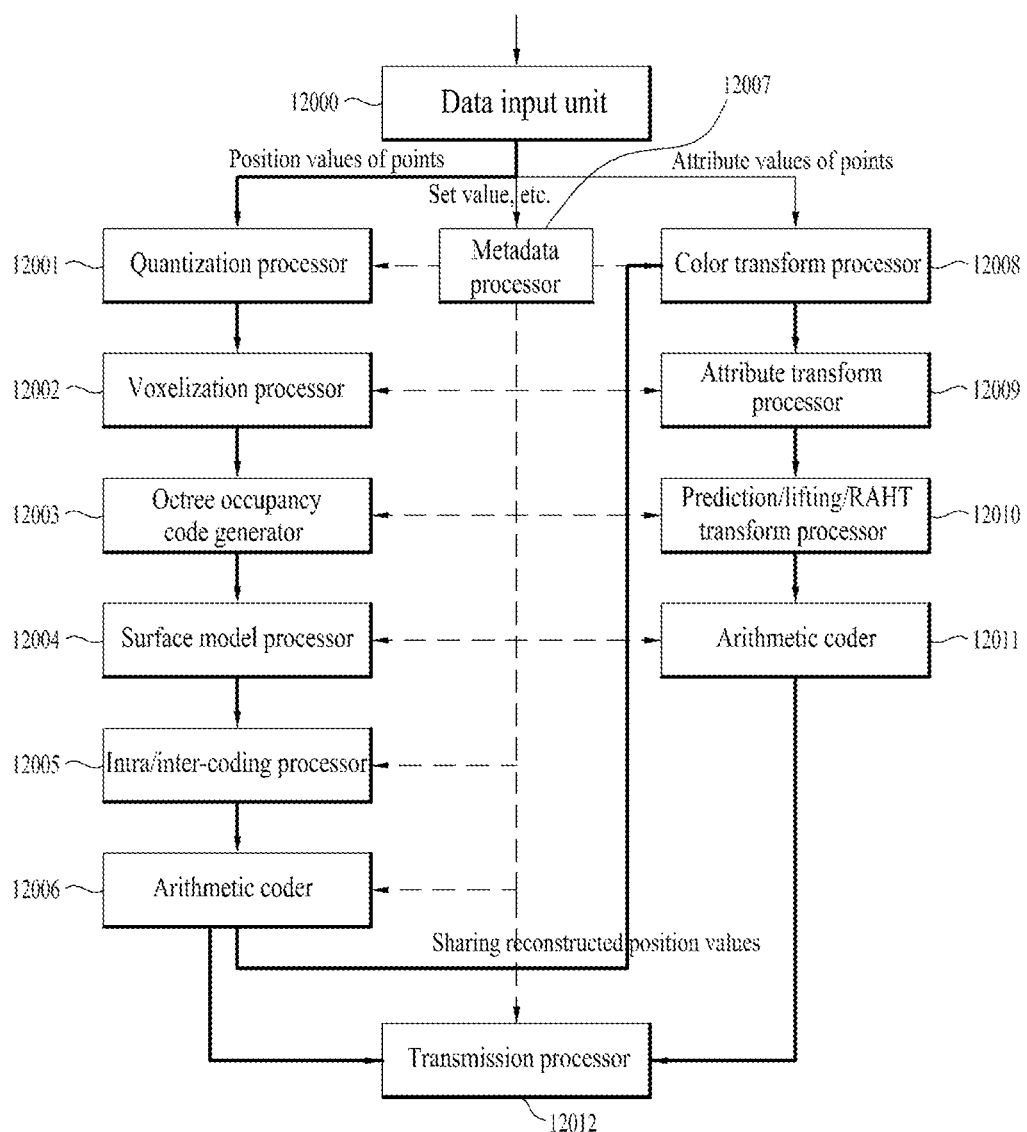
FIG. 12 illustrates an exemplary transmission device according to embodiments.

FIG. 12 illustrates an exemplary transmission device according to embodiments.

The transmission device shown in FIG. 12 is an example of the transmission device 10000 of FIG. 1 (or the point cloud encoder of FIG. 4). The transmission device illustrated in FIG. 12 may perform one or more of the operations and methods the same or similar to those of the point cloud encoder described with reference to FIGS. 1 to 9. The transmission device according to the embodiments may include a data input unit 12000, a quantization processor 12001, a voxelization processor 12002, an octree occupancy code generator 12003, a surface model processor 12004, an intra/inter-coding processor 12005, an arithmetic coder 12006, a metadata processor 12007, a color transform processor 12008, an attribute transform processor 12009, a prediction/lifting/RAHT transform processor 12010, an arithmetic coder 12011 and/or a transmission processor 12012.

The data input unit 12000 according to the embodiments receives or acquires point cloud data. The data input unit 12000 may perform an operation and/or acquisition method the same or similar to the operation and/or acquisition method of the point cloud video acquirer 10001 (or the acquisition process 20000 described with reference to FIG. 2).

The data input unit 12000, the quantization processor 12001, the voxelization processor 12002, the octree occupancy code generator 12003, the surface model processor 12004, the intra/inter-coding processor 12005, and the arithmetic coder 12006 perform geometry encoding. The geometry encoding according to the embodiments is the same or similar to the geometry encoding described with reference to FIGS. 1 to 9, and thus a detailed description thereof is omitted.

The quantization processor 12001 according to the embodiments quantizes geometry (e.g., position values of points). The operation and/or quantization of the quantization processor 12001 is the same or similar to the operation and/or quantization of the quantizer 40001 described with reference to FIG. 4. Details are the same as those described with reference to FIGS. 1 to 9.

The voxelization processor 12002 according to the embodiments voxelizes the quantized position values of the points. The voxelization processor 120002 may perform an operation and/or process the same or similar to the operation and/or the voxelization process of the quantizer 40001 described with reference to FIG. 4. Details are the same as those described with reference to FIGS. 1 to 9.

The octree occupancy code generator 12003 according to the embodiments performs octree coding on the voxelized positions of the points based on an octree structure. The octree occupancy code generator 12003 may generate an occupancy code. The octree occupancy code generator 12003 may perform an operation and/or method the same or similar to the operation and/or method of the point cloud encoder (or the octree analyzer 40002) described with reference to FIGS. 4 and 6. Details are the same as those described with reference to FIGS. 1 to 9.

The surface model processor 12004 according to the embodiments may perform trisoup geometry encoding based on a surface model to reconstruct the positions of points in a specific region (or node) on a voxel basis. The surface model processor 12004 may perform an operation and/or method the same or similar to the operation and/or method of the point cloud encoder (for example, the surface approximation analyzer 40003) described with reference to FIG. 4. Details are the same as those described with reference to FIGS. 1 to 9.

The intra/inter-coding processor 12005 according to the embodiments may perform intra/inter-coding on point cloud data. The intra/inter-coding processor 12005 may perform coding the same or similar to the intra/inter-coding described with reference to FIG. 7. Details are the same as those described with reference to FIG. 7. According to embodiments, the intra/inter-coding processor 12005 may be included in the arithmetic coder 12006.

The arithmetic coder 12006 according to the embodiments performs entropy encoding on an octree of the point cloud data and/or an approximated octree. For example, the encoding scheme includes arithmetic encoding. The arithmetic coder 12006 performs an operation and/or method the same or similar to the operation and/or method of the arithmetic encoder 40004.

The metadata processor 12007 according to the embodiments processes metadata about the point cloud data, for example, a set value, and provides the same to a necessary processing process such as geometry encoding and/or attribute encoding. Also, the metadata processor 12007 according to the embodiments may generate and/or process signaling information related to the geometry encoding and/or the attribute encoding. The signaling information according to the embodiments may be encoded separately from the geometry encoding and/or the attribute encoding. The signaling information according to the embodiments may be interleaved.

The color transform processor 12008, the attribute transform processor 12009, the prediction/lifting/RAHT transform processor 12010, and the arithmetic coder 12011 perform the attribute encoding. The attribute encoding according to the embodiments is the same or similar to the attribute encoding described with reference to FIGS. 1 to 9, and thus a detailed description thereof is omitted.

The color transform processor 12008 according to the embodiments performs color transform coding to transform color values included in attributes. The color transform processor 12008 may perform color transform coding based on the reconstructed geometry. The reconstructed geometry is the same as described with reference to FIGS. 1 to 9. Also, it performs an operation and/or method the same or similar to the operation and/or method of the color transformer 40006 described with reference to FIG. 4 is performed. The detailed description thereof is omitted.

The attribute transform processor 12009 according to the embodiments performs attribute transformation to transform the attributes based on the reconstructed geometry and/or the positions on which geometry encoding is not performed. The attribute transform processor 12009 performs an operation and/or method the same or similar to the operation and/or method of the attribute transformer 40007 described with reference to FIG. 4. The detailed description thereof is omitted. The prediction/lifting/RAHT transform processor 12010 according to the embodiments may code the transformed attributes by any one or a combination of RAHT coding, prediction transform coding, and lifting transform coding. The prediction/lifting/RAHT transform processor 12010 performs at least one of the operations the same or similar to the operations of the RAHT transformer 40008, the LOD generator 40009, and the lifting transformer 40010 described with reference to FIG. 4. In addition, the prediction transform coding, the lifting transform coding, and the RAHT transform coding are the same as those described with reference to FIGS. 1 to 9, and thus a detailed description thereof is omitted.

The arithmetic coder 12011 according to the embodiments may encode the coded attributes based on the arithmetic coding. The arithmetic coder 12011 performs an operation and/or method the same or similar to the operation and/or method of the arithmetic encoder 400012.

The transmission processor 12012 according to the embodiments may transmit each bitstream containing encoded geometry and/or encoded attributes and metadata information, or transmit one bitstream configured with the encoded geometry and/or the encoded attributes and the metadata information. When the encoded geometry and/or the encoded attributes and the metadata information according to the embodiments are configured into one bitstream, the bitstream may include one or more sub-bitstreams. The bitstream according to the embodiments may contain signaling information including a sequence parameter set (SPS) for signaling of a sequence level, a geometry parameter set (GPS) for signaling of geometry information coding, an attribute parameter set (APS) for signaling of attribute information coding, and a tile parameter set (TPS) for signaling of a tile level, and slice data. The slice data may include information about one or more slices. One slice according to embodiments may include one geometry bitstream Geom0⁰ and one or more attribute bitstreams Attr0⁰ and Attr1⁰. The TPS according to the embodiments may include information about each tile (for example, coordinate information and height/size information about a bounding box) for one or more tiles. The geometry bitstream may contain a header and a payload. The header of the geometry bitstream according to the embodiments may contain a parameter set identifier (geom_parameter_set_id), a tile identifier (geom_tile_id) and a slice identifier (geom_slice_id) included in the GPS, and information about the data contained in the payload. As described above, the metadata processor 12007 according to the embodiments may generate and/or process the signaling information and transmit the same to the transmission processor 12012. According to embodiments, the elements to perform geometry encoding and the elements to perform attribute encoding may share data/information with each other as indicated by dotted lines. The transmission processor 12012 according to the embodiments may perform an operation and/or transmission method the same or similar to the operation and/or transmission method of the transmitter 10003. Details are the same as those described with reference to FIGS. 1 and 2, and thus a description thereof is omitted.

Figure 13:
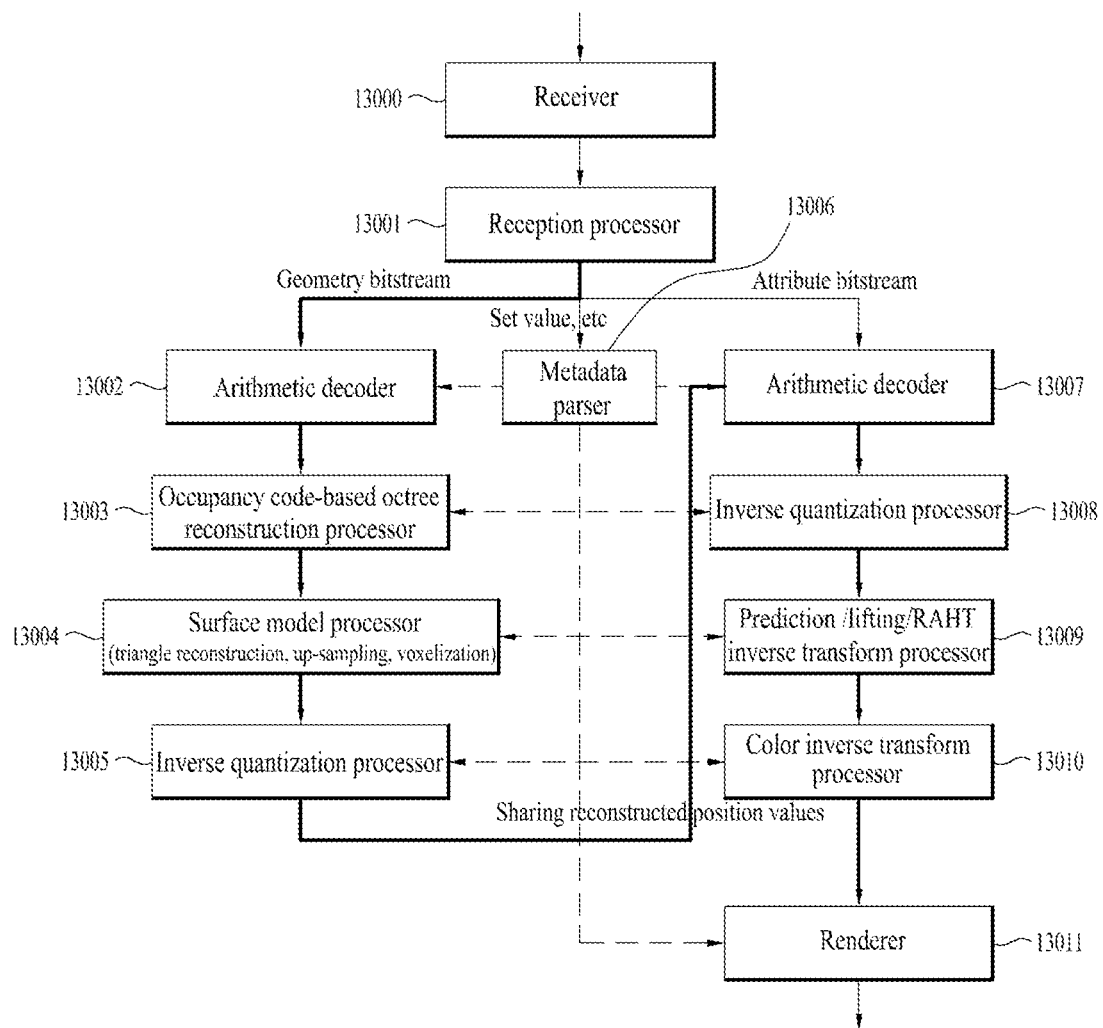
FIG. 13 illustrates an exemplary reception device according to embodiments.

FIG. 13 illustrates an exemplary reception device according to embodiments.

The reception device illustrated in FIG. 13 is an example of the reception device 10004 of FIG. 1 (or the point cloud decoder of FIGS. 10 and 11). The reception device illustrated in FIG. 13 may perform one or more of the operations and methods the same or similar to those of the point cloud decoder described with reference to FIGS. 1 to 11.

The reception device according to the embodiment includes a receiver 13000, a reception processor 13001, an arithmetic decoder 13002, an occupancy code-based octree reconstruction processor 13003, a surface model processor (triangle reconstruction, up-sampling, voxelization) 13004, an inverse quantization processor 13005, a metadata parser 13006, an arithmetic decoder 13007, an inverse quantization processor 13008, a prediction/lifting/RAHT inverse transform processor 13009, a color inverse transform processor 13010, and/or a renderer 13011. Each element for decoding according to the embodiments may perform an inverse process of the operation of a corresponding element for encoding according to the embodiments.

The receiver 13000 according to the embodiments receives point cloud data. The receiver 13000 may perform an operation and/or reception method the same or similar to the operation and/or reception method of the receiver 10005 of FIG. 1. The detailed description thereof is omitted.

The reception processor 13001 according to the embodiments may acquire a geometry bitstream and/or an attribute bitstream from the received data. The reception processor 13001 may be included in the receiver 13000.

The arithmetic decoder 13002, the occupancy code-based octree reconstruction processor 13003, the surface model processor 13004, and the inverse quantization processor 1305 may perform geometry decoding. The geometry decoding according to embodiments is the same or similar to the geometry decoding described with reference to FIGS. 1 to 10, and thus a detailed description thereof is omitted.

The arithmetic decoder 13002 according to the embodiments may decode the geometry bitstream based on arithmetic coding. The arithmetic decoder 13002 performs an operation and/or coding the same or similar to the operation and/or coding of the arithmetic decoder 11000.

The occupancy code-based octree reconstruction processor 13003 according to the embodiments may reconstruct an octree by acquiring an occupancy code from the decoded geometry bitstream (or information about the geometry secured as a result of decoding). The occupancy code-based octree reconstruction processor 13003 performs an operation and/or method the same or similar to the operation and/or octree generation method of the octree synthesizer 11001. When the trisoup geometry encoding is applied, the surface model processor 1302 according to the embodiments may perform trisoup geometry decoding and related geometry reconstruction (for example, triangle reconstruction, up-sampling, voxelization) based on the surface model method. The surface model processor 1302 performs an operation the same or similar to that of the surface approximation synthesizer 11002 and/or the geometry reconstructor 11003.

The inverse quantization processor 1305 according to the embodiments may inversely quantize the decoded geometry.

The metadata parser 1306 according to the embodiments may parse metadata contained in the received point cloud data, for example, a set value. The metadata parser 1306 may pass the metadata to geometry decoding and/or attribute decoding. The metadata is the same as that described with reference to FIG. 12, and thus a detailed description thereof is omitted.

The arithmetic decoder 13007, the inverse quantization processor 13008, the prediction/lifting/RAHT inverse transform processor 13009 and the color inverse transform processor 13010 perform attribute decoding. The attribute decoding is the same or similar to the attribute decoding described with reference to FIGS. 1 to 10, and thus a detailed description thereof is omitted.

The arithmetic decoder 13007 according to the embodiments may decode the attribute bitstream by arithmetic coding. The arithmetic decoder 13007 may decode the attribute bitstream based on the reconstructed geometry. The arithmetic decoder 13007 performs an operation and/or coding the same or similar to the operation and/or coding of the arithmetic decoder 11005.

The inverse quantization processor 13008 according to the embodiments may inversely quantize the decoded attribute bitstream. The inverse quantization processor 13008 performs an operation and/or method the same or similar to the operation and/or inverse quantization method of the inverse quantizer 11006.

The prediction/lifting/RAHT inverse transformer 13009 according to the embodiments may process the reconstructed geometry and the inversely quantized attributes. The prediction/lifting/RAHT inverse transform processor 1301 performs one or more of operations and/or decoding the same or similar to the operations and/or decoding of the RAHT transformer 11007, the LOD generator 11008, and/or the inverse lifter 11009. The color inverse transform processor 13010 according to the embodiments performs inverse transform coding to inversely transform color values (or textures) included in the decoded attributes. The color inverse transform processor 13010 performs an operation and/or inverse transform coding the same or similar to the operation and/or inverse transform coding of the color inverse transformer 11010. The renderer 13011 according to the embodiments may render the point cloud data.

Figure 14:
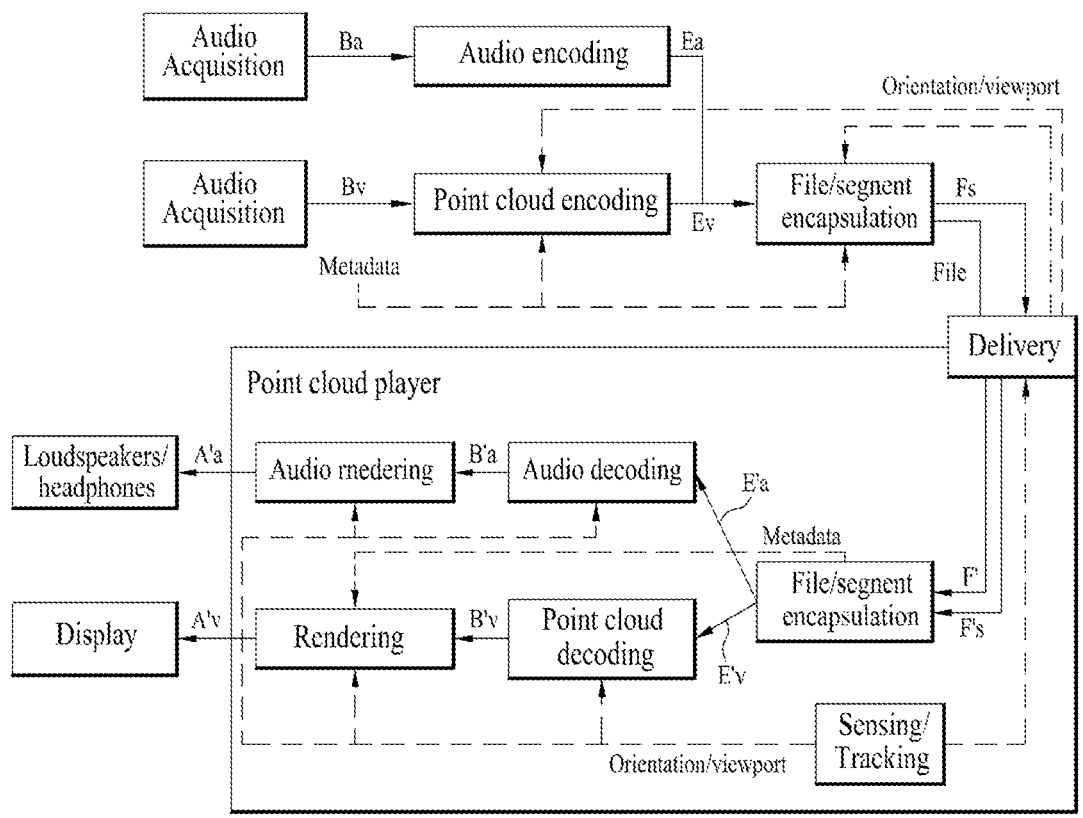
FIG. 14 illustrates an architecture for streaming G-PCC-based point cloud data according to embodiments.

FIG. 14 illustrates an architecture for streaming G-PCC-based point cloud data according to embodiments.

The upper part of FIG. 14 shows a process of processing and transmitting point cloud content by the transmission device described in FIGS. 1 to 13 (for example, the transmission device 10000, the transmission device of FIG. 12, etc.).

As described with reference to FIGS. 1 to 13, the transmission device may acquire audio Ba of the point cloud content (Audio Acquisition), encode the acquired audio (Audio Encoding), and output an audio bitstream Ea. In addition, the transmission device may acquire a point cloud (or point cloud video) By of the point cloud content (Point Acquisition), and perform point cloud encoding on the acquired point cloud to output a point cloud video bitstream Eb. The point cloud encoding of the transmission device is the same or similar to the point cloud encoding described with reference to FIGS. 1 to 13 (for example, the encoding of the point cloud encoder of FIG. 4), and thus a detailed description thereof will be omitted.

The transmission device may encapsulate the generated audio bitstream and video bitstream into a file and/or a segment (File/segment encapsulation). The encapsulated file and/or segment Fs, File may include a file in a file format such as ISOBMFF or a DASH segment. Point cloud-related metadata according to embodiments may be contained in the encapsulated file format and/or segment. The metadata may be contained in boxes of various levels on the ISOBMFF file format, or may be contained in a separate track within the file. According to an embodiment, the transmission device may encapsulate the metadata into a separate file. The transmission device according to the embodiments may deliver the encapsulated file format and/or segment over a network. The processing method for encapsulation and transmission by the transmission device is the same as that described with reference to FIGS. 1 to 13 (for example, the transmitter 10003, the transmission step 20002 of FIG. 2, etc.), and thus a detailed description thereof will be omitted.

The lower part of FIG. 14 shows a process of processing and outputting point cloud content by the reception device (for example, the reception device 10004, the reception device of FIG. 13, etc.) described with reference to FIGS. 1 to 13.

According to embodiments, the reception device may include devices configured to output final audio data and final video data (e.g., loudspeakers, headphones, a display), and a point cloud player configured to process point cloud content (a point cloud player). The final data output devices and the point cloud player may be configured as separate physical devices. The point cloud player according to the embodiments may perform geometry-based point cloud compression (G-PCC) coding, video-based point cloud compression (V-PCC) coding and/or next-generation coding.

The reception device according to the embodiments may secure a file and/or segment F', Fs' contained in the received data (for example, a broadcast signal, a signal transmitted over a network, etc.) and decapsulate the same (File/segment decapsulation). The reception and decapsulation methods of the reception device is the same as those described with reference to FIGS. 1 to 13 (for example, the receiver 10005, the reception unit 13000, the reception processing unit 13001, etc.), and thus a detailed description thereof will be omitted.

The reception device according to the embodiments secures an audio bitstream E'a and a video bitstream E'v contained in the file and/or segment. As shown in the figure, the reception device outputs decoded audio data B'a by performing audio decoding on the audio bitstream, and renders the decoded audio data (audio rendering) to output final audio data A'a through loudspeakers or headphones.

Also, the reception device performs point cloud decoding on the video bitstream E'v and outputs decoded video data B'v. The point cloud decoding according to the embodiments is the same or similar to the point cloud decoding described with reference to FIGS. 1 to 13 (for example, decoding of the point cloud decoder of FIG. 11), and thus a detailed description thereof will be omitted. The reception device may render the decoded video data and output final video data through the display.

The reception device according to the embodiments may perform at least one of decapsulation, audio decoding, audio rendering, point cloud decoding, and point cloud video rendering based on the transmitted metadata. The details of the metadata are the same as those described with reference to FIGS. 12 to 13, and thus a description thereof will be omitted.

As indicated by a dotted line shown in the figure, the reception device according to the embodiments (for example, a point cloud player or a sensing/tracking unit in the point cloud player) may generate feedback information (orientation, viewport). According to embodiments, the feedback information may be used in a decapsulation process, a point cloud decoding process and/or a rendering process of the reception device, or may be delivered to the transmission device. Details of the feedback information are the same as those described with reference to FIGS. 1 to 13, and thus a description thereof will be omitted.

Figure 15:
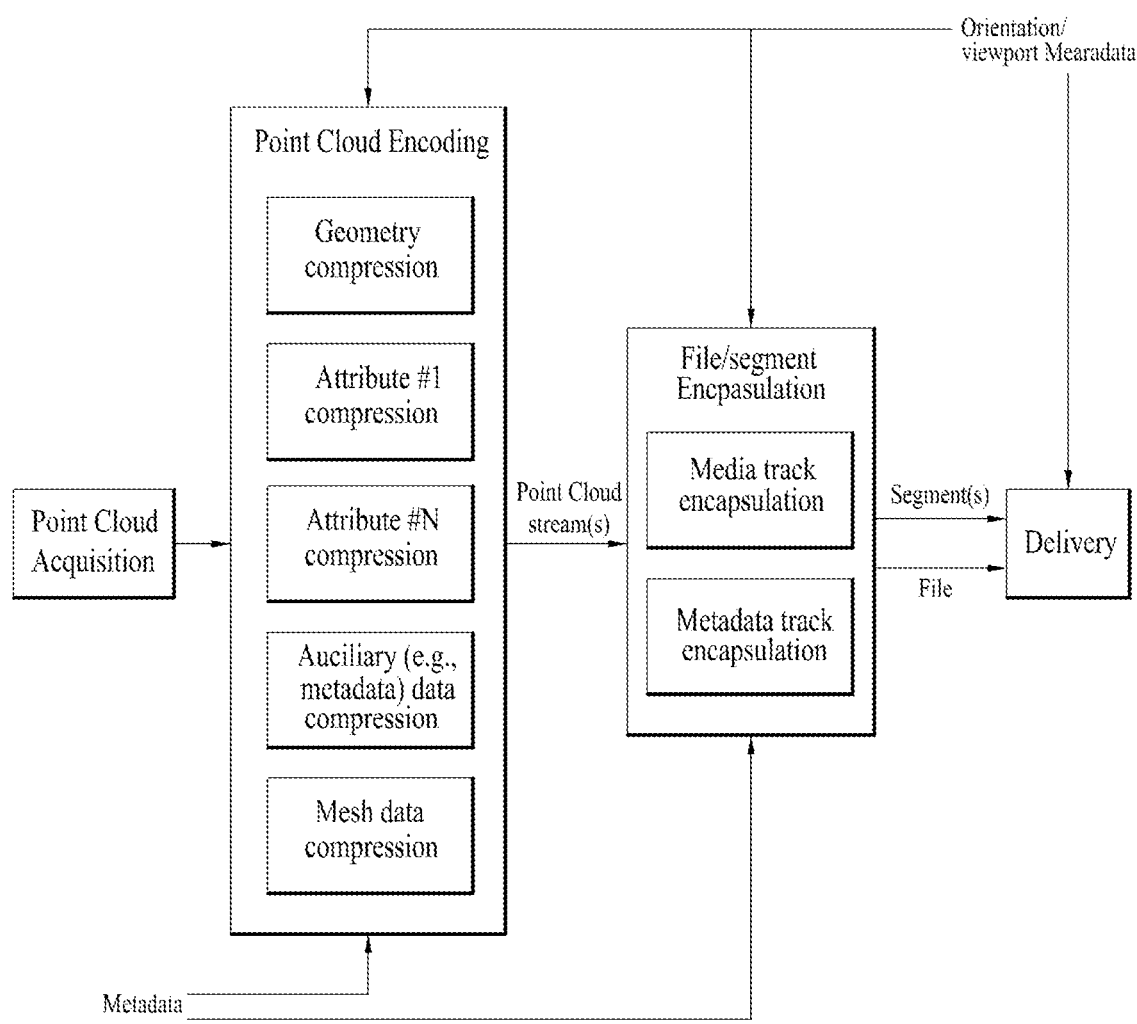
FIG. 15 illustrates an exemplary point cloud transmission device according to embodiments.

FIG. 15 shows an exemplary transmission device according to embodiments.

The transmission device of FIG. 15 is a device configured to transmit point cloud content, and corresponds to an example of the transmission device described with reference to FIGS. 1 to 14 (e.g., the transmission device 10000 of FIG. 1, the point cloud encoder of FIG. 4, the transmission device of FIG. 12, the transmission device of FIG. 14). Accordingly, the transmission device of FIG. 15 performs an operation that is identical or similar to that of the transmission device described with reference to FIGS. 1 to 14.

The transmission device according to the embodiments may perform one or more of point cloud acquisition, point cloud encoding, file/segment encapsulation and delivery.

Since the operation of point cloud acquisition and delivery illustrated in the figure is the same as the operation described with reference to FIGS. 1 to 14, a detailed description thereof will be omitted.

As described above with reference to FIGS. 1 to 14, the transmission device according to the embodiments may perform geometry encoding and attribute encoding. The geometry encoding may be referred to as geometry compression, and the attribute encoding may be referred to as attribute compression. As described above, one point may have one geometry and one or more attributes. Accordingly, the transmission device performs attribute encoding on each attribute. The figure illustrates that the transmission device performs one or more attribute compressions (attribute #1 compression, . . . , attribute #N compression). In addition, the transmission device according to the embodiments may perform auxiliary compression. The auxiliary compression is performed on the metadata. Details of the metadata are the same as those described with reference to FIGS. 1 to 14, and thus a description thereof will be omitted. The transmission device may also perform mesh data compression. The mesh data compression according to the embodiments may include the trisoup geometry encoding described with reference to FIGS. 1 to 14.

The transmission device according to the embodiments may encapsulate bitstreams (e.g., point cloud streams) output according to point cloud encoding into a file and/or a segment. According to embodiments, the transmission device may perform media track encapsulation for carrying data (for example, media data) other than the metadata, and perform metadata track encapsulation for carrying metadata. According to embodiments, the metadata may be encapsulated into a media track.

As described with reference to FIGS. 1 to 14, the transmission device may receive feedback information (orientation/viewport metadata) from the reception device, and perform at least one of the point cloud encoding, file/segment encapsulation, and delivery operations based on the received feedback information. Details are the same as those described with reference to FIGS. 1 to 14, and thus a description thereof will be omitted.

Figure 16:
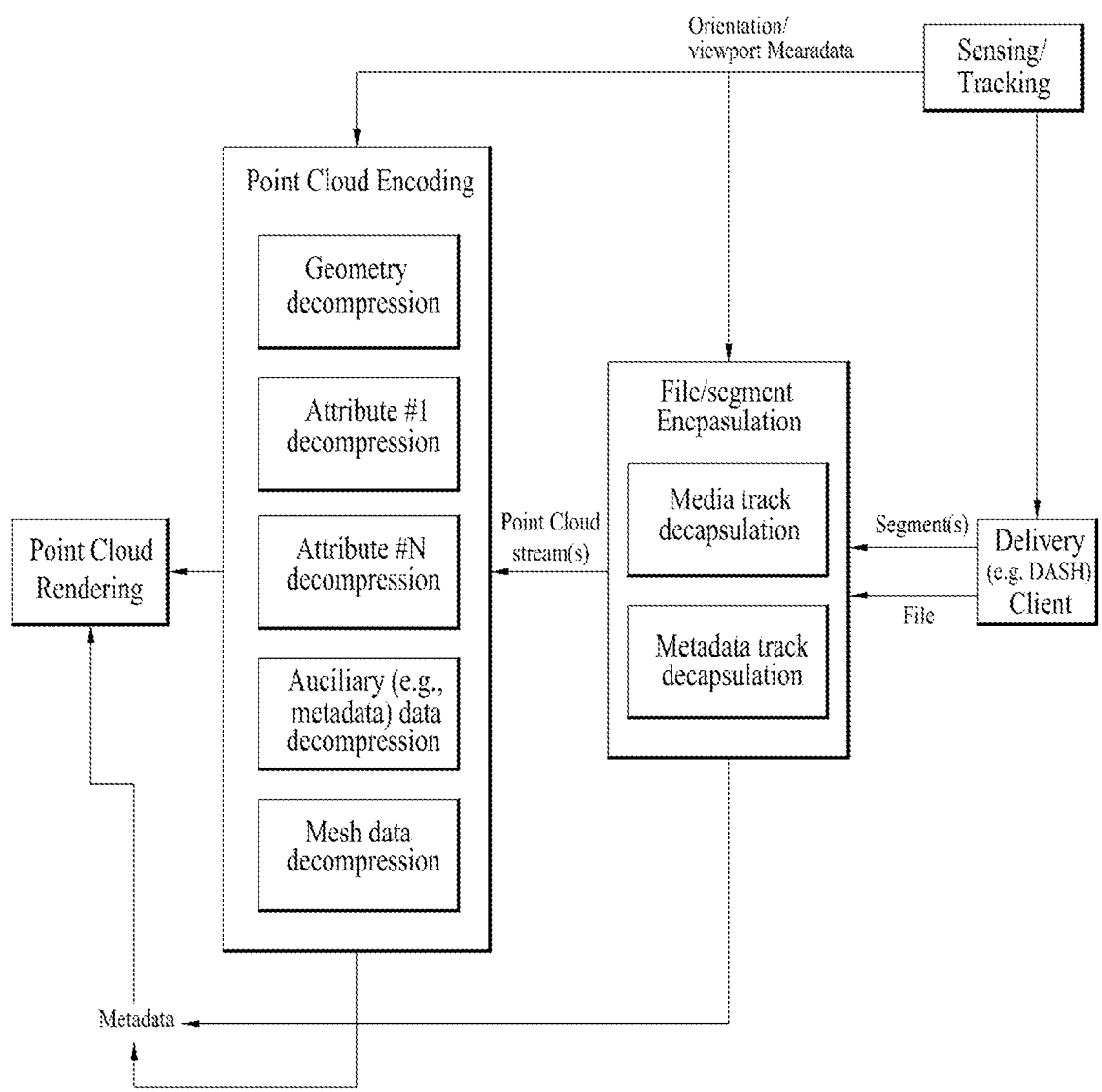
FIG. 16 illustrates an exemplary point cloud reception device according to embodiments.

FIG. 16 shows an exemplary reception device according to embodiments.

The reception device of FIG. 16 is a device for receiving point cloud content, and corresponds to an example of the reception device described with reference to FIGS. 1 to 14 (for example, the reception device 10004 of FIG. 1, the point cloud decoder of FIG. 11, and the reception device of FIG. 13, the reception device of FIG. 14). Accordingly, the reception device of FIG. 16 performs an operation that is identical or similar to that of the reception device described with reference to FIGS. 1 to 14. The reception device of FIG. 16 may receive a signal transmitted from the transmission device of FIG. 15, and perform the opposite process of the operation of the transmission device of FIG. 15.

The reception device according to the embodiments may perform at least one of delivery, file/segment decapsulation, point cloud decoding, and point cloud rendering.

Since the point cloud reception and point cloud rendering operations illustrated in the figure are the same as those described with reference to FIGS. 1 to 14, a detailed description thereof will be omitted.

As described with reference to FIGS. 1 to 14, the reception device according to the embodiments decapsulate the file and/or segment acquired from a network or a storage device. According to embodiments, the reception device may perform media track decapsulation for carrying data (for example, media data) other than the metadata, and perform metadata track decapsulation for carrying metadata. According to embodiments, in the case where the metadata is encapsulated into a media track, the metadata track decapsulation is omitted.

As described with reference to FIGS. 1 to 14, the reception device may perform geometry decoding and attribute decoding on bitstreams (e.g., point cloud streams) secured through decapsulation. The geometry decoding may be referred to as geometry decompression, and the attribute decoding may be referred to as attribute decompression. As described above, one point may have one geometry and one or more attributes, each of which is encoded by the transmission device. Accordingly, the reception device performs attribute decoding on each attribute. The figure illustrates that the reception device performs one or more attribute decompressions (attribute #1 decompression, . . . , attribute #N decompression). The reception device according to the embodiments may also perform auxiliary decompression. The auxiliary decompression is performed on the metadata. Details of the metadata are the same as those described with reference to FIGS. 1 to 14, and thus a disruption thereof will be omitted. The reception device may also perform mesh data decompression. The mesh data decompression according to the embodiments may include the trisoup geometry decoding described with reference to FIGS. 1 to 14. The reception device according to the embodiments may render the point cloud data that is output according to the point cloud decoding.

As described with reference to FIGS. 1 to 14, the reception device may secure orientation/viewport metadata using a separate sensing/tracking element, and transmit feedback information including the same to a transmission device (for example, the transmission device of FIG. 15). In addition, the reception device may perform at least one of a reception operation, file/segment decapsulation, and point cloud decoding based on the feedback information. Details are the same as those described with reference to FIGS. 1 to 14, and thus a description thereof will be omitted.

Figure 17:
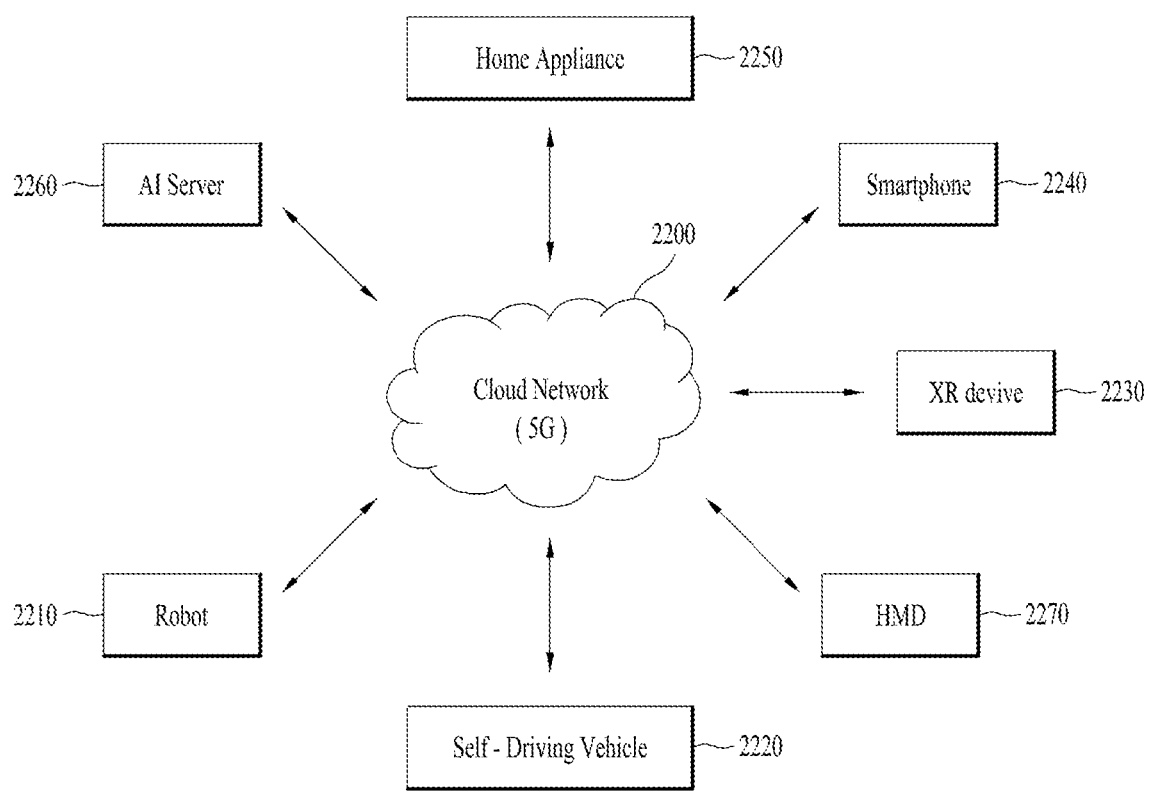
FIG. 17 shows an exemplary structure operatively connectable with a method/device for transmitting and receiving point cloud data according to embodiments.

FIG. 17 shows an exemplary structure operatively connectable with a method/device for transmitting and receiving point cloud data according to embodiments.

The structure of FIG. 17 represents a configuration in which at least one of a server 1760, a robot 1710, a self-driving vehicle 1720, an XR device 1730, a smartphone 1740, a home appliance 1750, and/or an HMD 1770 is connected to a cloud network 1700. The robot 1710, the self-driving vehicle 1720, the XR device 1730, the smartphone 1740, or the home appliance 1750 is referred to as a device. Further, the XR device 1730 may correspond to a point cloud data (PCC) device according to embodiments or may be operatively connected to the PCC device.

The cloud network 1700 may represent a network that constitutes part of the cloud computing infrastructure or is present in the cloud computing infrastructure. Here, the cloud network 1700 may be configured using a 3G network, 4G or Long Term Evolution (LTE) network, or a 5G network.

The server 1760 may be connected to at least one of the robot 1710, the self-driving vehicle 1720, the XR device 1730, the smartphone 1740, the home appliance 1750, and/or the HMD 1770 over the cloud network 1700 and may assist at least a part of the processing of the connected devices 1710 to 1770.

The HMD 1770 represents one of the implementation types of the XR device and/or the PCC device according to the embodiments. According to embodiments, an HMD type device includes a communication unit, a control unit, a memory, an I/O unit, a sensor unit, and a power supply unit.

Hereinafter, various embodiments of the devices 1710 to 1750 to which the above-described technology is applied will be described. The devices 1710 to 1750 illustrated in FIG. 17 may be operatively connected/coupled to a point cloud data transmission/reception device according to the above-described embodiments.

<PCC+XR>

The XR/PCC device 1730 may employ PCC technology and/or XR (AR+VR) technology, and may be implemented as an HMD, a head-up display (HUD) provided in a vehicle, a television, a mobile phone, a smartphone, a computer, a wearable device, a home appliance, a digital signage, a vehicle, a stationary robot, or a mobile robot.

The XR/PCC device 1730 may analyze 3D point cloud data or image data acquired through various sensors or from an external device and generate position data and attribute data about 3D points. Thereby, the XR/PCC device 1730 may acquire information about the surrounding space or a real object, and render and output an XR object. For example, the XR/PCC device 1730 may match an XR object including auxiliary information about a recognized object with the recognized object and output the matched XR object.

<PCC+Self-Driving+XR>

The self-driving vehicle 1720 may be implemented as a mobile robot, a vehicle, an unmanned aerial vehicle, or the like by applying the PCC technology and the XR technology.

The self-driving vehicle 1720 to which the XR/PCC technology is applied may represent an autonomous vehicle provided with means for providing an XR image, or an autonomous vehicle that is a target of control/interaction in the XR image. In particular, the self-driving vehicle 1720, which is a target of control/interaction in the XR image, may be distinguished from the XR device 1730 and may be operatively connected thereto.

The self-driving vehicle 1720 having means for providing an XR/PCC image may acquire sensor information from the sensors including a camera, and output the generated XR/PCC image based on the acquired sensor information. For example, the self-driving vehicle 1720 may have an HUD and output an XR/PCC image thereto to provide an occupant with an XR/PCC object corresponding to a real object or an object present on the screen.

In this case, when the XR/PCC object is output to the HUD, at least a part of the XR/PCC object may be output to overlap the real object to which the occupant's eyes are directed. On the other hand, when the XR/PCC object is output on a display provided inside the self-driving vehicle, at least a part of the XR/PCC object may be output to overlap the object on the screen. For example, the self-driving vehicle 1220 may output XR/PCC objects corresponding to objects such as a road, another vehicle, a traffic light, a traffic sign, a two-wheeled vehicle, a pedestrian, and a building.

The virtual reality (VR) technology, the augmented reality (AR) technology, the mixed reality (MR) technology and/or the point cloud compression (PCC) technology according to the embodiments are applicable to various devices.

In other words, the VR technology is a display technology that provides only CG images of real-world objects, backgrounds, and the like. On the other hand, the AR technology refers to a technology that shows a virtually created CG image on the image of a real object. The MR technology is similar to the AR technology described above in that virtual objects to be shown are mixed and combined with the real world. However, the MR technology differs from the AR technology in that the AR technology makes a clear distinction between a real object and a virtual object created as a CG image and uses virtual objects as complementary objects for real objects, whereas the MR technology treats virtual objects as objects having equivalent characteristics as real objects. More specifically, an example of MR technology applications is a hologram service.

Recently, the VR, AR, and MR technologies are sometimes referred to as extended reality (XR) technology rather than being clearly distinguished from each other. Accordingly, embodiments of the present disclosure are applicable to any of the VR, AR, MR, and XR technologies. The encoding/decoding based on PCC, V-PCC, and G-PCC techniques is applicable to such technologies.

The PCC method/device according to the embodiments may be applied to a vehicle that provides a self-driving service.

A vehicle that provides the self-driving service is connected to a PCC device for wired/wireless communication.

When the point cloud data (PCC) transmission/reception device according to the embodiments is connected to a vehicle for wired/wireless communication, the device may receive/process content data related to an AR/VR/PCC service, which may be provided together with the self-driving service, and transmit the same to the vehicle. In the case where the PCC transmission/reception device is mounted on a vehicle, the PCC transmission/reception device may receive/process content data related to the AR/VR/PCC service according to a user input signal input through a user interface device and provide the same to the user. The vehicle or the user interface device according to the embodiments may receive a user input signal. The user input signal according to the embodiments may include a signal indicating the self-driving service.

Scalable decoding according to embodiments is decoding selectively performed on some or all of geometry and/or attributes by the reception device (e.g., the reception device 10004 of FIG. 1, the point cloud decoder of FIGS. 10 and 11, or the reception device of FIG. 13) according to the decoding performance of the reception device. Some of the geometry and attributes according to the embodiments are called partial geometry and partial attribute. Scalable decoding applied to the geometry according to the embodiments is called scalable geometry decoding or geometry scalable decoding. Scalable decoding applied to the attributes according to the embodiments is called scalable attribute decoding or attribute scalable decoding. As described with reference to FIGS. 1 to 17, points of the point cloud content are distributed in a three-dimensional space, and the distributed points are represented in an octree structure. The octree structure is an octal tree structure, and the depth thereof increases from a higher node to a lower node. The depth according to the embodiments is referred to as a level and/or a layer. Thus, to provide low-resolution point cloud content, the reception device may perform geometry decoding (or geometry scalable decoding) on the partial geometry and/or partial attribute (or attribute scalable decoding) on partial attributes from a higher node to a lower node corresponding to a specific depth or level in the octree structure. In addition, the reception device may perform geometry and attribute decoding corresponding to the entire octree structure to provide high-resolution point cloud content. The reception device according to the embodiments provides scalable point cloud representation or scalable representation for representation of a part as well as the entirety of the point cloud by performing scalable decoding. A level of scalable representation according to the embodiments corresponds to a depth of the octree structure. As the value of the level according to the embodiments increases, the resolution or detail increases.

The scalable decoding supports reception devices exhibiting various performances and enables a reception device to provide a point cloud service even in an adaptive bitrate environment. However, as attribute decoding is performed based on geometry decoding, geometry information is required to perform accurate attribute decoding. For example, a transform coefficient for RAHT coding is determined based on geometry distribution information (or geometry structure information (e.g., an octree structure)). In addition, prediction transform coding and lifting transform coding require entire geometry distribution information (or geometry structure information (e.g., octree structure)) in order to obtain points belonging to each LOD.

Therefore, the reception device may receive and process all geometries in order to perform stable attribute decoding. However, it is inefficient in terms of bitrate to transmit and receive geometry information that is not actually displayed according to the performance of the reception device. In addition, decoding all the geometries by the reception device may cause a delay in providing a point cloud content service.

Further, when the decoder of the reception device has low performance, not all geometries may be decoded.

Figure 18:
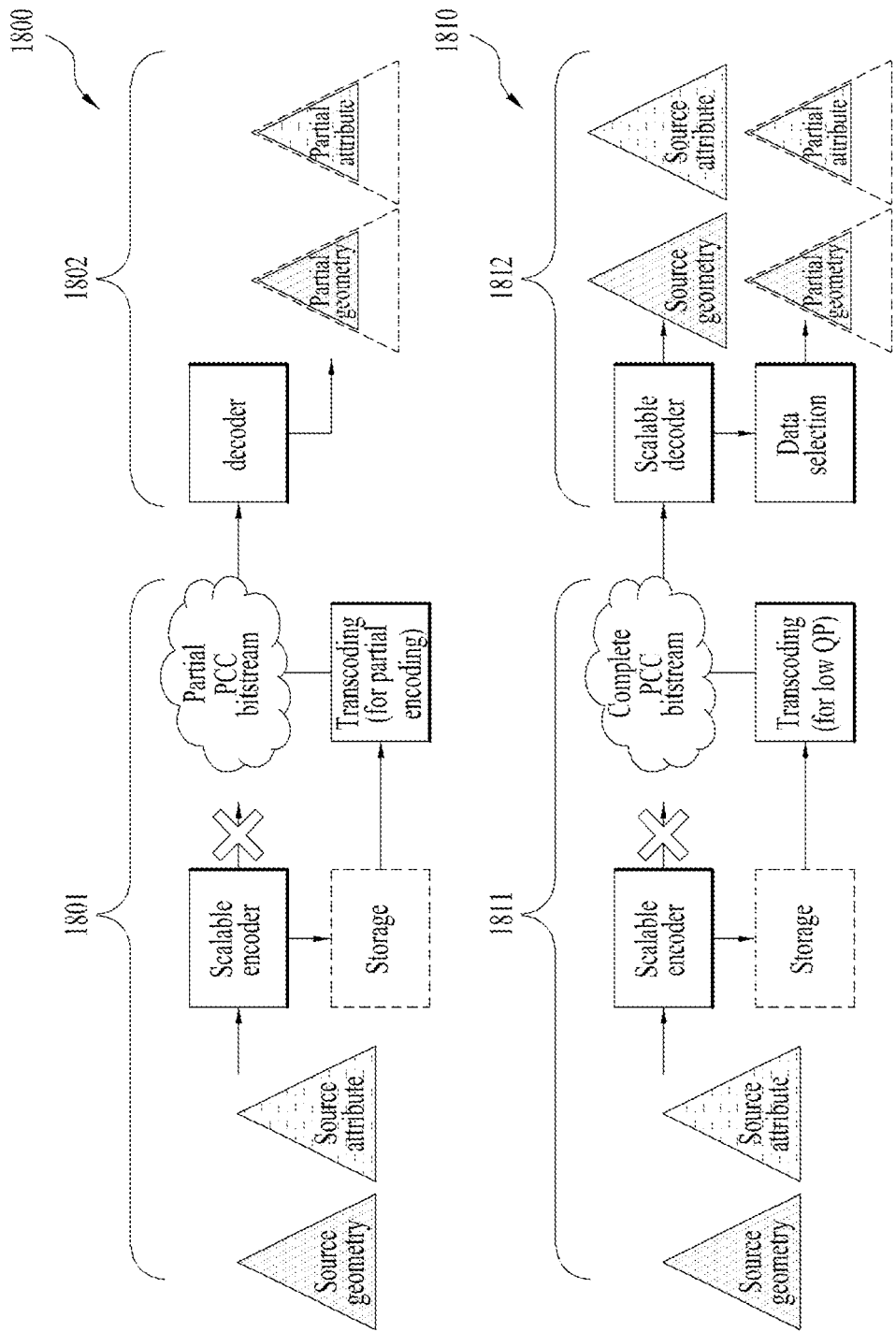
FIG. 18 illustrates configuration for transmission and reception of point cloud data according to embodiments.

FIG. 18 illustrates configuration for transmission and reception of point cloud data according to embodiments.

FIG. 18 illustrates configuration for transmission and reception of point cloud data for scalable decoding and scalable representation.

An example 1800 shown at the top of FIG. 18 is an example of a configuration for transmitting and receiving a partial PCC bitstream. The transmission device according to the embodiments (e.g., the transmission device 10000 described with reference to FIG. 1 or the transmission device described with reference to FIG. 12) performs full encoding on a source geometry and a source attribute without performing scalable encoding, and then store the same. That is, since the transmission device cannot encode a part of the geometry and attributes, it cannot selectively transmit some data necessary for the reception device. Therefore, the transmission device according to the embodiments decodes the stored encoded geometry and attributes, performs transcoding on some or all of the decoded geometry and attributes for partial encoding, and generates a bitstream (e.g., a partial PCC bitstream) including a partial geometry and a partial attribute (1801). The reception device according to the embodiments (e.g., the reception device 10004 of FIG. 1, the point cloud decoder of FIGS. 10 and 11, or the reception device of FIG. 13) receives and decodes the bitstream, and outputs the partial geometry and the partial attribute (1802). Since the configuration shown in the example 1800 requires additional data processing (e.g., decoding and transcoding) for the transmission device, a delay may occur in the data processing process.

An example 1810 shown at the bottom of FIG. 18 is an example of a configuration for transmitting and receiving a complete PCC bitstream. The transmission device according to the embodiments (e.g., the transmission device 10000 described with reference to FIG. 1 or the transmission device described with reference to FIG. 12) does not perform scalable encoding, but performs full encoding and stores the encoded geometry and attributes. The transmission device according to the embodiments performs transcoding on a part of the stored geometry and attributes for low-quality point cloud content, and generates a bitstream (e.g., a complete PCC bitstream) including the complete geometry and attributes (1811). The bitstream according to the embodiments may include signaling information for scalable decoding by the reception device. The reception device according to the embodiments receives the bitstream and outputs the source geometry and source attributes by performing scalable decoding, or selects some decoded data (data selecting) and outputs a partial geometry and a partial attribute (1812). The configuration shown in the example 1810 requires transmission of unnecessary data (e.g., a portion of unselected geometry and attributes) and thus lowers bandwidth efficiency. Also, when a fixed bandwidth is used, the transmission device may lower the quality and transmit the encoded point cloud data.

Figure 19:
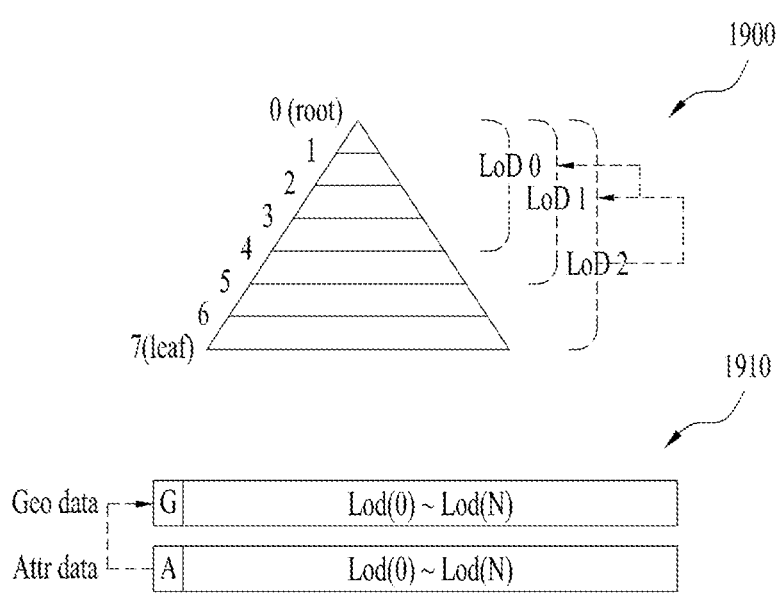
FIG. 19 illustrates an octree structure and bitstream of point cloud data according to embodiments.

FIG. 19 illustrates an octree structure and bitstream of point cloud data according to embodiments.

Points of the point cloud content according to the embodiments are distributed in a three-dimensional space. The distributed points are represented as an octree. As described with reference to FIG. 6, the octree is generated by recursive subdividing of a bounding box. The octree has an occupancy code including nodes corresponding to recursively subdivided regions. According to the embodiments, a node corresponds to a space or region generated by recursive subdivision. Accordingly, a node according to the embodiments has a value of 0 or 1 depending on whether one or more points are present in the corresponding region. For example, when one or more points are present in a region corresponding to a node, the node has a value of 1. When the one or more points are not present, the node has a value of 0.

An example 1900 shown in FIG. 19 represents an octree structure. According to embodiments, the highest node of the octree is referred to as a root node, and the lowest node is referred to as a leaf node. The amount of data or the density of data increases from the upper node to the lower node according to the above-described recursive subdivision, and accordingly the octree structure according to the embodiments is represented in a triangular shape. The root node according to the embodiments corresponds to an initial depth or the lowest level (e.g., level 0). The leaf node according to the embodiments corresponds to a final depth or the highest level (e.g., level n). In the octree shown in the figure, the highest level is level 7.

As described with reference to FIG. 8, a point cloud encoder according to embodiments (e.g., the point cloud video encoder 10002 of FIG. 1, the point cloud encoder of FIG. 4, the point cloud encoder described with reference to FIGS. 12, 14 and 15, etc.) may classify the points of a point cloud into one or more Levels of Detail (LODs). The LOD according to the embodiments is used for attribute encoding. An LOD according to the embodiments corresponds to a level in the octree structure. One LOD may correspond to one level in the octree structure, or may correspond to one or more levels in the octree structure. As shown in the example 1900, LOD0 corresponds to level 0 to level 3 (or depth 0 to depth 3), LOD1 corresponds to level 0 to level 5 (or depth 0 to depth 5), and LOD2 corresponds to level 0 to level 7, the highest level (or depth 0 to depth 7) in the octree structure. The relationship between the LODs and the levels (or depths) of the octree is not limited to this example.

An example 1910 shown at the bottom of FIG. 19 represents a geometry bitstream and an attribute bitstream. The transmission device (e.g., the transmission device 10000 described with reference to FIG. 1 or the transmission device described with reference to FIG. 12) according to the embodiments may generate and transmit a bitstream (e.g., the bitstream described with reference to FIG. 10) including a geometry bitstream and an attribute bitstream. In addition, the transmission device may configure each of the geometry bitstream and the attribute bitstream on a slice basis regardless of the octree structure or LOD and transmit the same. Accordingly, as shown in the example 1910, the geometry bitstream includes geometries corresponding to LOD 0 to LOD N (the highest level (for example level 7)). The attribute bitstream includes attributes corresponding to LOD 0 to LOD N. That is, in order to transmit a partial bitstream as shown in the example 1800 of FIG. 18, the transmission device according to the embodiments should decode the geometry bitstream and the attribute bitstream, respectively, select a partial geometry and a partial attribute which are to be transmitted, and encode the same.

Upon receiving the bitstreams shown in the example 1910, the reception device (e.g., the reception device 10004 of FIG. 1, the point cloud decoder of FIGS. 10 and 11, or the reception device of FIG. 13) decodes all the bitstreams, selects only necessary data, and outputs a partial geometry and partial attributes as described in the example 1810 of FIG. 18 (e.g., operation 1812 of the reception device described with reference to FIG. 18).

Accordingly, in order to reduce unnecessary data transmission and shorten data processing time, the transmission device (or point cloud encoder) according to the embodiments divides the geometry bitstream and/or the attribute bitstream into layers and transmits the same. The point cloud data according to the embodiments have a layer structure that is based on various parameters such as signal to noise ratio (SNR), spatial resolution, color, temporal frequency, and bit depth. In addition, the layer structure of the point cloud data according to the embodiments is based on the depth (level) in the octree structure and/or the level of the LOD. For example, a layer of the point cloud data may correspond to each depth or one or more depths in the octree structure. A layer of point cloud data may correspond to each level or one or more levels of the LOD. According to embodiments, a layer of the geometry bitstream may be the same as or different from a layer of the attribute bitstream. For example, when the layer of the geometry bitstream is layer 3, the layer of the attribute bitstream is layer 3. Also, when the layer of the geometry bitstream is layer 3, the layer of the attribute bitstream may be layer 2 or 4.

Figure 20:
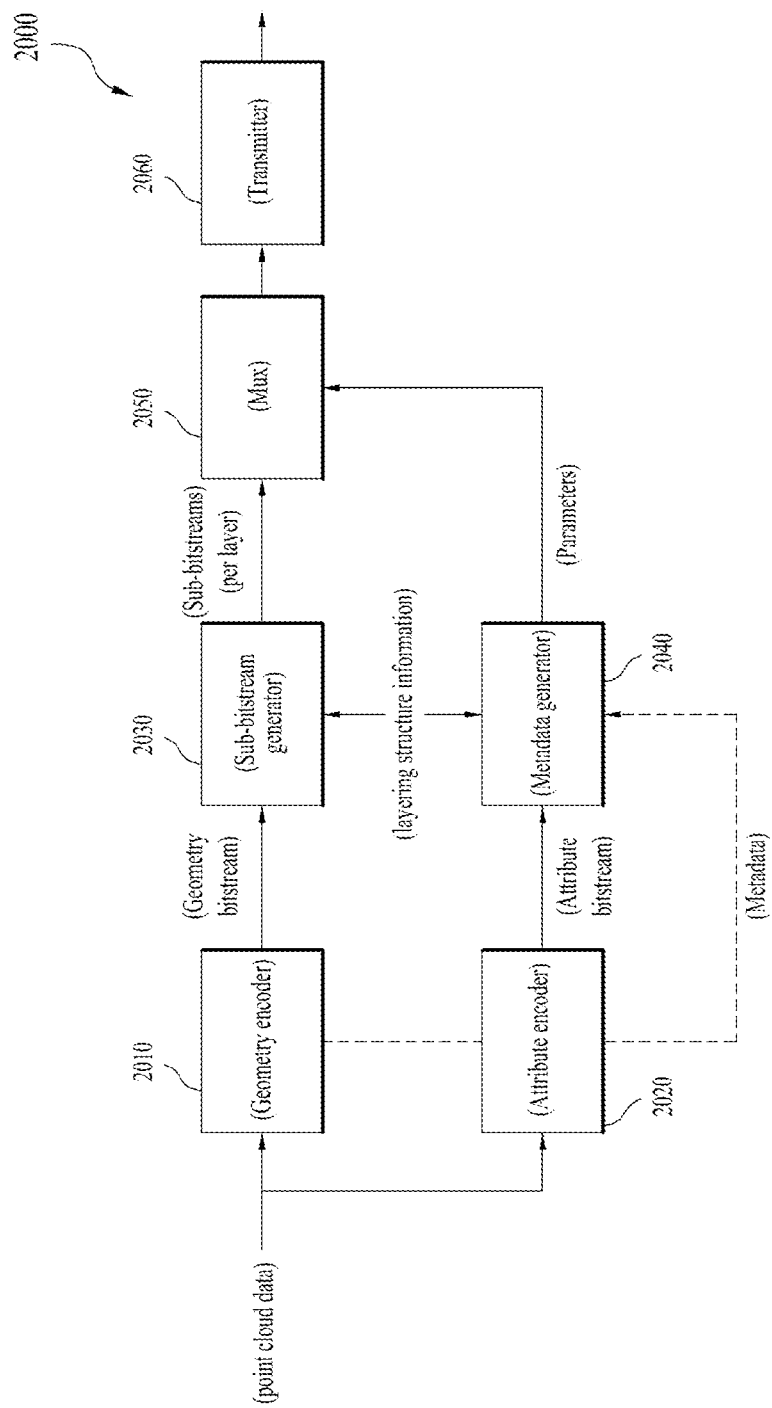
FIG. 20 illustrates an exemplary point cloud data processing device according to embodiments.

FIG. 20 illustrates an exemplary point cloud data processing device according to embodiments.

The point cloud data processing device 2000 according to the embodiments shown in FIG. 20 is an example of the transmission device 10000 described with reference to FIG. 1 or the transmission device described with reference to FIG. 12. The point cloud data processing device 2000 performs the same or similar operation to the operation of the transmission device described with reference to FIGS. 1 to 17. Although not shown in FIG. 20, the point cloud data processing device 2000 may further include one or more elements to perform the encoding operation described with reference to FIGS. 1 to 17.

The point cloud data processing device 2000 includes a geometry encoder 2010, an attribute encoder 2020, a sub-bitstream generator 2030, a metadata generator 2040, a mux 2050, and a transmitter 2060.

Point cloud data (or point cloud compression (PCC) data) according to embodiments may be input data to the point cloud encoder 1800 and may include geometry and/or attributes. The geometry according to the embodiments is information indicating a position (e.g., a location) of a point, and may be represented by parameters of a coordinate system such as a Cartesian coordinate system, a cylindrical coordinate system, or a spherical coordinate system. According to embodiments, the attribute indicates an attribute (e.g., color, transparency, reflectance, grayscale, etc.) of a point. The geometry may be referred to as geometry information (or geometry data), and the attribute may be referred to as attribute information (or attribute data).

The geometry encoder 2010 performs the geometry coding (or geometry encoding) described with reference to FIGS. 1 to 17 and outputs a geometry bitstream. The operation of the geometry encoder 2010 are the same as or similar to the operations of the coordinate transformer 40000, the quantizer 40001, the octree analyzer 40002, the surface approximation analyzer 40003, the arithmetic encoder 40004, and the geometry reconstructor 40005 described with reference to FIG. 4. In addition, the operation of the geometry encoder 2010 are the same as or similar to the operations of the data input unit 12100, the quantization processor 12001, voxelization processor 12002, the octree occupancy code generator 12003, the surface model processor 12004, the intra/inter-coding processor 12005, the arithmetic coder 12006, and the metadata processor 12007 described with reference to FIG. 12.

The attribute encoder 2020 performs the attribute coding (or attribute encoding) described with reference to FIGS. 1 to 17 and outputs an attribute bitstream.

The operation of the attribute encoder 2020 is the same as or similar to the operations of the geometry reconstructor 40005, color transformer 40006, attribute transformer 40007, RAHT transformer 40008, LOD generator 40009, lifting transformer 40010, coefficient quantizer 40011, and/or arithmetic encoder 40012 described with reference to FIG. 4. In addition, the operation of the attribute encoder 2020 is the same as or similar to the operations of the color transform processor 12008, attribute transform processor 12009, prediction/lifting/RAHT transform processor 12010, and arithmetic coder 12011 described with reference to FIG. 12.

The sub-bitstream generator 2030 according to the embodiments receives the geometry bitstream and the attribute bitstream, and layers the geometry bitstream and the attribute bitstream on a layer-by-layer basis, respectively, to generate one or more sub-bitstreams. The sub-bitstreams according to the embodiments includes a geometry sub-bitstream and an attribute sub-bitstream. As described with reference to FIG. 19, the layer structure according to the embodiments is based on an octree structure and/or LODs. The sub-bitstream generator 2030 may change the sort order of the sub-bitstreams corresponding to the respective layers and output one or more sub-bitstreams (e.g., a geometry sub-bitstream and an attribute sub-bitstream corresponding to the same layer) for each sorted layer. Layering structure information on layer division or layering of the geometry bitstream and the attribute bitstream according to the embodiments is transmitted to the metadata generator 2040.

The metadata generator 2040 may generate and/or process signaling information related to the geometry coding by the geometry encoder 2010, the attribute coding by the attribute encoder 2020, and the layer structure of the sub-bitstream generator 2030. The operation of the metadata generator 2020 is the same as or similar to the operation of the metadata processor 12007 described with reference to FIG. 12.

The mux 2050 may multiplex and output the one or more sub-bitstreams and the parameters output from the metadata generator 2040. The transmitter 2060 according to the embodiments transmits data output from the mux 2050 to the reception device. The transmitter 2060 is an example of the transmitter 10003 described with reference to FIG. 1, and performs an operation which is the same as or similar to that of the transmitter 10003.

Figure 21:
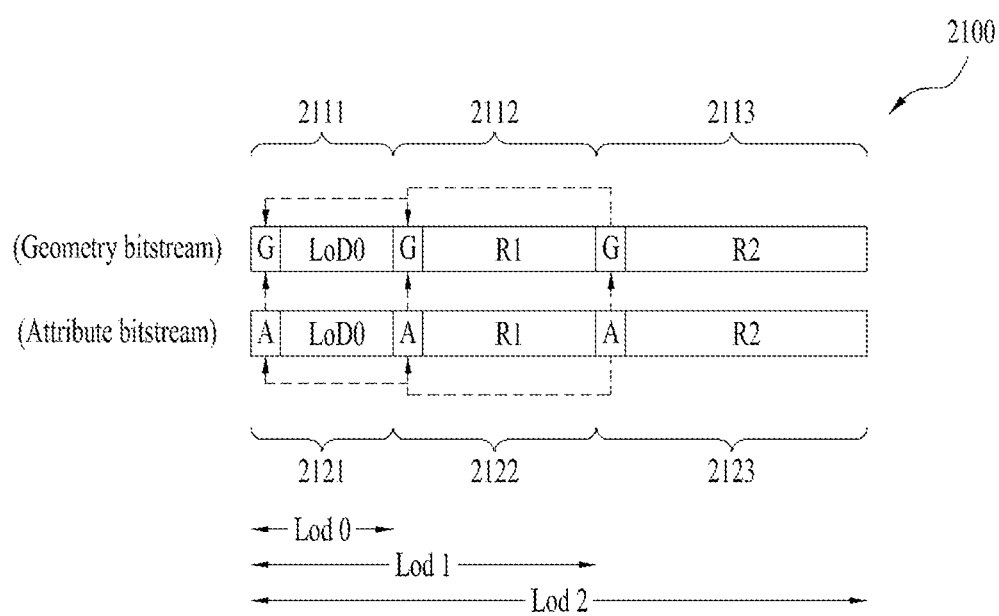
FIG. 21 illustrates layers of a geometry bitstream and an attribute bitstream.

FIG. 21 illustrates layers of a geometry bitstream and an attribute bitstream.

As described with reference to FIGS. 18 to 20, the point cloud data processing device (e.g., the point cloud data processing device 2000 or the sub-bitstream generator 2040 of FIG. 20) according to the embodiments layers the geometry bitstream and the attribute bitstream on a layer-by-layer basis and generates one or more sub-bitstreams. An example 2100 of FIG. 21 shows an LOD-based layer structure of a geometry bitstream and an attribute bitstream.

As described with reference to FIG. 9, points included in a low-level LOD are included in a higher-level LOD. As described with reference to FIG. 19, the geometry bitstream 2110 corresponds to the entire LOD. Accordingly, the point cloud data processing device generates one or more sub-bitstreams by layering the geometry bitstream based on the geometry information included only in the highest LOD. The point cloud data processing device generates a first geometry sub-bitstream 2111 including a first geometry corresponding to LOD0, LOD1, and LOD2, a second geometry sub-bitstream 2112 including a second geometry R1 corresponding to LOD1 and LOD2, and a third geometry sub-bitstream 2113 including a third geometry R2 corresponding to only LOD2 by layering the geometry bitstream 2110. Each geometry sub-bitstream contains a header (the grayed box in the figure) and a payload.

As described with reference to FIG. 19, the attribute bitstream 2120 corresponds to the entire LODs. Accordingly, the point cloud data processing device generates one or more sub-bitstreams by layering the attribute bitstream based on attribute information included only in the highest LOD. The point cloud data processing device generates a first attribute sub-bitstream 2121 including a first attribute corresponding to LOD0, LOD1, and LOD2, a second attribute sub-bitstream 2122 including a second attribute R1 corresponding to LOD1 and LOD2, and a third attribute sub-bitstream 2123 including a third attribute R2 corresponding to only LOD2 by layering the attribute bitstream 2120. Each attribute sub-bitstream includes a header (the grayed box in the figure) and a payload.

The point cloud data processing device according to the embodiments may change the sort order of one or more sub-bitstreams.

Figure 22:
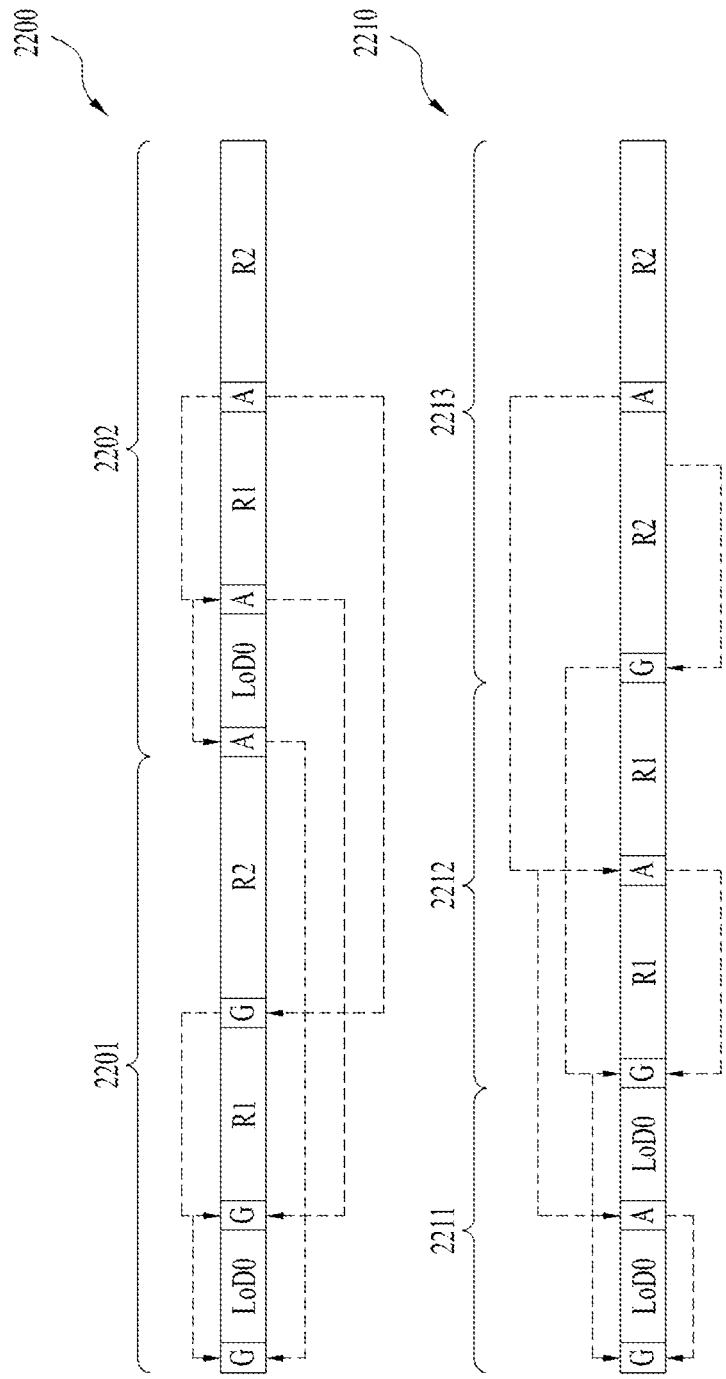
FIG. 22 illustrates a method of sorting sub-bitstreams according to embodiments.

FIG. 22 illustrates a method of sorting sub-bitstreams according to embodiments.

An example 2200 of FIG. 22 illustrates geometry sub-bitstreams and attribute sub-bitstreams which are sorted in series.

The point cloud data processing device (e.g., the transmission device 10000 described with reference to FIG. 1 or the transmission device described with reference to FIG. 12) according to the embodiments may first sort one or more geometry sub-bitstreams 2201 (e.g., the first geometry sub-bitstream 2111 including the first geometry corresponding to LOD0, LOD1, and LOD2, the second geometry sub-bitstream 2112 including the second geometry R1 corresponding to LOD1 and LOD2, and the third geometry sub-bitstream 2113 including the third geometry R2 corresponding to only LOD2 described with reference to FIG. 21). Thereafter, the point cloud data processing device sorts and transmits one or more attribute sub-bitstreams (e.g., the first attribute sub-bitstream 2121 including the first attribute corresponding to LOD0, LOD1, and LOD2, the second attribute sub-bitstream 2122 including the second attribute R1 corresponding to LOD1 and LOD2, and the third attribute sub-bitstream 2123 including the third attribute R2 corresponding to only LOD2 described with reference to FIG. 21). The reception device according to the embodiments (e.g., the reception device 10004 of FIG. 1, the point cloud decoder of FIGS. 10 and 11, or the reception device of FIG. 13) may first reconstruct the geometry sub-bitstreams and reconstruct the attribute sub-bitstreams based on the reconstructed geometry (or geometry information).

An example 2210 of FIG. 22 illustrates geometry sub-bitstreams and attribute sub-bitstreams which are sorted in parallel. The point cloud data processing device according to the embodiments may sort and transmit sub-bitstreams corresponding to the same layer together. The point cloud data processing device first sorts a first geometry sub-bitstream (e.g., the first geometry sub-bitstream 2111 of FIG. 21) including a first geometry corresponding to LOD0, LOD1, and LOD2, and first attribute sub-bitstream (e.g., the first attribute sub-bitstream 2121 of FIG. 21) including a first attribute corresponding to LOD0, LOD1, and LOD2 (2211). The point cloud data processing device sorts a second geometry sub-bitstream (e.g., the second geometry sub-bitstream 2112 of FIG. 21) including a second geometry R1 corresponding to LOD1 and LOD2 and a second attribute sub-bitstream (e.g., the second attribute sub-bitstream 2122 of FIG. 21) including a second attribute R1 corresponding to LOD1 and LOD2 (2212). The point cloud data processing device sorts a third geometry sub-bitstream (e.g., the third geometry sub-bitstream 2113 of FIG. 21) including a third geometry R2 corresponding to only LOD2 and a third attribute sub-bitstream (e.g., the third attribute sub-bitstream 2123 of FIG. 21) including a third attribute R2 corresponding to only LOD2 (2213). Accordingly, the reception device may reduce the decoding execution time by performing geometry decoding and attribute decoding in parallel. In addition, since the attribute decoding is performed based on the geometry decoding, the reception device may process the geometry corresponding to a lower layer LOD0 and process the attributes of the same layer.

The point cloud data processing device (e.g., the point cloud data processing device 2000 described with reference to FIG. 20) may multiplex the geometry sub-bitstreams and the attribute sub-bitstreams described with reference to FIGS. 21 and 22 and transmit the same in the form of a bitstream.

In consideration of the error of the transmission channel, the point cloud data transmission device may divide an image of the point cloud data into one or more packets, and transmit the same over the network. According to embodiments, the bitstream may include one or more packets (e.g., network abstraction layer (NAL) units). Accordingly, even when some packets are lost in a poor network environment, the point cloud data reception device may reconstruct the image using the remaining packets. The point cloud data may be partitioned into one or more slices or one or more tiles to be processed. The tiles and slices according to the embodiments are regions for performing point cloud compression coding by partitioning a picture of the point cloud data. The point cloud data transmission device may provide high-quality point cloud content by processing data corresponding to each region according to the importance of each partitioned region of the point cloud data. That is, the point cloud data transmission device according to the embodiments may perform point cloud compression coding having better compression efficiency and appropriate latency on data corresponding to a region important to a user.

According to embodiments, an image (or a picture) of point cloud content may be partitioned into basic processing units for point cloud compression coding. The basic processing unit for point cloud compression coding according to the embodiments may include, but is not limited to, a coding tree unit (CTU) and a brick.

A slice according to the embodiments is a region including an integer number of one or more basic processing units for point cloud compression coding and does not have a rectangular shape. The slice according to the embodiments includes data transmitted through a packet. A tile according to the embodiments is a region partitioned in a rectangular shape in the image and includes one or more basic processing units for point cloud compression coding. According to embodiments, one slice may be included in one or more tiles. Also, according to embodiments, one tile may be included in one or more slices.

The bitstream according to the embodiments may include signaling information including a sequence parameter set (SPS) for sequence-level signaling, a geometry parameter set (GPS) for signaling of geometry information coding, an attribute parameter set (APS) for signaling of attribute information coding, and a tile parameter set (TPS) for tile-level signaling, and one or more slices.

The SPS according to the embodiments is encoding information about the entire sequence including a profile and a level, and may include comprehensive information about the entire file, such as a picture resolution and a video format.

According to embodiments, a slice includes a slice header and slice data. The slice data may include one geometry bitstream (Geom00) and one or more attribute bitstreams (Attr00, Attr10). The geometry bitstream may include a header (e.g., a geometry slice header) and a payload (e.g., a geometry slice data). The header of the geometry bitstream according to the embodiments may include identification information (geom_geom_parameter_set_id) for a parameter set included in the GPS, a tile identifier (geom_tile_id), a slice identifier (geom_slice_id), and information related to the data included in the payload. The attribute bitstream may include a header (e.g., an attribute slice header or an attribute brick header) and a payload (e.g., attribute slice data or attribute brick data).

As described above with reference to FIGS. 18 to 22, the point cloud data processing device (e.g., the transmission device 10000 described with reference to FIG. 1 or the transmission device described with reference to FIG. 12) according to the embodiments generates layering structure information about layer division or layering of the geometry bitstream and the attribute bitstream for generating sub-bitstreams. The point cloud data processing device according to the embodiments may transmit a part or the entirety of the geometry bitstream and the attribute bitstream (e.g., the geometry sub-bitstream and attribute sub-bitstream described with reference to FIGS. 20 to 22) for scalable representation. Also, the layer-divided geometry bitstream according to the embodiments, that is, the geometry sub-bitstream may be included in a slice. The slice including the geometry sub-bitstream according to the embodiments is referred to as a geometry slice. The layer-divided attribute bitstream according to the embodiments, that is, the attribute sub-bitstream may be included in a slice (attribute slice). The slice including the attribute sub-bitstream according to the embodiments is referred to as an attribute slice.

FIG. 23 shows an example of an SPS according to embodiments.

FIG. 23 shows an exemplary syntax for the SPS according to the embodiments. The syntax may include the following information (or fields, parameters, etc.).

profile_idc indicates the profile of the bitstream. This information may have a specific value. Values other than specific value are reserved for future use.

profile_compatibility_flags indicates whether the bitstream conforms to the profile indicated by a value of profile_idc (e.g., j). When profile_compatibility_flags is equal to 1, the bitstream to which the SPS is applied is a bitstream conforming to the profile indicated by the profile_idc value (e.g., j). When profile_compatibility_flags is equal to 0, the bitstream to which the SPS is applied is a bitstream conforming to the profile indicated by a value other than the allowed value of profile_idc.

level_idc indicates the level of the bitstream. This information may have a specific value. Values other than profile_idc specific value are reserved for future use.

sps_bounding_box_present_flag indicates whether source bounding box offset and size information are signaled in the SPS. The source bounding box according to the embodiments includes points of point cloud data as a box (e.g., the bounding box described with reference to FIG. 5) in a three-dimensional space represented in a three-dimensional coordinate system (for example, X, Y, and Z axes). When sps_bounding_box_present_flag is equal to 1, sps_bounding_box_present_flag indicates that the source bounding box offset and size information are signaled in the SPS. When sps_bounding_box_present_flag is equal to 0, sps_bounding_box_present_flag indicates that the source bounding box offset and size information are not signaled in the SPS.

When sps_bounding_box_present_flag is equal to 1, the followings are configured as information related to the source bounding box.

sps_bounding_box_offset_x indicates the x offset of the source bounding box in Cartesian coordinates. When sps_bounding_box_offset_x is not present, the value of sps_bounding_box_offset_x is inferred to be 0.

sps_bounding_box_offset_y indicates the y offset of the source bounding box in Cartesian coordinates. When sps_bounding_box_offset_y is not present, the value of sps_bounding_box_offset_y is inferred to be 0.

sps_bounding_box_offset_z indicates the z offset of the source bounding box in Cartesian coordinates. When sps_bounding_box_offset_z is not present, the value of sps_bounding_box_offset_z is inferred to be 0.

sps_bounding_box_scale_factor indicates the scale factor of the source bounding box in Cartesian coordinates. When sps_bounding_box_scale_factor is not present, the value of sps_bounding_box_scale_factor is inferred to be 1.

sps_bounding_box_size_width indicates the width of the source bounding box in Cartesian coordinates. When sps_bounding_box_size_width is not present, the value of sps_bounding_box_size_width is inferred to be 1.

sps_bounding_box_size_height indicates the height of the source bounding box in Cartesian coordinates. When sps_bounding_box_size_height is not present, the value of sps_bounding_box_size_height is inferred to be 1.

sps_bounding_box_size_depth indicates the depth of the source bounding box in Cartesian coordinate. When sps_bounding_box_size_depth is not present, the value of sps_bounding_box_size_depth is inferred to be 1.

sps_source_scale_factor indicates the scale factor of the source point cloud (point cloud data). A scale factor according to embodiments is expressed as a floating point or an integer.

sps_seq_parameter_set_id provides an identifier for identifying the SPS. This information is provided for other syntaxes (e.g. GPS, APS) referencing the SPS. Within the scope of the embodiments, the value of sps_seq_parameter_set_id is 0. Any value other than 0 is reserved for future use.

sps_num_attribute_sets indicates the number of encoded attributes in the bitstream. The value of sps_num_attribute_sets according to the embodiments is in the range of 0 to 63. The following is information on each attribute among one or more encoded attributes indicated by sps_num_attribute_sets. In the figure, i represents each attribute.

attribute_dimension[i] indicates the number of components of the i-th attribute. An attribute according to the embodiments indicates reflectance, color, or the like. Accordingly, the number of components differs among the attributes. For example, an attribute corresponding to color may have three color components (e.g., RGB). Accordingly, the attribute corresponding to reflectance may be a mono-dimensional attribute, and the attribute corresponding to color may be a three-dimensional attribute.

attribute_instance_id[i] indicates the instance ID (instance_id) of the i-th attribute.

attribute_bitdepth[i] indicates the bitdepth of the i-th attribute.

attribute_cicp_colour_primaries[i] indicates coordinate values of chromaticity coordinates of color attribute source primaries (e.g., white and black) of the i-th attribute.

attribute_cicp_transfer_characteristics[i] indicates either an optical-electro transfer characteristic function (OTF) or inverse OTF of the i-th attribute (color attribute). The OTF according to the embodiments is a function of a source input linear optical intensity Lc in a nominal real-valued range of 0 to 1. The inverse OTF according to the embodiments is a function of an output linear optical intensity Lo of a nominal real-valued range of 0 to 1.

attribute_cicp_matrix_coeffs[i] indicates the matrix coefficients used in deriving luma and chroma signals from the green, blue and red or Y, Z, and X primaries of the i-th attribute.

attribute_cicp_video_full_range_flag[i] indicates the black level and range of the luma and chroma signals as derived from E″ and E′ or E″ and E′ real-valued component signals) for the i-th attribute.

known_attribute_label_flag[i] indicates whether known_attribute_label is signaled for the i-th attribute. When the value of known_attribute_label_flag[i] is 1, known_attribute_label_flag[i] indicates that known_attribute_label is signaled for the i-th attribute. When the value of known_attribute_label_flag[i] is 0, known_attribute_label_flag[i] indicates that attribute_label_four_bytes[i] is signaled for the i-th attribute.

The following is known_attribute_label_flag[i] that is signaled when the value of known_attribute_label_flag[i] is 1.

known_attribute_label[i] has any value among the values from 0 to 2.

When the value of known_attribute_label_flag[i] is 0, the attribute is color.

When the value of known_attribute_label_flag[i] is 1, the attribute is reflectance.

When the value of known_attribute_label_flag[i] is 2, the attribute is the frame index.

The following is attribute_label_four_bytes[i] signaled when the value of known_attribute_label_flag[i] is 0.

attribute_label_four_bytes[i] indicates the known attribute type with a 4-byte code. When the value of attribute_label_four_bytes[i] is 0, the attribute type is color. When the value of attribute_label_four_bytes[i] is 1, the attribute type is reflectance.

The following information is related to the slice.

split_slice_flag indicates whether the point cloud data is divided into one or more slices. When the value of split_slice_flag is 1, split_slice_flag indicates whether the point cloud data (the geometry bitstream and attribute bitstream) is divided into one or more slices. When the value of split_slice_flag is 0, split_slice_flag indicates that the point cloud data (the geometry bitstream and attribute bitstream) is included in one slice. When the value of split_slice_flag is 1, the SPS includes split_type.

split_type indicates a method or method type for dividing point cloud data into one or more slices, or a method or type of layering of the geometry bitstream and the attribute bitstream. For example, when the value of split_type is 0, split_type indicates that the point cloud data is divided spit into one or more slices (e.g., the geometry sub-bitstreams or attribute sub-bitstreams described with reference to FIGS. 20 and 21) based on the LOD. For example, as described with reference to FIGS. 21 to 22, point cloud data (e.g., the geometry sub-bitstream 2113 and attribute sub-bitstream 2123) divided based on the highest LOD is included in one slice. When the value of split_type is 1, split_type indicates that the point cloud data is split into one or more slices (e.g., the geometry sub-bitstreams or attribute sub-bitstreams described with reference to FIGS. 20 and 21) according to the level in the octree structure. For example, one slice includes point cloud data sampled based on an octree level (e.g., point cloud data sampled based on a level matched with an attribute in the colorized octree structure). That is, the geometry sub-bitstream according to the embodiments corresponds to an octree level.

When the value of split_type is 0, the SPS includes the following information.

Num_LOD indicates the number of LODs. As described above, the point cloud data is split into one or more slices according to the number of LODs.

full_res_flag indicates whether the point cloud data transmitted corresponds to the fulLODs or partial LODs. When the value of full_res_flag is 1, full_res_flag indicates that geometry and attributes corresponding to the full LODs are transmitted. That is, when the value of full_res_flag is 1, full_res_flag indicates that information for configuring the entire point cloud data is transmitted. When the value of full_res_flag is 0, full_res_flag indicates that geometry and attributes corresponding to partial LODs are transmitted. Accordingly, the reception device provides point cloud content of various resolutions based on this information as described with reference to FIGS. 18 and 19.

When the value of full_res_flag is 0, the SPS includes the following information.

full_geo_present_flag indicates whether the full geometry is transmitted. When the value of full_geo_present_flag is 1, full_geo_present_flag indicates that the full geometry is transmitted (regardless of transmission of full attributes). Accordingly, even when the reception device receives the attributes corresponding to partial LODs, it may reconstruct the attributes corresponding to the full LODs by reconstructing the full geometry. When the value of full_geo_present_flag is 0, full_geo_present_flag indicates that a partial geometry is transmitted. The partial geometry corresponds to the same LOD as the transmitted partial attribute. When the partial geometry corresponds to an LOD different from that for the transmitted partial attribute, information about the LOD corresponding to the partial geometry and the LOD corresponding to the partial attribute may be separately signaled.

split_info_present_in_slice_header_flag indicates whether additional information is transmitted in the slice header. When the value of split_info_present_in_slice_header_flag is 1, split_info_present_in_slice_header_flag indicates that additional information is transmitted in the slice header. When the value of split_info_present_in_slice_header_flag is 0, split_info_present_in_slice_header_flag indicates that no additional information is transmitted in the slice header.

sps_extension_present_flag indicates whether the syntax structure of sps_extension_data is present in the SPS syntax structure. When the value of sps_extension_present_flag is 0, sps_extension_present_flag indicates that the syntax structure of sps_extension_data is not present. When the value of sps_extension_present_flag is 1, sps_extension_present_flag indicates that the syntax structure of sps_extension_data is present.

sps_extension_data_flag has any value. The presence and value of this information does not affect the decoding performance of the reception device.

The syntax for the SPS according to the embodiments shown in FIG. 23 is not limited to the above-described example and may further include additional information (or fields, parameters, etc.) not shown in the figure.

Figure 24:
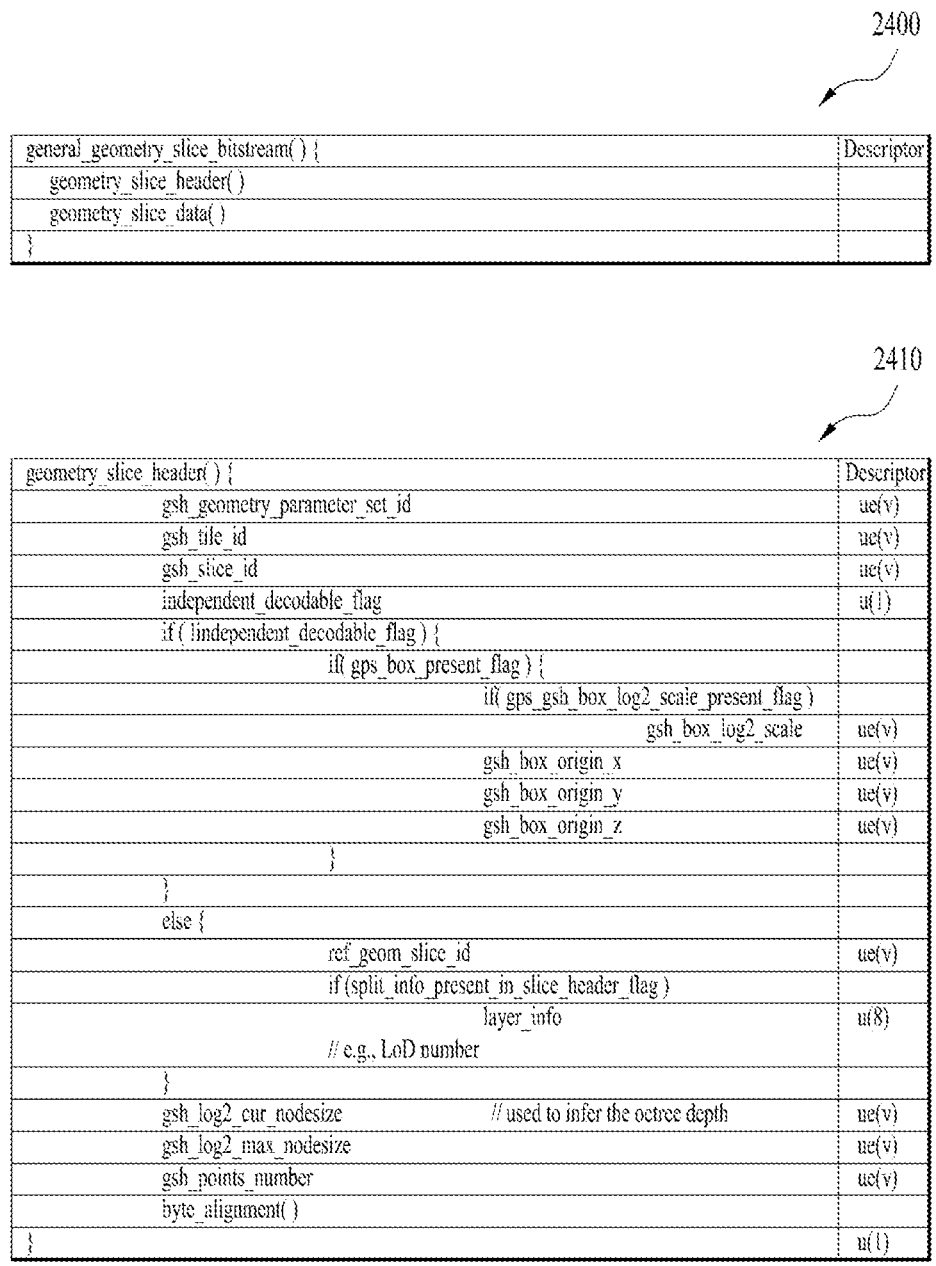
FIG. 24 shows an exemplary syntax for a geometry slice bitstream according to embodiments.

FIG. 24 shows an exemplary syntax for a geometry slice bitstream according to embodiments.

FIG. 24 shows an exemplary syntax for a geometry bitstream (or a geometry slice bitstream) corresponding to one slice when point cloud data is divided into one or more slices.

A first syntax 2400 shown in FIG. 24 represents an exemplary syntax for a geometry slice bitstream according to embodiments. The geometry slice bitstream includes a geometry slice header (geometry_slice_header) and geometry slice data (geometry_slice_data).

A second syntax 2410 shown in FIG. 24 is an exemplary syntax for a geometry slice header according to embodiments. The syntax for the geometry slice header may include the following information (or fields, parameters, etc.).

gsh_geometry_parameter_set_id specifies an identifier of the active GPS or a value of the identifier.

gsh_tile_id specifies the identifier of a tile referenced by the geometry slice header or the value of the identifier. The value of gsh_tile_id according to the embodiments is in the range of 0 to an arbitrary value.

gsh_slice_id identifies the slice header for reference by other syntaxes. The value of gsh_slice_id is in the range from 0 to an arbitrary value.

independent_decodable_flag indicates whether the slice can be independently decoded. When the value of independent_decodable_flag is 1, independent_decodable_flag indicates that the slice may be independently decoded. When the value of independent_decodable_flag is 0, independent_decodable_flag indicates that the slice may not be independently decoded. Accordingly, the reception device (e.g., the reception device 10004 of FIG. 1, the point cloud decoder of FIGS. 10 and 11, or the reception device of FIG. 13) may decode the slice based on another slice.

As described with reference to FIGS. 1 to 22, a higher LOD level should refer to point cloud data of a lower LOD level. Accordingly, when the value of split_type described with reference to FIG. 23 is 0, independent_decodable_flag of a slice corresponding to LOD 0 may be equal to 1, and independent_decodable_flag of slices corresponding to LOD 1 to LoD N may be equal to 0.

When the value of independent_decodable_flag is 1, the following related information is configured.

gps_box_present_flag indicates whether a bounding box for the slice is present. When the value of gps_box_present_flag is 1, gps_box_present_flag indicates that a bounding box for the slice is present. When the value of gps_box_present_flag is 1, the syntax for the geometry slice header further includes the following information.

gps_gsh_box_log 2_scale_present_flag indicates whether the original scale of the bounding box is equal to gsh_box_log 2_scale. gsh_box_log 2_scale according to the embodiments indicates a scale factor applied to each slice. gps_gsh_box_log 2_scale according to the embodiments indicates a scale factor commonly applied to all slices.

When the value of gps_gsh_box_log 2_scale_present_flag is 0, gps_gsh_box_log 2_scale_present_flag indicates that the value of the original scale is defined to be equal to the value of gsh_box_log 2_scale. When the value of gps_gsh_box_log 2_scale_present_flag is 1, gps_gsh_box_log 2_scale_present_flag indicates that the value of the original scale is defined to be equal to the value of gps_gsh_box_log 2_scale.

When the value of gps_gsh_box_log 2_scale_present_flag is 1, the syntax 2410 for the geometry_slice_header includes gsh_box_log 2_scale.

gsh_box_log 2_scale indicates the scale factor of the origin of the bounding box for each slice identified by gsh_slice_id.

gsh_box_origin_x specifies the value of x of the origin of the bounding box scaled by the value indicated by gsh_box_log 2_scale. gsh_box_origin_x is equal to slice_origin_x and less than the original scale.

gsh_box_origin_y specifies the value of y of the origin of the bounding box scaled by the value indicated by gsh_box_log 2_scale. gsh_box_origin_y is equal to slice_origin_y and less than the original scale.

gsh_box_origin_z specifies the value of z of the origin of the bounding box scaled by the value indicated by gsh_box_log 2_scale. gsh_box_origin_z is equal to slice_origin_z and less than the original scale.

When the value of gps_box_present_flag is 0, the values of x, y, and z of the slice_origin are inferred to be 0.

When the value of independent_decodable_flag is 0, the following related information is configured.

ref_geom_slice_id indicates an ID of a geometry slice bitstream referred to in decoding a slice. The value of ref_geom_slice_id is equal to the value of gsh_slice_id of the geometry slice bitstream.

split_info_present_in_slice_header_flag indicates whether additional information is transmitted in the geometry slice header. When the value of split_info_present_in_slice_header_flag is 1, split_info_present_in_slice_header_flag indicates that additional information is transmitted in the geometry slice header. When the value of split_info_present_in_slice_header_flag is 0, split_info_present_in_slice_header_flag indicates that no additional information is transmitted in the geometry slice header.

When the value of split_info_present_in_slice_header_flag is 1, the syntax 2410 for the geometry_slice_header includes layer_info.

layer_info indicates a layer of geometry data included in a slice (e.g., the layer described with reference to FIGS. 19 to 22). When the value of split_type described with reference to FIG. 23 is 0, layer_info indicates an LOD level. When the value of the split_type information described with reference to FIG. 23 is 1, layer_info indicates an octree level (or octree depth).

The syntax 2410 for the geometry slice header according to the embodiments further includes the following information.

gsh_log 2_cur_nodesize indicates the node size of the octree structure used to represent the point cloud data included in the slice. When the slice is divided by octree structure-based layering, gsh_log 2_cur_nodesize indicates the node size of the octree depth corresponding to each layer. Since a node according to the embodiments represents a three-dimensional cube, the node size is expressed as N×N×N. N is an integer. For example, the node size may be expressed as 1 when the octree depth layer is Max (that is, the octree node size is 1×1×1), 2 when the octree depth layer is Max −1, and 2×2 when the octree depth layer is Max−2. gsh_log 2_cur_nodesize equal to 1 indicates the same resolution as the original point cloud data. In addition, when the value of full_res_flag described with reference to FIG. 23 is 0, it may indicate that subsampled point cloud data is represented.

Also, when one slice includes geometry data corresponding to one or more octree depths, gsh_log 2_cur_nodesize indicates the node size for a depth closest to the leaf node.

gsh_log 2_max_nodesize specifies the value of the variable MaxNodeSize used in the decoding process
MaxNodeSize is expressed as follows.

$$\text{MaxNodeSize} = 2^{(gsh\_log\ 2\_max\_nodesize)}$$

The depth of the octree is calculated as follows.

Octree depth layer=*gsh*_log 2_max_nodesize/*gsh*_log 2_*cur*_nodesize

Accordingly, the reception device according to the embodiments may check the octree structure depth of the point cloud data (or geometry) included in the current geometry slice based on gsh_log 2_cur_nodesize and gsh_log 2_max_nodesize.

gsh_points_number indicates the number of encoded points in the slice.

The syntax 2410 for the geometry slice header according to the embodiments shown in FIG. 24 is not limited to the above-described example and may further include additional information (or fields, parameters, etc.) not shown in the figure.

Figure 25:
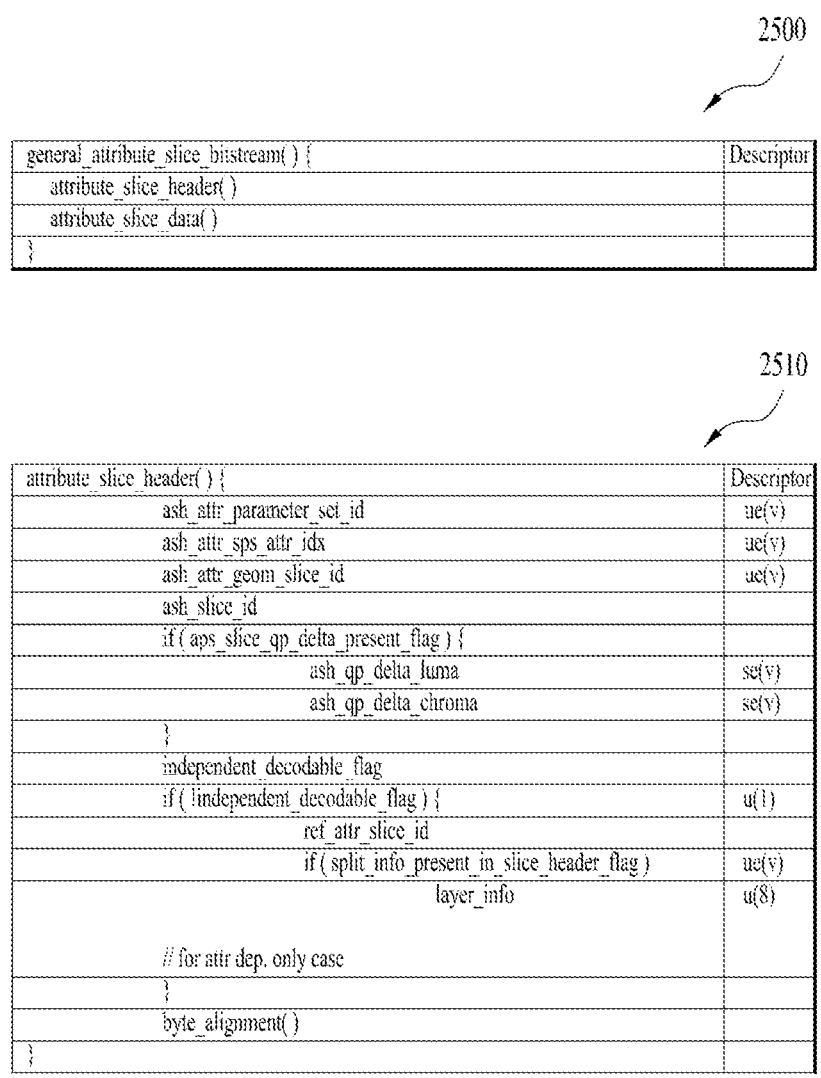
FIG. 25 shows an exemplary syntax for an attribute slice bitstream according to embodiments.

FIG. 25 shows an exemplary syntax for an attribute slice bitstream according to embodiments.

FIG. 25 shows an exemplary syntax for an attribute bitstream (or an attribute slice bitstream) corresponding to one slice when point cloud data is divided into one or more slices.

A first syntax 2500 shown in FIG. 25 is an exemplary syntax for an attribute slice bitstream according to embodiments. The attribute slice bitstream includes an attribute slice header (attribute_slice_header) and attribute slice data (attribute_slice_data).

A second syntax 2510 shown in FIG. 25 is exemplary syntax for an attribute slice header according to embodiments. The syntax for the attribute slice header may include the following information (or fields, parameters, etc.).

ash_attr_parameter_set_id has the same value as aps_attr_parameter_set_id of active APSs (e.g., aps_attr_parameter_set_id included in the syntax for the APS).

ash_attr_sps_attr_idx identifies an attribute set included in an active SPS.

The value of ash_attr_sps_attr_idx is in the range of 0 to the value of sps_num_attribute_sets included in the active SPS.

ash_attr_geom_slice_id specifies the value of gsh_slice_id of the active geometry slice header (e.g., gsh_slice_id in the syntax 2410 for the geometry slice header described with reference to FIG. 24). As described with reference to FIGS. 1 to 24, attribute decoding is performed based on geometry decoding. Accordingly, ash_attr_geom_slice_id indicates the geometry slice referenced by the attribute slice.

aps_slice_qp_delta_present_flag indicates whether a quantization parameter is included in the attribute slice header.

When the value of aps_slice_qp_delta_present_flag is 1, the syntax 2510 for the attribute slice header includes ash_qp_delta_luma and ash_qp_delta_chroma.

ash_qp_delta_luma specifies the luma delta ap from the initial slice qp in the active attribute parameter set. When this information is not signaled, the value of ash_qp_delta_luma is inferred to be 0.

ash_qp_delta_chroma specifies the chroma delta ap from the initial slice qp in the active attribute parameter set. When this information is not signaled, the value of ash_qp_delta_chroma is inferred to be 0.

independent_decodable_flag indicates whether the slice can be independently decoded. When the value of independent_decodable_flag is 1, independent_decodable_flag indicates that the slice may be independently decoded. When the value of independent_decodable_flag is 0, independent_decodable_flag indicates that the slice may not be independently decoded. Accordingly, the reception device (e.g., the reception device 10004 of FIG. 1, the point cloud decoder of FIGS. 10 and 11, or the reception device of FIG. 13) may decode the slice based on another slice.

When the value of independent_decodable_flag is 0, the following related information is configured.

ref_attr_slice_id indicates the ID of another slice (or attribute slice bitstream) referred to in decoding a slice. The value of ref_attr_slice_id is equal to the value of ash_slice_id of the attribute slice bitstream. As described above, attribute decoding is based on geometry decoding. Accordingly, the reception device according to the embodiments may identify, through ref_geom_slice_id (e.g., ref_geom_slice_id in the syntax 2410 for the geometry slice header described with reference to FIG. 24), a geometry slice required to decode a slice identified by ref_attr_slice_id. In addition, the syntax 2510 for the attribute slice header may further include information (e.g., ash_attr_geom_slice_id) for identifying a geometry slice required to decode the slice indicated by ref_attr_slice_id.

split_info_present_in_slice_header_flag indicates whether additional information is transmitted in the attribute_slice_header. When the value of split_info_present_in_slice_header_flag is 1, split_info_present_in_slice_header_flag indicates that additional information is transmitted in the attribute_slice_header. When the value of split_info_present_in_slice_header_flag is 0, split_info_present_in_slice_header_flag indicates that no additional information is transmitted in the attribute slice header.

When the value of split_info_present_in_slice_header_flag is 1, the syntax 2510 for the attribute slice header includes layer_info.

layer_info indicates a layer of attribute data included in a slice (e.g., the layer described with reference to FIGS. 19 to 22). When the value of split_type described with reference to FIG. 23 is 0, layer_info indicates an LOD level. When the value of the split_type information described with reference to FIG. 23 is 1, layer_info indicates an octree level (or octree depth).

The syntax 2510 for the attribute slice header according to the embodiments shown in FIG. 25 is not limited to the above-described example and may further include additional information (or fields, parameters, etc.) not shown in the figure.

Figure 26:
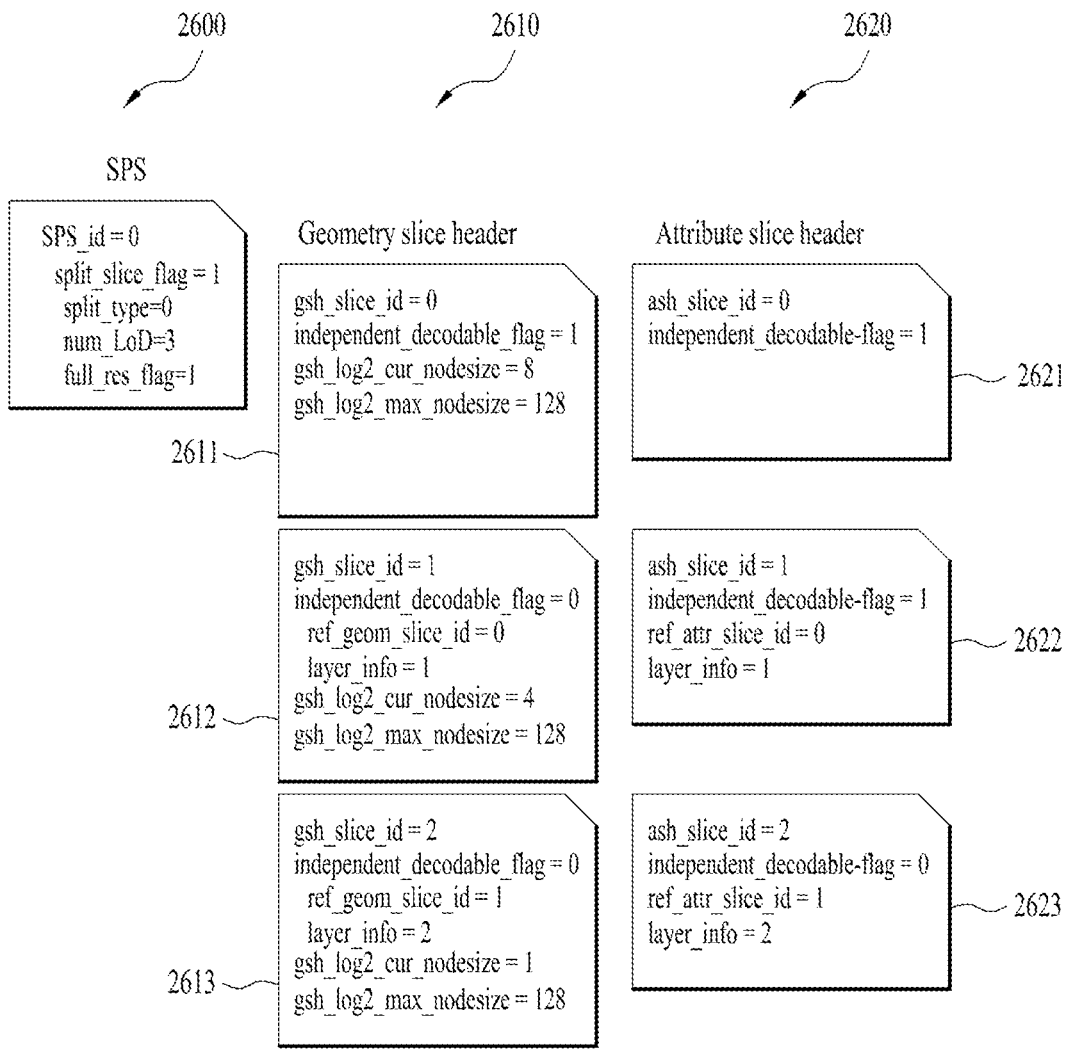
FIG. 26 shows a structure of signaling information according to embodiments.

FIG. 26 shows a structure of signaling information according to embodiments.

As described with reference to FIGS. 23 to 25, a bitstream according to embodiments includes an SPS, one or more geometry slices, and one or more attribute slices. The point cloud data processing device (e.g., the transmission device 10000 described with reference to FIG. 1 or the transmission device described with reference to FIG. 12) according to the embodiments transmits the full layered geometry as shown in the example 1910 of FIG. 19 (e.g., geometry corresponding to LOD 0 to LOD N (the highest level N (e.g., 2))) and layered attribute (e.g., an attribute corresponding to LOD 0 to LOD N (the highest level N (e.g., 2))). FIG. 26 shows an example of the structure of signaling information when the full geometry and full attributes which have a 3-level LOD-based layer structure.

An example 2600 of FIG. 26 shows a syntax for the SPS. The SPS according to the embodiments includes information (or parameters) included in the syntax for the SPS described with reference to FIG. 23. Thus, a description of the information included in the syntax for the SPS will be omitted. As shown in FIG. 26, the SPS includes the SPS-id. Since the geometry and attributes according to the embodiments have a 3-level LOD-based layer structure, split_slice flag is 1, split_type is 0, and num_LOD is 3. Also, since the geometry and attributes according to the embodiments correspond to the full LOD, full_res_flag is 1.

As described with reference to FIGS. 19 to 25, a slice includes one geometry sub-bitstream or a geometry sub-bitstream corresponding to one layer.

As described above, the geometry has a three-level LOD-based layer structure. Accordingly, the geometry according to the embodiments includes a first geometry slice corresponding to a first level (or first layer), which is the lowest level, a second geometry slice corresponding to a second level (or second layer), and a third geometry slice corresponding to a third level (or third layer), which is the highest level.

Each geometry slice includes a geometry slice header and geometry slice data (or the geometry sub-bitstream described with reference to FIGS. 19 to 22). The first geometry slice includes a first geometry sub-bitstream (e.g., the first geometry sub-bitstream 2111), the second geometry slice includes a second geometry sub-bitstream (e.g., the second geometry sub-bitstream 2112), and the third geometry slice includes a third geometry sub-bitstream (e.g., the third geometry sub-bitstream 2113).

An example 2610 of FIG. 26 shows a syntax 2611 for a first geometry slice header, a syntax 2612 for a second geometry slice header, and a syntax 2613 for a third geometry slice header. The syntax 2611 for the first geometry slice header, the syntax 2612 for the second geometry slice header, and the syntax 2613 for the third geometry slice header are included in each geometry slice. For simplicity, the example 2610 shows syntaxes for the geometry slice headers.

The syntax for each geometry slice header according to the embodiments includes information (or parameters) included in the syntax 2410 for the geometry slice header described with reference to FIG. 24. Accordingly, a description of the information included in the syntax for the geometry slice header according to the embodiments will be omitted.

The first geometry slice is a geometry slice that comes first. Accordingly, the value of gsh_slice_id included in the syntax 2611 for the first geometry slice header according to the embodiments is 0. As described above, the first geometry slice corresponds to the lowest level (or layer). Accordingly, the reception device according to the embodiments (e.g., the reception device 10004 of FIG. 1, the point cloud decoder of FIGS. 10 and 11, or the reception device of FIG. 13) may decode data included in the first geometry slice without any other geometry slice and provide point cloud content. Accordingly, the value of independent_decodable_flag is 1. As the LOD level decreases, the node size of the octree depth increases. The syntax 2611 for the first geometry slice header includes gsh_log 2_cur_nodesize having a value of 8 and gsh_log 2_max_nodesize having a value of 128. The second geometry slice is a geometry slice that comes second. Accordingly, the value of gsh_slice_id included in the syntax 2612 for the second geometry slice header according to the embodiments is 1. As described above, the second geometry slice corresponds to the second level (or layer). Accordingly, in order to decode data included in the second geometry slice, the reception device according to the embodiments needs a geometry slice of a lower level than the second geometry slice. Accordingly, the value of independent_decodable_flag is 0. The syntax 2612 for the second geometry slice header according to the embodiments further includes ref_geom_slice_id and layer_info. The value of ref_geom_slice_id according to the embodiments is equal to 0, which is the value of gsh_slice_id of the first geometry slice. layer_info according to the embodiments indicates a layer of the second geometry slice. Accordingly, the value of layer_info is 1.

As the LOD level rises, the node size of the octree depth decreases. The syntax 2612 for the second geometry slice header includes gsh_log 2_cur_nodesize having a value of 4 and gsh_log 2_max_nodesize having a value of 128.

The third geometry slice is a geometry slice that comes third. Accordingly, the value of gsh_slice_id included in the syntax 2613 for the third geometry slice header according to the embodiments is 2. As described above, the third geometry slice corresponds to the third level (or layer). Accordingly, in order to decode data included in the third geometry slice, the reception device according to the embodiments needs a geometry slice of a lower level than the third geometry slice. Accordingly, the value of independent_decodable_flag is 0. The syntax 2613 for the third geometry slice header according to the embodiments further includes ref_geom_slice_id and layer_info. The value of ref_geom_slice_id according to the embodiments is equal to 1, which is the value of gsh_slice_id of the second geometry slice. layer_info according to the embodiments indicates the layer of the third geometry slice. Accordingly, the value of layer_info is 2.

As the LOD level increases, the node size of the octree depth decreases. The syntax 2613 for the third geometry slice header includes gsh_log 2_cur_nodesize having a value of 1 and gsh_log 2_max_nodesize having a value of 128.

As described with reference to FIGS. 19 to 25, a slice includes one attribute sub-bitstream or an attribute sub-bitstream corresponding to one layer.

As described above, the attribute has a three-level LOD-based layer structure. Accordingly, the attribute according to the embodiments includes a first attribute slice corresponding to a first level (or first layer), which is the lowest level, a second attribute slice corresponding to a second level (or second layer), and a third attribute slice corresponding to a third level (or third layer), which is the highest level.

Each attribute slice includes an attribute slice header and attribute slice data (or the attribute sub-bitstream described with reference to FIGS. 19 to 22). The first attribute slice includes a first attribute sub-bitstream (e.g., the first attribute sub-bitstream 2121), the second attribute slice includes a second attribute sub-bitstream (e.g., the second attribute sub-bitstream 2122), and the third attribute slice includes a third attribute sub-bitstream (e.g., the third attribute sub-bitstream 2123).

An example 2620 of FIG. 26 shows a syntax 2621 for a first attribute slice header, a syntax 2622 for a second attribute slice header, and a syntax 2623 for a third attribute slice header. The syntax 2621 for the first attribute slice header, the syntax 2622 for the second attribute slice header, and the syntax 2623 for the third attribute slice header are included in each attribute slice. For simplicity, the example 2620 shows syntaxes for the attribute slice headers together.

The syntax for each attribute slice header according to the embodiments includes information (or parameters) included in the syntax 2510 for the attribute slice header described with reference to FIG. 25. Accordingly, a description of the information included in the syntax for the attribute slice header according to the embodiments will be omitted.

The first attribute slice is an attribute slice that comes first. Accordingly, the value of ash_slice_id included in the syntax 2621 for the first attribute slice header according to the embodiments is 0. As described above, the first attribute slice corresponds to the lowest level (or layer). Accordingly, the reception device according to the embodiments may decode data included in the first attribute slice without any other attribute slice and provide point cloud content. Accordingly, the value of independent_decodable_flag is 1.

The second attribute slice is an attribute slice that comes second. Accordingly, the value of ash_slice_id included in the syntax 2622 for the second attribute slice header according to the embodiments is 1. As described above, the second attribute slice corresponds to the second level (or layer). Accordingly, in order to decode data included in the second attribute slice, the reception device according to the embodiments needs a attribute slice of a lower level than the second attribute slice. Accordingly, the value of independent_decodable_flag is 0. The syntax 2622 for the second attribute_slice_header according to the embodiments further includes ref_attr_slice_id and layer_info. The value of ref_attr_slice_id according to the embodiments is equal to 0, which is the value of ash_slice_id of the first attribute slice. layer_info according to the embodiments indicates a layer of the second attribute slice. Accordingly, the value of layer_info is 1.

The third attribute slice is an attribute slice that comes third. Accordingly, the value of ash_slice_id included in the syntax 2623 for the third attribute slice header according to the embodiments is 2. As described above, the third attribute slice corresponds to the third level (or layer). Accordingly, in order to decode data included in the third attribute slice, the reception device according to the embodiments needs a attribute slice of a lower level than the third attribute slice. Accordingly, the value of independent_decodable_flag is 0. The syntax 2623 for the third attribute slice header according to the embodiments further includes ref_attr_slice_id and layer_info. The value of ref_attr_slice_id according to the embodiments is equal to 1, which is the value of ash_slice_id of the second attribute slice. layer_info according to the embodiments indicates the layer of the third attribute slice. Accordingly, the value of layer_info is 2.

The syntax for the attribute slice header according to the embodiments may further include information on a related geometry slice.

Accordingly, the reception device may receive a bitstream, acquire signaling information from the SPS, the geometry slice header, and the attribute slice header described with reference to FIGS. 24 to 26, and decode the geometry and attributes corresponding to a specific layer (or level) to perform scalable representation.

Figure 27:
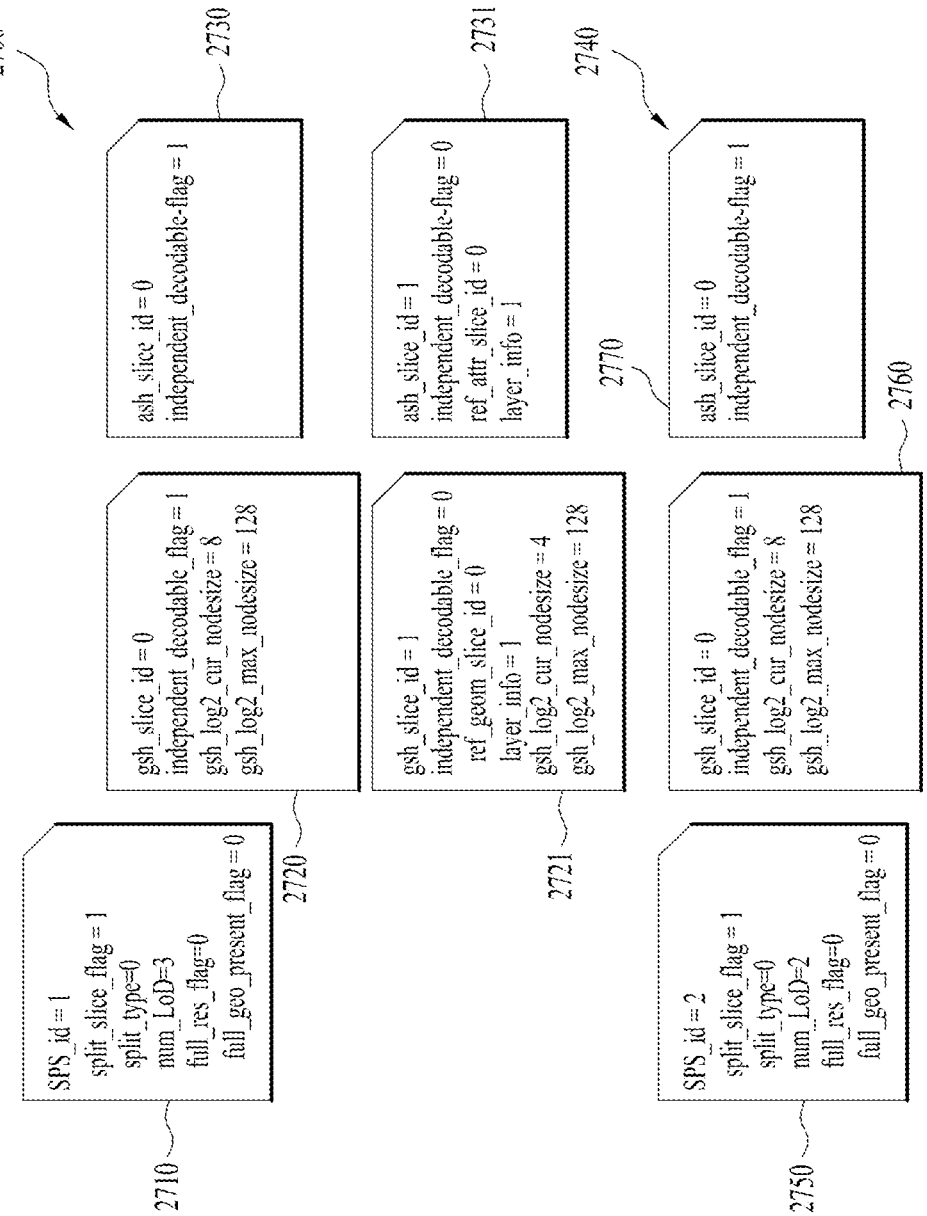
FIG. 27 shows a structure of signaling information according to embodiments.

FIG. 27 shows a structure of signaling information according to embodiments.

FIG. 27 shows an exemplary structure of the signaling information described with reference to FIG. 26.

An example 2700 shown at the top of FIG. 27 represents an exemplary structure of signaling information configured when a partial geometry and partial attribute corresponding to one or more layers are transmitted for a geometry and attributes having a 3-level LOD-based layer structure. The example 2700 shown at the top of FIG. 27 represents the structure of signaling information configured in transmitting a first geometry slice and a second geometry slice (e.g., the first geometry slice and the second geometry slice described with reference to FIG. 26) and a first attribute slice and a second attribute slice (e.g., the first attribute slice and the second attribute slice described with reference to FIG. 26), which correspond to the first layer and the second layer.

The example 2700 of FIG. 27 includes a syntax 2710 for the SPS. Information included in the syntax 2710 for the SPS is the same as that described with reference to FIG. 26, except that full_res_flag has a different value. Since the geometry and attributes according to the embodiments correspond only to some LODs, the value of full_res_flag is 0, and the value of full_geo_present_flag is 0. Since a syntax 2720 for the first geometry slice header and a syntax 2721 for the second geometry slice header included in the example 2700 of FIG. 27 are the same as the syntax 2611 for the first geometry slice header and the syntax 2612 for the second geometry slice header described with reference to FIG. 26, a detailed description thereof will be omitted. Since a syntax 2730 for the first attribute slice header and a syntax 2731 for the second attribute slice header included in the example 2700 of FIG. 27 are the same as the syntax 2621 for the first attribute slice header and the syntax 2622 for the second attribute slice header described with reference to FIG. 26, a detailed description thereof will be omitted.

An example 2740 shown at the bottom of FIG. 27 represents an exemplary structure of signaling information when a partial geometry and partial attribute corresponding to one or more layers are transmitted for a geometry and attributes having a 2-level LOD-based layer structure. The example 2740 shown at the bottom of FIG. 27 represents the structure of signaling information configured in transmitting a first geometry slice (e.g., the first geometry slice described with reference to FIG. 26) and a first attribute slice (e.g., the first attribute slice described with reference to FIG. 26), which correspond to the first layer.

The example 2740 of FIG. 27 includes a syntax 2750 for the SPS. The syntax 2750 for the SPS includes the same information as that in the syntax 2710 for the SPS described above, but has a different LOD level. Accordingly, the value of num_LOD is 2. Since a syntax 2760 for the first geometry slice header included in the example 2740 of FIG. 27 is the same as the syntax 2611 for the first geometry slice header described with reference to FIG. 26, a detailed description thereof will be omitted. Since a syntax 2770 for the first attribute slice header included in the example 2740 of FIG. 27 is the same as the syntax 2621 for the first attribute slice header described with reference to FIG. 26, a detailed description thereof will be omitted.

Accordingly, the reception device according to the embodiments (e.g., the reception device 10004 of FIG. 1, the point cloud decoder of FIGS. 10 and 11, or the reception device of FIG. 13) may receive a bitstream, acquire signaling information from the SPS, the geometry slice header, and the attribute slice header described with reference to FIGS. 24 to 27, and decode the geometry and attributes corresponding to a specific layer (or level) to perform scalable representation.

Figure 28:
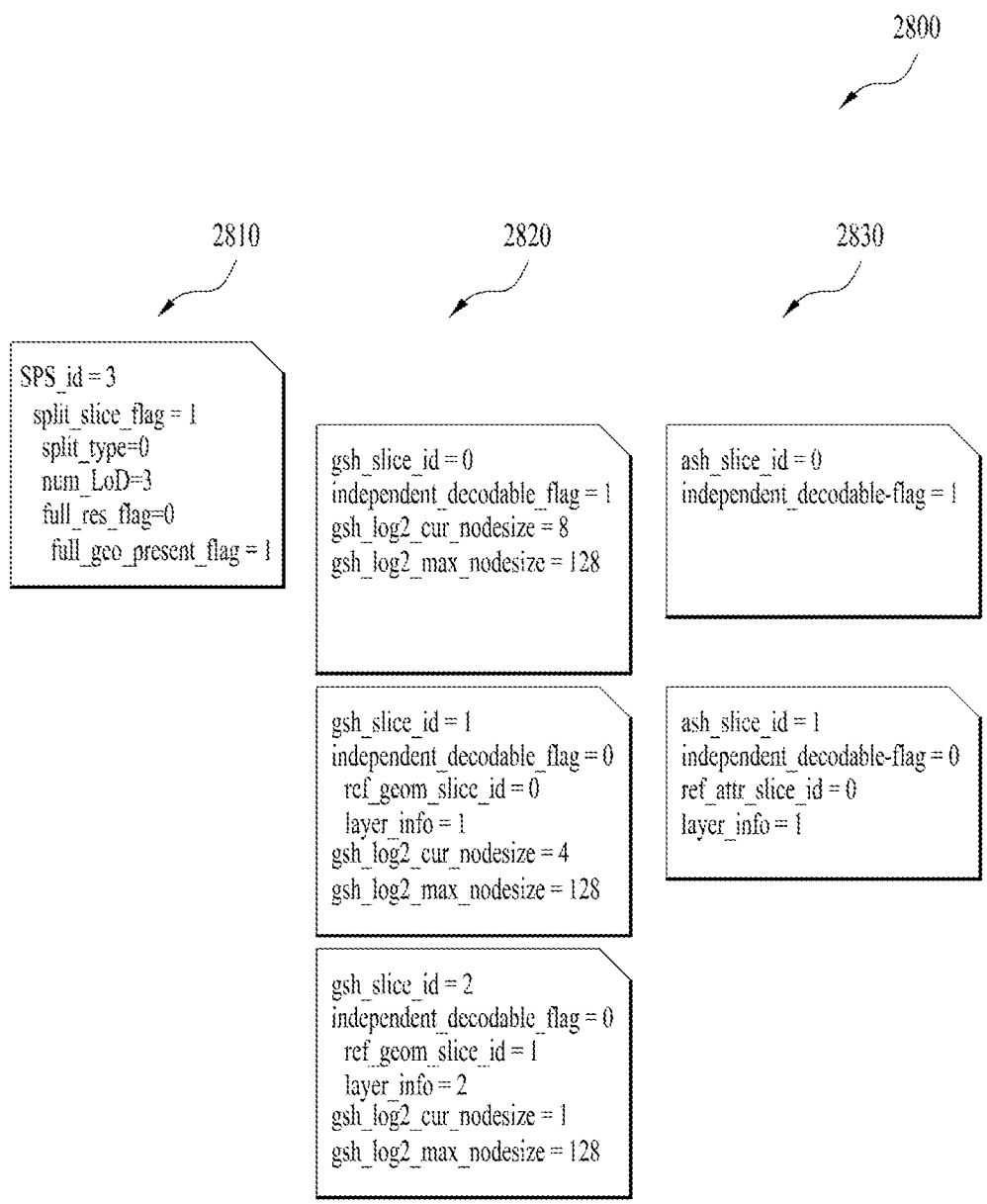
FIG. 28 shows a structure of signaling information according to embodiments.

FIG. 28 shows a structure of signaling information according to embodiments.

FIG. 28 shows an exemplary structure of the signaling information described with reference to FIGS. 26 and 27. An example 2800 shown in FIG. 28 represents an exemplary structure of signaling information configured when first to third geometry slices (e.g., the first to third geometry slices described with reference to FIG. 26) corresponding to the first to third layers and first and second attribute slices (e.g., the first and second attribute slices described with reference to FIG. 26) corresponding to the first layer and the second layer are transmitted for geometry and attributes having a 3-level LOD-based layer structure.

The example 2800 of FIG. 28 includes a syntax 2810 for the SPS. The information included in the syntax 2810 for the SPS is the same as that described with reference to FIG. 26, except that the geometry corresponds to the entire LODs and the attribute corresponds to only some LODs. Accordingly, the value of full_res_flag is 0 and the value of full_geo_present_flag is 1.

Since an example 2820 of the syntaxes from the syntax for the first geometry slice header to the syntax for the third geometry slice header included in the example 2800 of FIG. 28 is the same as the syntaxes from the syntax 2611 for the first geometry slice header to the syntax 2623 for the third geometry slice header described with reference to FIG. 26, a detailed description thereof will be omitted. Since an example 2830 of the syntax for the first attribute slice header and the syntax for the second attribute slice header included in the example 2800 of FIG. 28 is the same as the syntax 2621 for the first attribute slice header and the syntax 2622 for the second attribute slice header described with reference to FIG. 26, a detailed description thereof will be omitted.

Accordingly, the reception device according to the embodiments (e.g., the reception device 10004 of FIG. 1, the point cloud decoder of FIGS. 10 and 11, or the reception device of FIG. 13) may receive a bitstream, acquire signaling information from the SPS, the geometry slice header, and the attribute slice header described with reference to FIGS. 24 to 27, and decode the geometry and attributes corresponding to a specific layer (or level) to perform scalable representation.

Figure 29:
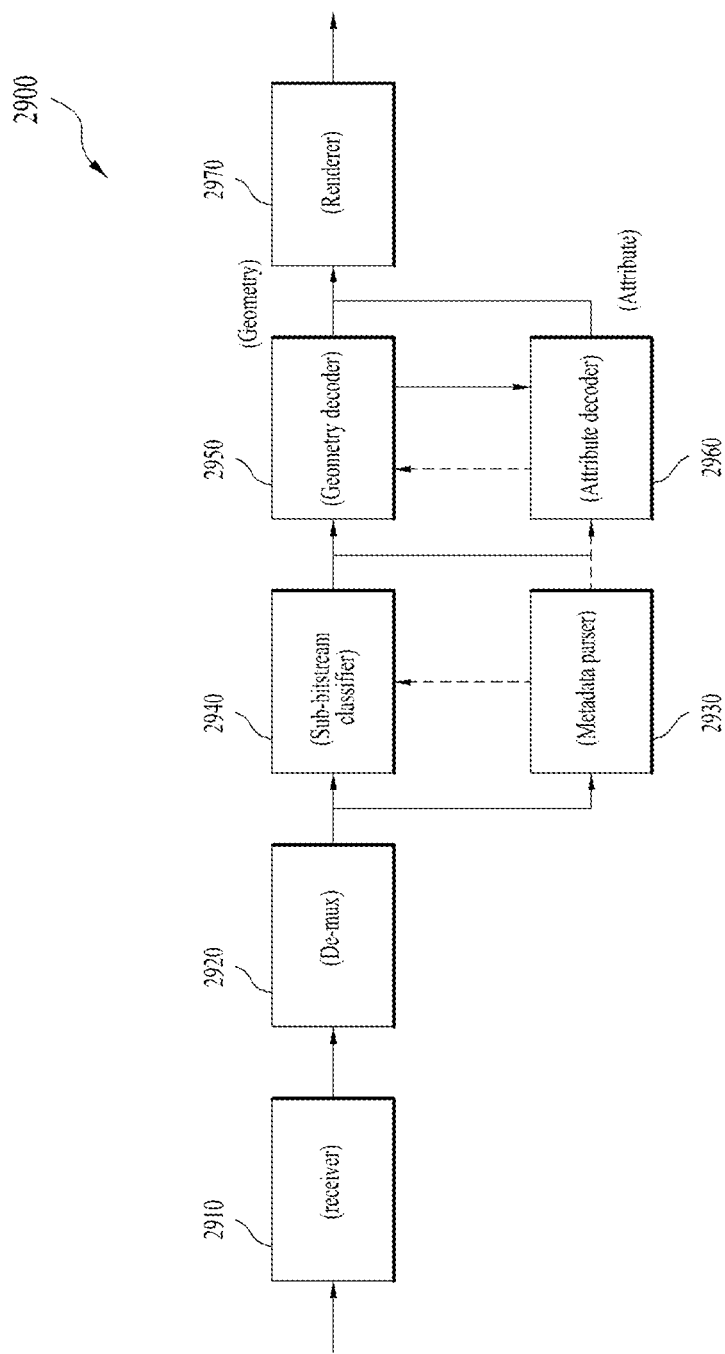
FIG. 29 illustrates an exemplary point cloud data processing device according to embodiments.

FIG. 29 illustrates an exemplary point cloud data processing device according to embodiments.

The point cloud data processing device 2900 according to the embodiments shown in FIG. 29 is an example of the reception device 10004 of FIG. 1, the point cloud decoder of FIGS. 10 and 11, and the reception device of FIG. 13. Accordingly, the point cloud data processing device 2900 performs an operation corresponding to the reverse process of the operation of the point cloud data processing device 2000 described with reference to FIG. 20. The point cloud data processing device 2900 performs an operation which is the same as or similar to that of the reception device described with reference to FIGS. 1 to 28. Although not shown in FIG. 29, the point cloud data processing device 2900 may further include one or more elements to perform the decoding operation described with reference to FIGS. 1 to 28.

The point cloud data processing device 2900 includes a receiver 2910, a de-mux 2920, a metadata parser 2930, a sub-bitstream classifier 2940, a geometry decoder 2950, an attribute decoder 2960, and a renderer 2970.

The receiver 2910 according to the embodiments receives data output from the transmission device (e.g., the transmission device 10000 described with reference to FIG. 1, the transmission device described with reference to FIG. 12, or the point cloud data processing device 2000 described with reference to FIG. 20). The data received by the receiver 2910 corresponds to the bitstream described with reference to FIG. 1 and data output from the transmitter 2060 described with reference to FIG. 20.

The de-mux 2920 according to the embodiments demultiplexes the received data. That is, the received data may be demultiplexed into a geometry bitstream or geometry sub-bitstream, an attribute bitstream or attribute sub-bitstream, and metadata (or signaling information, parameters, etc.).

The metadata parser 2930 according to the embodiments acquires metadata output from the de-mux 2920. The metadata according to the embodiments may include the SPS described with reference to FIGS. 23 to 28. Accordingly, the point cloud data processing device 2900 according to the embodiments may secure information related to layering of the geometry and attributes based on the metadata. Also, the metadata parser 2930 may transmit information required for geometry decoding and/or attribute decoding to each decoder. The sub-bitstream classifier 2930 according to the embodiments classifies a geometry sub-bitstream and an attribute sub-bitstream required for decoding based on the information included in the headers (e.g., the geometry slice header or the attribute slice header described with reference to FIGS. 24 and 25) of the geometry bitstream or geometry sub-bitstream (e.g., the geometry sub-bitstream described with reference to FIGS. 21 and 22) and the attribute bitstream or attribute sub-bitstream (e.g., the attribute sub-bitstream described with reference to FIGS. 21 and 22) and the information output from the metadata parser 2930. Also, the sub bitstream classifier 2940 may select a layer of the geometry and attributes. The geometry decoder 2950 according to the embodiments receives one or more geometry sub-bitstreams corresponding to one or more layers and performs geometry decoding. The operation of the geometry decoder 2950 according to the embodiments are the same as or similar to the operation of the arithmetic decoder 11000, the octree synthesizer 11001, the surface approximation synthesizer 11002, the geometry reconstructor 11003, and the coordinate inverse transformer 11004 described with reference to FIG. 11, and accordingly a detailed description thereof will be omitted.

The attribute decoder 2960 according to the embodiments receives one or more attribute sub-bitstreams corresponding to one or more layers based on decoding by the geometry decoder 2950 and performs attribute decoding. The operation of the attribute decoder 2960 according to the embodiments is the same as or similar to the operations of the arithmetic decoder 11005, the inverse quantizer 11006, the RAHT transformer 11007, the LOD generator 11008, the inverse lifter 11009, and/or the color inverse transformer 11010 described with reference to FIG. 11, and therefore a detailed description thereof will be omitted. The renderer 2970 according to the embodiments may receive the geometry and attributes and transform the same into a format for final output.

Figure 30:
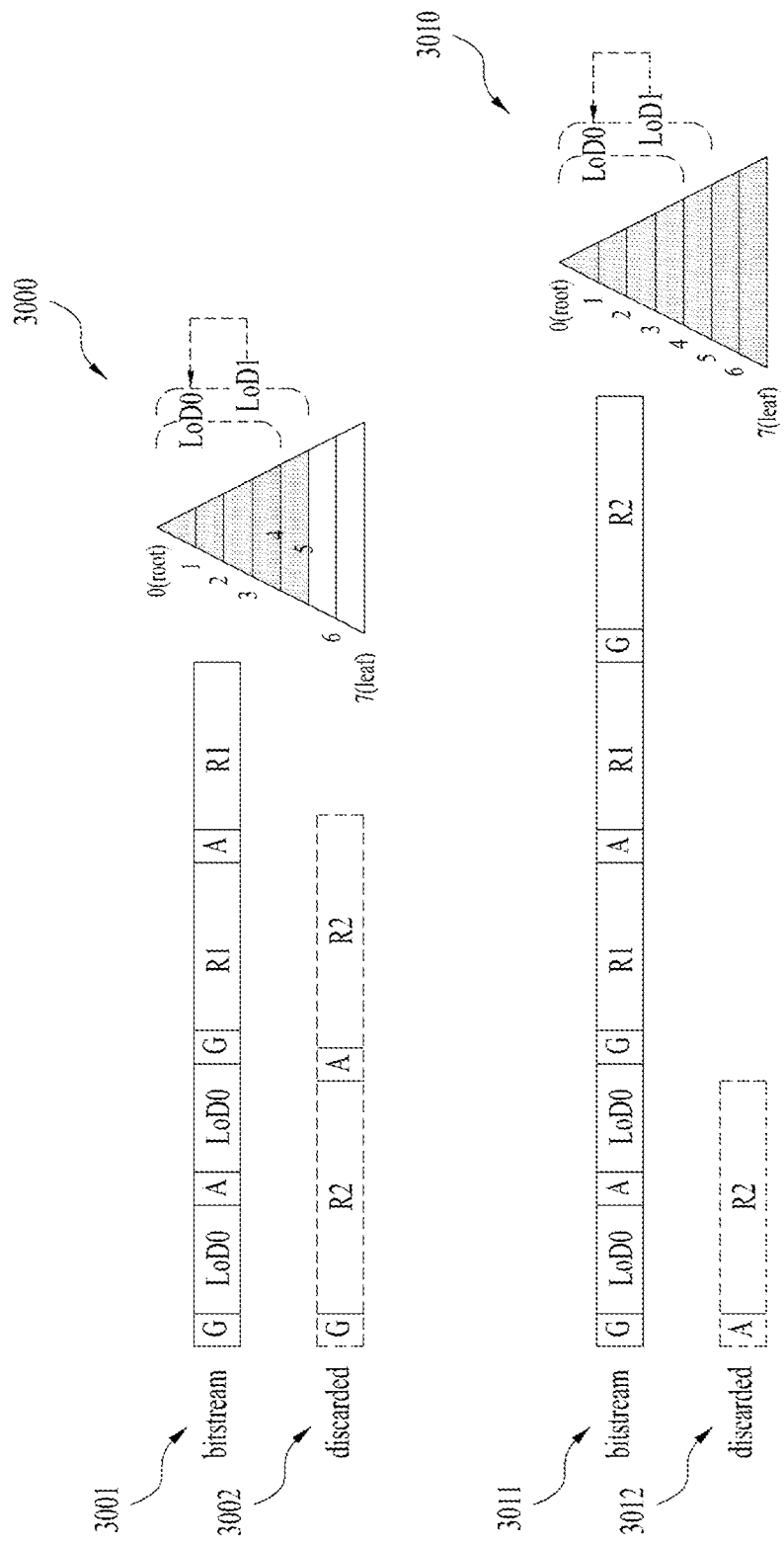
FIG. 30 illustrates an operation of point cloud decoding according to embodiments.

FIG. 30 illustrates an operation of point cloud decoding according to embodiments.

FIG. 30 illustrates the operation of the point cloud data processing device (e.g., the point cloud data processing device 2900 or the sub-bitstream classifier 2940 described with reference to FIG. 29) that receives a bitstream and classifies or selects one or more substreams.

An example 3000 shown at the top of FIG. 30 represents a process in which the point cloud data processing device according to the embodiments processes geometry sub-bitstreams (e.g., the first geometry sub-bitstream 2111 including a first geometry corresponding to LOD0, LOD1, and LOD2, the second geometry sub-bitstream 2112 including a second geometry R1 corresponding to LOD1 and LOD2, and the third geometry sub-bitstream 2113 including a third geometry R2 corresponding to only LOD2 as described with reference to FIG. 21) and attribute sub-bitstreams (e.g., the first attribute sub-bitstream 2121 including a first attribute corresponding to LOD0, LOD1, and LOD2, the second attribute sub-bitstream 2122 including a second attribute R1 corresponding to LOD1 and LOD2, and the third attribute sub-bitstream 2123 including a third attribute R2 corresponding to only LOD2 as described with reference to FIG. 21) that have an LOD-based layer structure according to the same layer. The point cloud data processing device according to the embodiments selects and decodes geometry sub-bitstreams and attribute sub-bitstreams according to a layer corresponding to LODs up to LOD 1. As shown in the right part of the example 3000, in order to process the point cloud data corresponding to LOD 1, the point cloud data corresponding to the LOD 0 should be processed together. Accordingly, the point cloud processing device selects geometry sub-bitstreams and attribute sub-bitstreams 3001 corresponding to LOD 0 and LOD 1 from the received bitstream, and performs geometry decoding and attribute decoding thereon, respectively. In example 3000, R1 represents geometry and attributes included only in LOD 1. The point cloud processing device does not select the geometry sub-bitstream and attribute bitstream 3002 corresponding to a higher-level LOD (e.g., LOD level 2) than LOD 1 from the received bitstream. In the example 3000, R2 represents geometry and attributes included only in LOD 2.

An example 3010 shown at the bottom of FIG. 30 represents a process in which the point cloud data processing device according to the embodiments processes geometry sub-bitstreams and attribute sub-bitstreams that have an LOD-based layer structure according to different layers. The point cloud data processing device according to the embodiments selects geometry sub-bitstreams according to a layer corresponding to LODs up to LOD 2 and selects and decodes attribute sub-bitstreams according to a layer corresponding to LODs up to LOD 1. As shown in the right part of the example 3010, in order to decode the geometry corresponding to LOD 2, geometry corresponding to LOD 0 and LOD 1 is required. Accordingly, the point cloud processing device selects geometry sub-bitstreams corresponding to LOD 0, LOD 1, and LOD 2 and attribute sub-bitstreams 3011 corresponding to LOD 0 and LOD 1 from the received bitstream, and performs geometry decoding and attribute decoding thereon, respectively. The point cloud processing device does not select the attribute bitstream 3012 corresponding to an LOD (e.g., LOD level 2) higher than LOD 1 from the received bitstream.

The transmission device according to the embodiments (e.g., the transmission device 10000 described with reference to FIG. 1, the transmission device described with reference to FIG. 12, or the point cloud data processing device 2000 described with reference to FIG. 20) may transmit a partial geometry and a partial attribute or a bitstream generated by removing a partial attribute according to the performance of the reception device, as shown in the examples 3000 and 3010 of FIG. 30.

Figure 31:
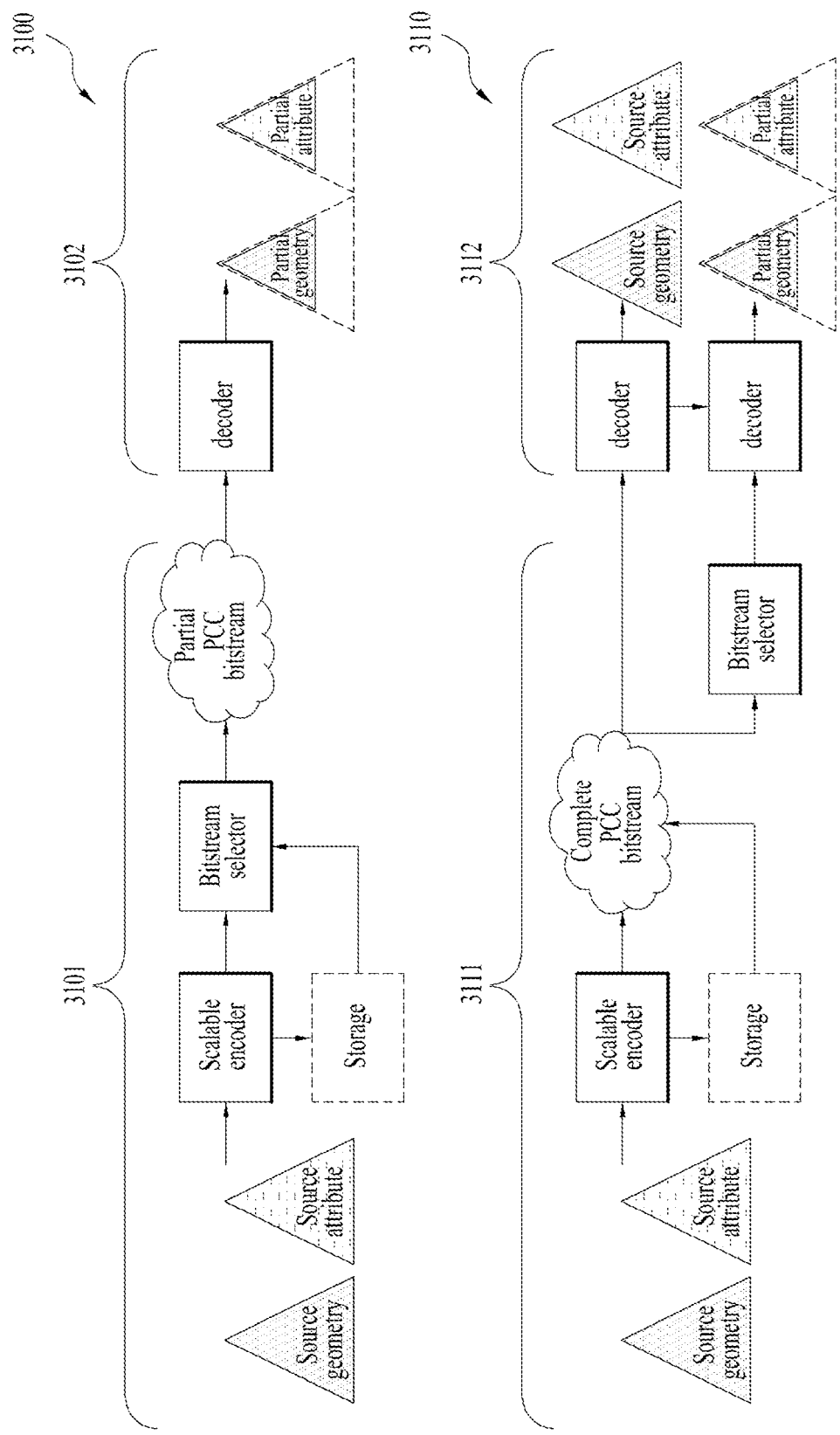
FIG. 31 illustrates configuration for transmission and reception of point cloud data according to embodiments.

FIG. 31 illustrates configuration for transmission and reception of point cloud data according to embodiments.

FIG. 31 illustrates configuration for transmission and reception of point cloud data for scalable decoding and scalable representation.

An example 3100 shown at the top of FIG. 31 is an exemplary configuration for transmission and reception of a partial PCC bitstream. The transmission device (e.g., the transmission device 10000 described with reference to FIG. 1, the transmission device described with reference to FIG. 12, or the point cloud data processing device 2000 described with reference to FIG. 20) according to the embodiments may perform scalable encoding on a source geometry and a source attribute and select a bitstream (or the sub-bitstream described with reference to FIGS. 21 and 22) according to the layer described with reference to FIGS. 18 to 29 to generate a partial PCC bitstream. Accordingly, the transmission device may implement efficient transmission of information in terms of bandwidth by transmitting only necessary data. The reception device (e.g., the reception device 10004 of FIG. 1, the point cloud decoder of FIGS. 10 and 11, the reception device of FIG. 13, or the point cloud data processing device 2900 described with reference to FIG. 29) according to the embodiments receives and decodes the partial PC bitstream, and outputs a partial geometry and partial attribute (3102). Since the configuration shown in the example 3100 does not require additional data processing (e.g., decoding and transcoding) for the transmission device, the probability of occurrence of a delay in the data processing process is reduced. In addition, since the transmission device transmits layer-related signaling information (e.g., the signaling information described with reference to FIGS. 23 to 28) as well, the reception device may efficiently decode the partial geometry and partial attribute based on the signaling information.

An example 3110 shown at the bottom of FIG. 31 is an exemplary configuration for transmission and reception of a complete PCC bitstream. The transmission device according to the embodiments performs scalable encoding and stores encoded geometry and attributes. The transmission device according to the embodiments layers the geometry and attributes on a slice-by-slice basis and generates a bitstream (e.g., a complete PCC bitstream) including the geometry and attributes in units of slices (3111). Since the transmission device transmits information (e.g., the signaling information described with reference to FIGS. 23 to 28) related to layers of the geometry and attributes as well, the reception device may secure information about the layers and slices. Accordingly, the reception device receives the bitstream and selects a geometry sub-bitstream and/or an attribute sub-bitstream in units of slices before decoding, and then decodes the full geometry and attributes, or decodes geometry and attributes corresponding to some layers to output a partial geometry and a partial attribute (3112). According to the configuration shown in the example 3110, the reception device selects a sub-bitstream based on the density of point cloud data to be represented according to performance of the reception device or applications. In addition, the reception device may select a layer before decoding to perform decoding with higher efficiency and support decoders of various performances.

Figure 32:
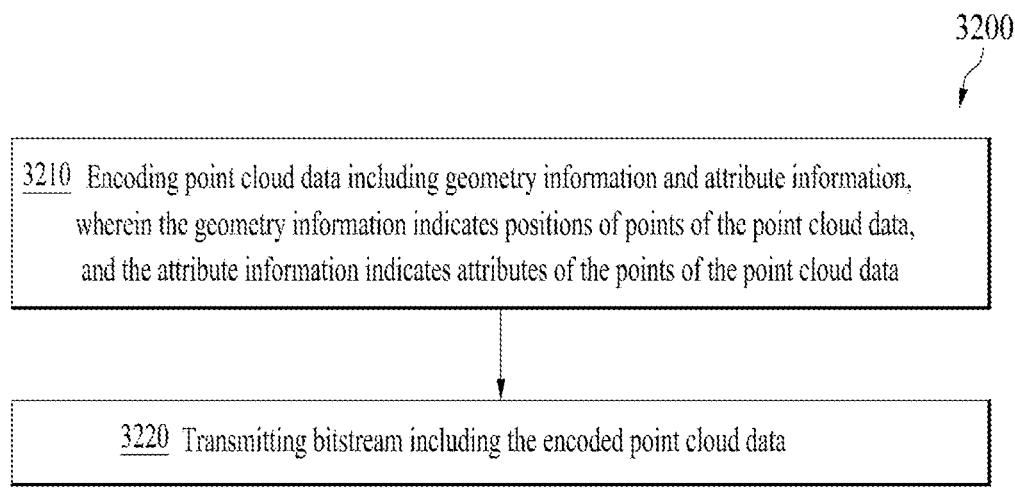
FIG. 32 is an exemplary flow diagram of a method for processing point cloud data according to embodiments.

FIG. 32 is an exemplary flow diagram of a method for processing point cloud data according to embodiments.

The flow diagram 3200 of FIG. 32 illustrates a point cloud data processing method carried out by a point cloud data processing device (e.g., the transmission device described with reference to FIGS. 1, 11, 14, and 15 and the point cloud data processing device 2000 described with reference to FIG. 20). The point cloud data processing device according to the embodiments may perform the same or similar operation to the encoding operation described with reference to FIGS. 1 to 31.

The point cloud data processing device according to the embodiments may encode point cloud data including geometry information and attribute information (3210). The geometry information according to the embodiments indicates positions of points of the point cloud data. The attribute information according to the embodiments indicates attributes of points of the point cloud data.

The point cloud data processing device according to the embodiments encodes the geometry information and outputs a geometry bitstream. In addition, the point cloud data processing device encodes the attribute information and outputs an attribute bitstream. The point cloud data processing device according to the embodiments performs the same or similar operation to the geometry information encoding described with reference to FIGS. 1 to 31. In addition, the point cloud data processing device performs the same or similar operation to the attribute information encoding described with reference to FIGS. 1 to 31. The point cloud data processing device (e.g., the sub-bitstream generator 2030 described with reference to FIG. 20) according to the embodiments generates one or more geometry sub-bitstreams (e.g., the first geometry sub-bitstream 2111, the second geometry sub-bitstream 2112, and the third geometry sub-bitstream 2113 described with reference to FIG. 21) corresponding to one or more layers from the geometry bitstream. The point cloud data processing device (e.g., the sub-bitstream generator 2030 described with reference to FIG. 20) according to the embodiments generates one or more attribute sub-bitstreams corresponding to one or more layers (e.g., the first attribute sub-bitstream 2121, the second attribute sub-bitstream 2122, and the third attribute sub-bitstream 2123 described with reference to FIG. 21) from the attribute bitstream. As described with reference to FIGS. 20 to 28, the geometry sub-bitstream may be included in a geometry slice and the attribute sub-bitstream may be included in an attribute slice. The bitstream according to the embodiments may include one or more geometry slices and one or more attribute slices. Details of the bitstream are the same as those described with reference to FIG. 23.

The bitstream according to the embodiments carries signaling information (e.g., the signaling information described with reference to FIGS. 23 to 28). The bitstream includes slice-related information (e.g., the slice-related information described with reference to FIG. 23). The slice-related information includes first information (e.g., split_slice_flag described with reference to FIG. 23) indicating whether the geometry bitstream and the attribute bitstream are divided into one or more slices. When the first information indicates that the geometry bitstream and the attribute bitstream are divided into one or more slices, the slice-related information may include second information (e.g., split_type described with reference to FIG. 23) indicating whether layers of the geometry sub-bitstream and the attribute sub-bitstream are based on a Level of Detail (LOD) or a depth of an octree structure. Since the signaling information according to the embodiments is the same as that described with reference to FIGS. 23 to 28, a detailed description thereof will be omitted.

Figure 33:
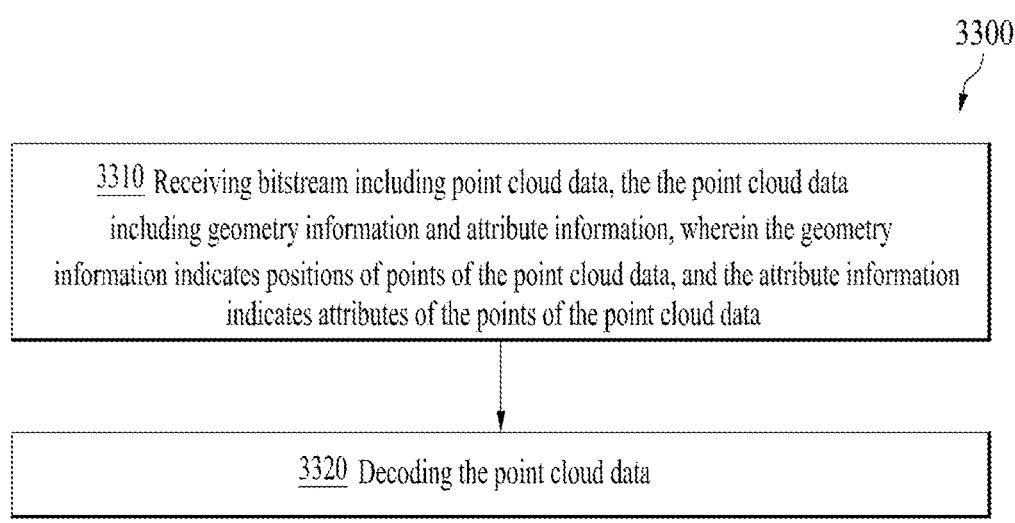
FIG. 33 is an exemplary flow diagram of a method for processing point cloud data according to embodiments.

FIG. 33 is an exemplary flow diagram of a method for processing point cloud data according to embodiments.

The flow diagram 3300 of FIG. 33 illustrates a point cloud data processing method for a point cloud data processing device (e.g., the point cloud data reception device or point cloud data decoder described with reference to FIGS. 1, 13, 14, 16, and 25, or the point cloud data processing device 2900 described with reference to FIG. 29). The point cloud data processing device according to the embodiments may perform the same or similar operation to the decoding operation described with reference to FIGS. 1 to 31.

The point cloud data processing device according to the embodiments receives a bitstream including point cloud data (3310). The geometry information according to the embodiments indicates positions of the points of the point cloud data. The attribute information according to the embodiments indicates attributes of the points of the point cloud data. The structure of the bitstream according to the embodiments is the same as that described with reference to FIGS. 23 to 28, and thus a detailed description thereof will be skipped. As described with reference to FIGS. 20 to 28, the geometry sub-bitstream may be included in a geometry slice and the attribute sub-bitstream may be included in an attribute slice. The bitstream according to the embodiments includes a geometry slice including a geometry sub-bitstream and an attribute sub-bitstream. One or more geometry sub-bitstreams (e.g., the first geometry sub-bitstream 2111, the second geometry sub-bitstream 2112, and the third geometry sub-bitstream 2113 described with reference to FIG. 21) and one or more attribute sub-bitstreams (e.g., the first attribute sub-bitstream 2121, the second attribute sub-bitstream 2122, and the third attribute sub-bitstream 2123 described with reference to FIG. 21) correspond to one or more layers. The bitstream according to the embodiments carries signaling information (e.g., the signaling information described with reference to FIGS. 23 to 28). The bitstream includes slice-related information (e.g., the slice-related information described with reference to FIG. 23). The slice-related information includes first information (e.g., split_slice_flag described with reference to FIG. 23) indicating whether the geometry bitstream and the attribute bitstream are divided into one or more slices. When the first information indicates that the geometry bitstream and the attribute bitstream are divided into one or more slices, the slice-related information may include second information (e.g., split_type described with reference to FIG. 23) indicating whether layers of the geometry sub-bitstream and the attribute sub-bitstream are based on a Level of Detail (LOD) or a depth of an octree structure. Since the signaling information according to the embodiments is the same as that described with reference to FIGS. 23 to 28, a detailed description thereof will be omitted.

The point cloud data processing device according to the embodiments decodes the point cloud data (3320). The point cloud data processing device according to the embodiments decodes a geometry sub-bitstream corresponding to a layer based on the slice-related information and decodes an attribute sub-bitstream corresponding to the layer to perform scalable representation.

Components of the point cloud data processing devices according to the embodiments described with reference to FIGS. 1 to 33 may be implemented as hardware, software, firmware, or a combination thereof including one or more processors coupled with a memory. The components of the devices according to the embodiments may be implemented as a single chip, for example, a single hardware circuit. Alternatively, the components of the point cloud data processing devices according to the embodiments may be implemented as separate chips. In addition, at least one of the components of the point cloud data processing devices according to the embodiments may include one or more processors capable of executing one or more programs, wherein the one or more programs may include are instructions that execute or are configured to execute one or more of the operations/methods of the point cloud data processing devices described with reference to FIGS. 1 to 33.

Although the accompanying drawings have been described separately for simplicity, it is possible to design new embodiments by merging the embodiments illustrated in the respective drawings. Designing a recording medium readable by a computer on which programs for executing the above-described embodiments are recorded as needed by those skilled in the art also falls within the scope of the appended claims and their equivalents. The devices and methods according to embodiments may not be limited by the configurations and methods of the embodiments described above. Various modifications can be made to the embodiments by selectively combining all or some of the embodiments. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Descriptions of methods and devices may be applied so as to complement each other. For example, the point cloud data transmission method according to the embodiments may be carried out by the point cloud data transmission device or components included in the point cloud data transmission device according to the embodiments. Also, the point cloud data reception method according to the embodiments may be carried out by the point cloud data reception device or components included in the point cloud data reception device according to the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this specification, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." Also, "A/B/C" may mean "at least one of A, B, and/or C." Further, in this specification, the term "or" should be interpreted as indicating "and/or." For instance, the expression "A or B" may mean 1) only A, 2) only B, or 3) both A and B. In other words, the term "or" used in this document should be interpreted as indicating "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signals unless context clearly dictates otherwise.

The terms used to describe the embodiments are used for the purpose of describing specific embodiments, and are not intended to limit the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

MODE FOR DISCLOSURE

As described above, related contents have been described in the best mode for carrying out the embodiments.

INDUSTRIAL APPLICABILITY

It will be apparent to those skilled in the art that various changes or modifications can be made to the embodiments within the scope of the embodiments. Thus, it is intended that the embodiments cover the modifications and variations of this disclosure provided they come within the scope of the appended claims and their equivalents.

The invention claimed is:

1. A method of encoding point cloud data by an apparatus, the method comprising:
    encoding the point cloud data including geometry information and attribute information, wherein the geometry information represents positions of points of the point cloud data and the attribute information represents attributes of the points of the point cloud data,
    wherein the geometry information is encoded based on an octree including depths including the points,
    wherein the attribute information is encoded based on levels of detail that include the points in the depths of the octree,
    wherein the geometry information and the attribute information are encoded and included in a partial slice,
    wherein the partial slice is generated based on a layer related to at least one of the octree or the levels of detail; and
    transmitting a bitstream,
    wherein the bitstream includes geometry parameters including a slice identifier identifying a slice including the partial slice, layer information for representing the layer for the partial slice, and size information for representing a size of a sub-group related to the layer,
    wherein the bitstream further includes a split type for the partial slice, wherein the split type includes one of a first value for representing that the partial slice is generated based on the levels of detail or a second value for representing that the partial slice is generated based on the octree,
    wherein, based on the first value, the bitstream further includes information for a number of the levels of detail, and wherein the bitstream further includes a flag for representing whether full point cloud data is carried or a part of the point cloud data is carried, and a flag for representing whether full geometry data is carried or a part of the geometry data is carried.

2. The method of claim 1, wherein the encoding the point cloud data includes:
encoding the geometry information to output a geometry bitstream; and
encoding the attribute information to output an attribute bitstream.

3. The method of claim 2, the method comprising:
generating one or more geometry sub bitstreams that correspond to one or more layers of the geometry bitstream and generating one or more attribute sub bitstream that correspond to one or more layers of the attribute bitstream,
wherein the bitstream includes:
a geometry slice including a geometry sub bitstream, and
an attribute slice including an attribute sub bitstream.

4. The method of claim 3, wherein the bitstream includes information related to a slice, the information related to a slice includes: first information representing whether the geometry bitstream and the attribute bitstream are divided into one or more slices,
wherein:
in response to the first information representing that the geometry bitstream and the attribute bitstream are divided into one or more slices, the information related to a slice includes:
second information representing whether layers of the geometry sub bitstream and the attribute sub bitstream are based on the levels of detail or the depths of the octree.

5. A device configured to encode point cloud data, the device comprising:
a memory; and
a processor configured to execute one or more instructions in the memory, wherein the processor is configured to perform:
encoding the point cloud data including geometry information and attribute information, wherein the geometry information represents positions of points of the point cloud data and the attribute information represents attributes of the points of the point cloud data, wherein the geometry information is encoded based on an octree including depths including the points,
wherein the attribute information is encoded based on levels of detail that include the points in the depths of the octree,
wherein the geometry information and the attribute information are encoded and included in a partial slice,
wherein the partial slice is generated based on a layer related to at least one of the octree or the levels of detail; and
transmitting a bitstream,
wherein the bitstream includes geometry parameters including a slice identifier identifying a slice including the partial slice, layer information for the partial slice, and size information for representing a size of a sub-group related to the layer,
wherein the bitstream further includes a split type for the partial slice, wherein the split type includes one of a first value for representing that the partial slice is generated based on the levels of detail or a second value for representing that the partial slice is generated based on the octree,
wherein, based on the first value, the bitstream further includes information for a number of the levels of detail, and
wherein the bitstream further includes a flag for representing whether full point cloud data is carried or a part of the point cloud data is carried, and a flag for representing whether full geometry data is carried or a part of the geometry data is carried.

6. The device of claim 5, wherein the processor is further configured to perform:
encoding the geometry information to output a geometry bitstream;
encoding the attribute information to output an attribute bitstream; and
generating one or more geometry sub bitstreams that correspond to one or more layers of the geometry bitstream and to generate one or more attribute sub bitstream that correspond to one or more layers of the attribute bitstream,
wherein the bitstream includes:
a geometry slice including a geometry sub bitstream and an attribute slice including an attribute sub bitstream.

7. The device of claim 6, wherein the bitstream includes information related to a slice, the information related to a slice includes: first information representing whether the geometry bitstream and the attribute bitstream are divided into one or more slices.

8. The device of claim 7, wherein:
in response to the first information representing that the geometry bitstream and the attribute bitstream are divided into one or more slices, the information related to a slice includes:
second information representing whether layers of the geometry sub bitstream and the attribute sub bitstream are based on the levels of detail or the depths of the octree.

9. A method of decoding point cloud data by an apparatus, the method comprising:
receiving a bitstream including point cloud data, wherein the point cloud data includes geometry information and attribute information, wherein the geometry information represents positions of points of the point cloud data and the attribute information represents attributes of the points of the point cloud data,
wherein the bitstream includes a partial slice, wherein the partial slice is generated based on a layer related to at least one of octree including depths or levels of detail; and
decoding the point cloud data,
wherein the geometry information is decoded based on the octree,
wherein the attribute information is decoded based on the levels of detail that include the points,
wherein the geometry information and the attribute information are decoded based on the partial slice,
wherein the bitstream includes geometry parameters including a slice identifier identifying a slice including the partial slice, layer information for representing the layer for the partial slice, and size information for representing a size of a sub-group related to the layer,
wherein the bitstream further includes a split type for the partial slice, wherein the split type includes one of a first value for representing that the partial slice is generated based on the levels of detail or a second value for representing that the partial slice is generated based on the octree, wherein, based on the first value, the bitstream further includes information for a number of the levels of detail, and wherein the bitstream further includes a flag for representing whether full point cloud data is carried or a part of the point cloud data is carried, and a flag for representing whether full geometry data is carried or a part of the geometry data is carried.

10. The method of claim 9, wherein the decoding the point cloud data includes:

decoding the geometry information to output a geometry sub bitstream; and decoding the attribute information to output an attribute sub bitstream.

11. The method of claim 10, wherein the bitstream includes a geometry slice including a geometry sub bitstream and an attribute sub bitstream, one or more geometry sub bitstreams and one or more attribute sub bitstream correspond to one or more layers, wherein the bitstream includes information related to a slice, the information related to a slice includes: first information representing whether the geometry bitstream and the attribute bitstream are divided into one or more slices.

12. The method of claim 11, wherein:

in response to the first information representing that the geometry bitstream and the attribute bitstream are divided into one or more slices, the information related to a slice includes:

second information representing whether layers of the geometry sub bitstream and the attribute sub bitstream are based on the levels of detail or the depths of the octree.

13. A device configured to decode point cloud data, the device comprising:

a memory; and a processor configured to execute one or more instructions in the memory, wherein the processor is configured to perform:

receiving a bitstream including point cloud data, wherein the point cloud data includes geometry information and attribute information, wherein the geometry information represents positions of points of the point cloud data and the attribute information represents attributes of the points of the point cloud data, wherein the bitstream includes a partial slice, wherein the partial slice is generated based on a layer related to at least one of octree including depths or levels of detail; and decoding the point cloud data, wherein the geometry information is decoded based on the octree, wherein the attribute information is decoded based on the levels of detail that include the points, wherein the geometry information and the attribute information are decoded based on the partial slice, wherein the bitstream includes geometry parameters including a slice identifier identifying a slice including the partial slice, layer information for representing the layer for the partial slice, and size information for representing a size of a sub-group related to the layer, wherein the bitstream further includes a split type for the partial slice, wherein the split type includes one of a first value for representing that the partial slice is generated based on the levels of detail or a second value for representing that the partial slice is generated based on the octree, wherein, based on the first value, the bitstream further includes information for a number of the levels of detail, and wherein the bitstream further includes a flag for representing whether full point cloud data is carried or a part of the point cloud data is carried, and a flag for representing whether full geometry data is carried or a part of the geometry data is carried.

14. The device of claim 13, wherein the processor is further configured to perform:

decoding the geometry information to output a geometry sub bitstream; and decoding the attribute information to output an attribute sub bitstream.

15. The device of claim 14, wherein the bitstream includes a geometry slice including a geometry sub bitstream and an attribute sub bitstream, one or more geometry sub bitstreams and one or more attribute sub bitstream correspond to one or more layers, wherein the bitstream includes information related to a slice, the information related to a slice includes: first information representing whether the geometry bitstream and the attribute bitstream are divided into one or more slices, wherein:

in response to the first information representing that the geometry bitstream and the attribute bitstream are divided into one or more slices, the information related to a slice includes:

second information representing whether layers of the geometry sub bitstream and the attribute sub bitstream are based on the levels of detail or the depths of the octree.

* * * * *